United States Patent
Pelly

[11] Patent Number: 6,009,008
[45] Date of Patent: *Dec. 28, 1999

[54] SOFT STRAT BRIDGE RECTIFIER CIRCUIT

[75] Inventor: Brian R. Pelly, Palos Verdes Estates, Calif.

[73] Assignee: International Rectifier Corporation, El Segundo, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/052,271

[22] Filed: Mar. 31, 1998

Related U.S. Application Data

[60] Provisional application No. 60/042,192, Mar. 31, 1997, and provisional application No. 60/052,048, Jul. 9, 1997.

[51] Int. Cl.[6] .......................... H02M 7/162; H02H 7/122; H02H 7/125
[52] U.S. Cl. ................ 363/125; 363/49; 363/53
[58] Field of Search ................... 363/125, 126, 363/127, 128, 49, 81, 84, 53

[56] References Cited

U.S. PATENT DOCUMENTS

| | | | |
|---|---|---|---|
| 4,328,459 | 5/1982 | McLeod, JR. | 323/300 |
| 4,791,545 | 12/1988 | Hinckley | 363/81 |
| 5,627,738 | 5/1997 | Lubomirsky et al. | 363/49 |

*Primary Examiner*—Adolf Denke Berhane
*Attorney, Agent, or Firm*—Ostrolenk, Faber, Gerb & Soffen, LLP

[57] ABSTRACT

A soft start bridge rectifier circuit is described for controlling the operation of the bridge rectifier in order to ramp up the DC output upon connection with the AC input in order to limit in-rush current. Additionally, short-circuit/overload protection, temporary line loss protection and undervoltage checking circuitry is provided.

37 Claims, 59 Drawing Sheets

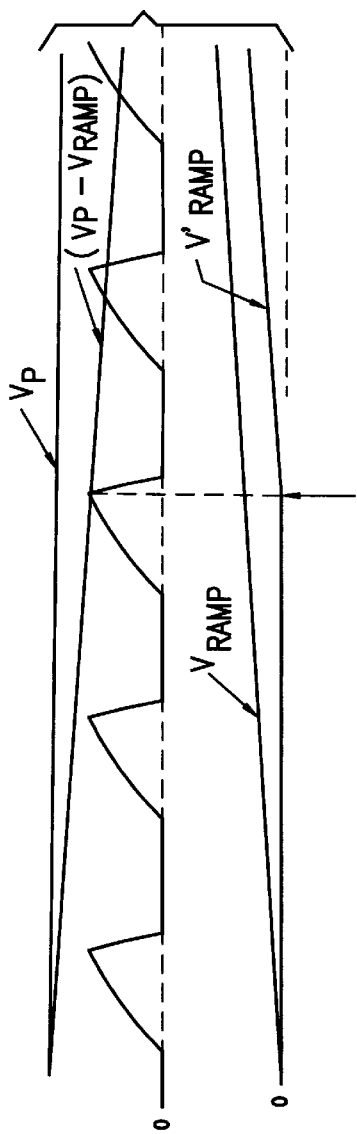
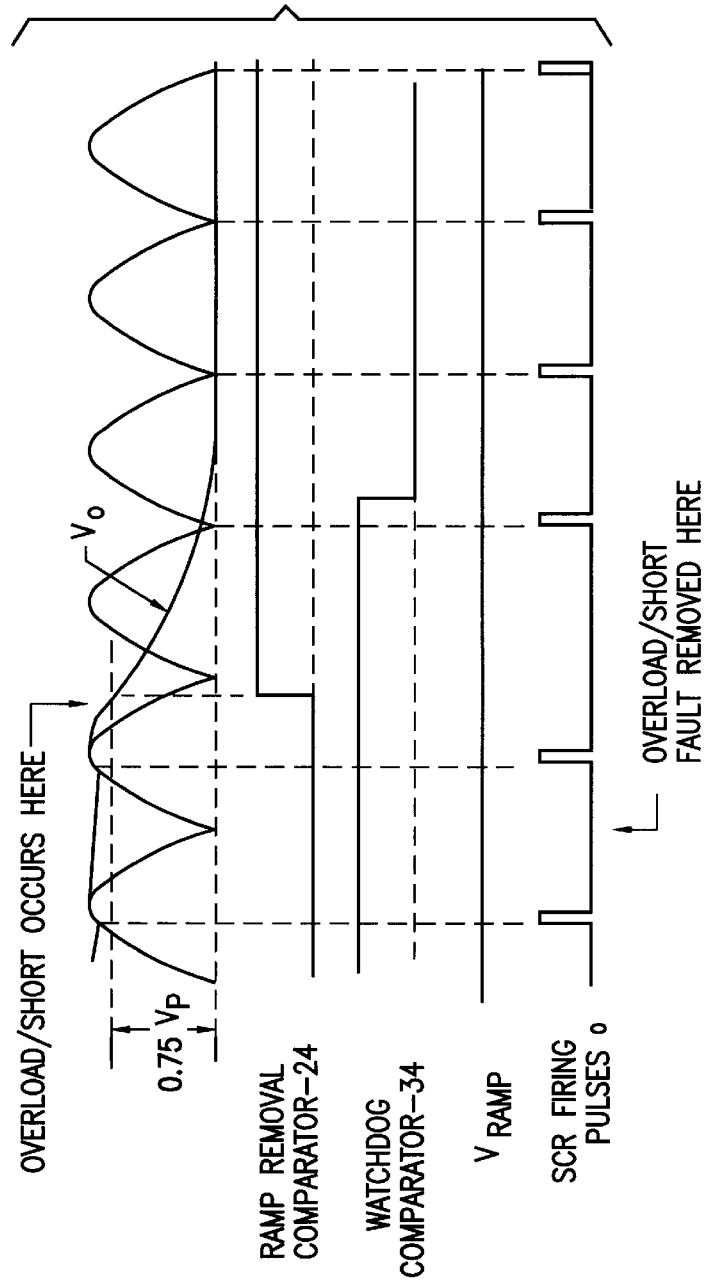
FIG. 10A
FIG. 10B

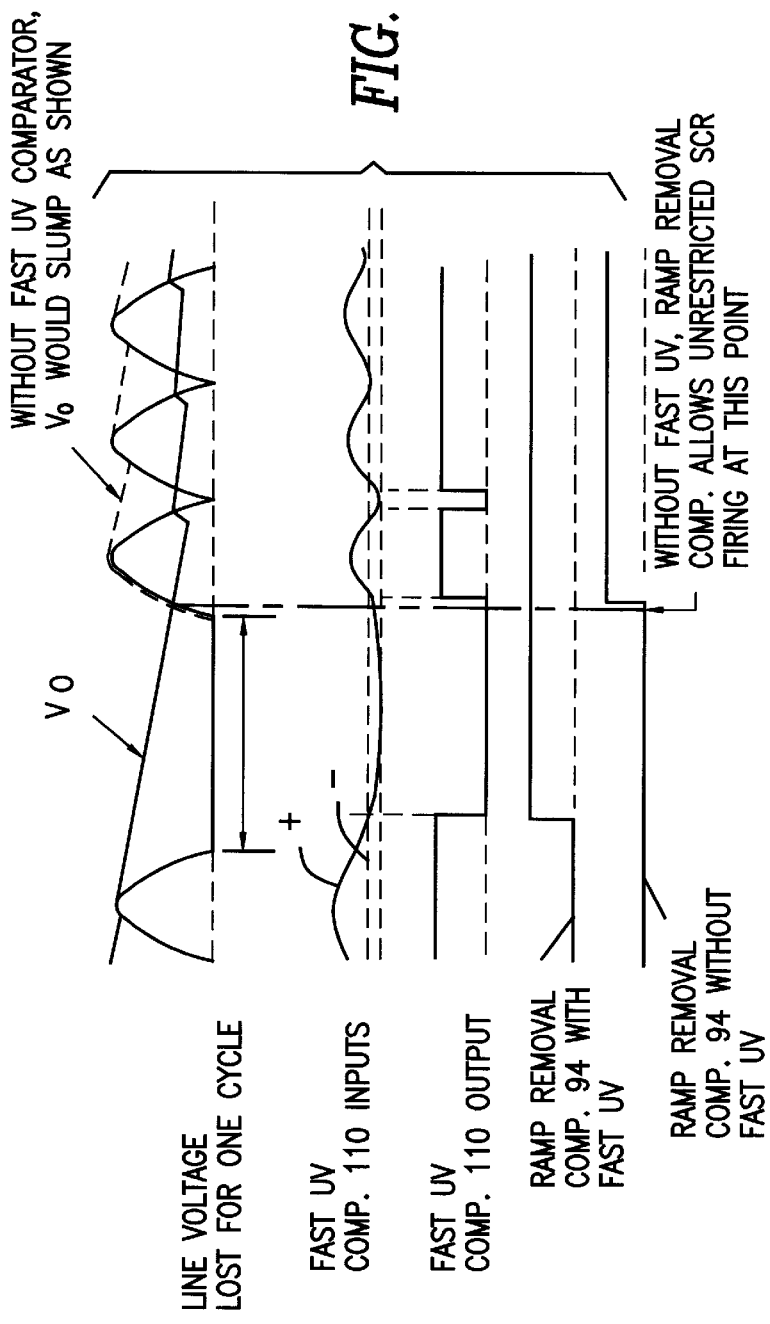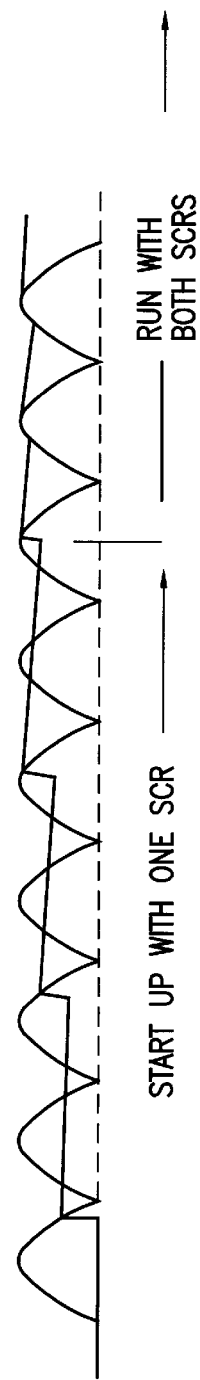

SOFT START RECTIFIER – BASIC SCHEMATIC

SOFT-START RECTIFIER – HALF CONTROLLED RECTIFIER BRIDGE WITH DV/DT SNUBBERS AND Vcc POWER SUPPLY

SOFT START RECTIFIER – BASIC SCHEMATIC FOR CONTROL ASIC

SOFT STRAT BRIDGE RECTIFIER CIRCUIT

This application claims the benefit of U.S. Provisional application Ser. No. 60/042,192, filed Mar. 31, 1997 and Ser. No. 60/052,048, filed Jul. 9, 1997.

BACKGROUND OF THE INVENTION

1. Field of the Invention

The present invention relates to a soft start bridge rectifier circuit which limits in-rush current and provides short-circuit/overload protection.

2. Description of the Related Art

Conventional bridge rectifier circuits are not well equipped to handle high start-up currents and short-circuits which stress circuit components such as fuses, bridge diodes and smoothing capacitors. Typically, for example, the occurrence of an output short circuit destroys a protection fuse between the power supply and the bridge rectifier, requiring replacement of the fuse. To limit the in-rush current at turn-on, conventional circuits include a thermistor or a relay in series with the output of the rectifier bridge. However, thermistor protection, although inexpensive, is suitable only for low-power applications. Relay protection, while more reliable and efficient than a thermistor, presents a significant cost premium, typically 50% to more than 100% of the bridge rectifier cost, and occupies a significant amount of space, usually more than the bridge rectifier itself.

Therefore, a need exists for a self-contained bridge rectifier circuit which can be provided in a module or package similar to that of a conventional bridge rectifier, but which also provides in-rush current protection on start-up and short-circuit protection during operation without a significant cost premium.

SUMMARY OF THE INVENTION

The present invention overcomes the disadvantages of the prior art and achieves the objectives set forth above by providing an apparatus and method for rectifying an AC input voltage to produce a DC output voltage with control circuitry for automatically ramping the rectified output voltage up to a predetermined maximum output voltage. The control circuitry is preferably provided in the form of a power integrated circuit, such that the entire bridge rectifier circuit with the control circuitry can be packaged together in a standard-sized module.

The present invention includes a bridge rectifier circuit with at least one silicon controlled rectifier (SCR). The conduction interval of the SCR is governed by a ramped-up voltage provided by the control circuitry. The ramped-up voltage automatically widens the conduction interval of the SCR, generating a firing signal at the gate of the silicon controlled rectifier at increasingly earlier times in the input signal phase. During the initial portion of the voltage ramp-up, the control circuitry fires the SCR only during periods in which the AC input voltage has a negative slope.

As the output of the bridge rectifier approaches its maximum voltage, a continuous firing signal is provided to the gate of the silicon controlled rectifier to minimize current drain by the control circuitry.

Undesired firing of the SCR during spikes in the AC voltage is prevented by the control circuitry. Snubbers connected in parallel with the silicon controlled rectifier provide dV/dt immunity. Housekeeping power for the control circuitry is self-contained within the module.

The soft start bridge rectifier circuit using one or more SCRs to control the charging current of the dc bus capacitor is a prime candidate for motor control power trains. The circuit offers the following advantages when compared to an uncontrolled diode bridge with a precharge resistor and shorting relay: eliminating the precharge resistor and relay, saving space, improving reliability, providing automatic current limiting in the event of bus capacitor failure or output inverter leg failure, and providing regulation of the dc bus voltage thereby reducing the required voltage ratings of the bus capacitor and the inverter output switches.

Other features and advantages of the present invention will become apparent from the following description of the invention which refers to the accompanying drawings.

BRIEF DESCRIPTION OF THE DRAWINGS

FIGS. 10A, 10B and 10C are timing diagrams showing the operation of the watchdog circuitry in response to a overload/short circuit condition.

FIG. 11A is a timing diagram showing the operation of the fast UV circuitry.

FIG. 30 shows timing diagrams of the synchronized timing waves and timing reference when the bridge rectifier is fully on.

FIG. 31 shows timing diagrams of the SCR anode-cathode voltage, the timing wave and the timing reference when the rectifier is fully on.

DETAILED DESCRIPTION OF THE PREFERRED EMBODIMENT

I. Soft Start Bridge Rectifier Circuit With Control Circuitry

Figure 1:
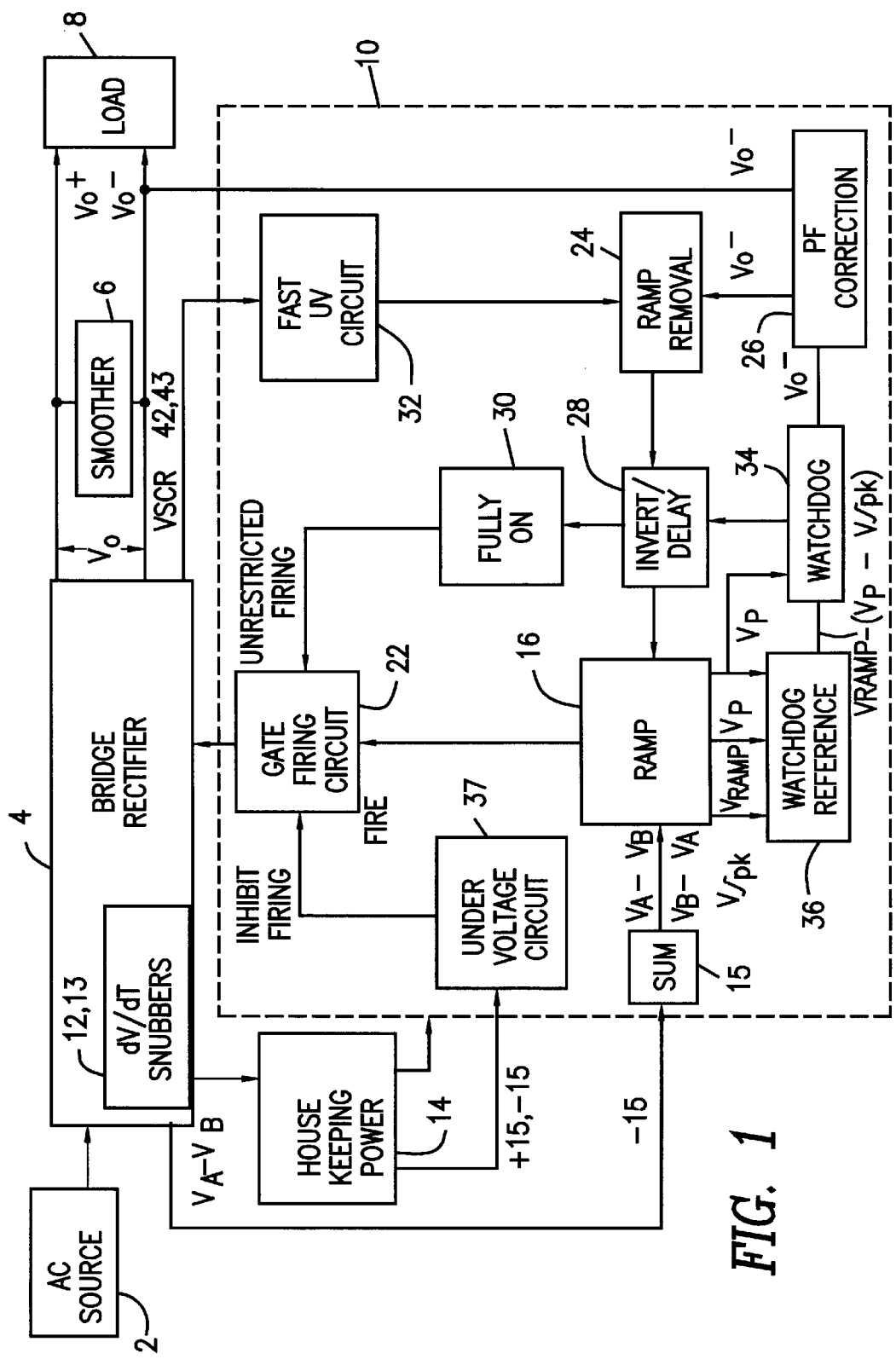
FIG. 1 is a block diagram of the overall circuitry of an embodiment of the present invention.

FIG. 1 is a block diagram of the overall circuitry of the present invention. An AC source 2 supplies a sinusoidal signal to a bridge rectifier circuit 4. The output $V_O$ of bridge rectifier 4 is applied to a smoother 6. The output of smoother 6 is supplied to a load 8, such as a switching power supply, motor drive, welder, etc.

Bridge rectifier 4 includes dV/dt immunity, supplied by snubbers 12, 13, supplies a housekeeping power circuit 14, tapped off of snubbers 12, 13, and supplies ±15 volts to a control circuit 10.

Control circuit 10 controls bridge rectifier 4 to provide automatic slow ramp-up of output voltage $V_O$. Input voltage components $V_A$ and $V_B$ are combined at summing circuit 15 to provide voltages $V_{A-B}$ and $V_{B-A}$ for a ramp circuit 16. Ramp circuit 16 generates a phase-controlled signal (explained in greater detail below), which is supplied, through OR gate 18 (FIG. 4), to a gate firing circuit 22. As described below, the conduction interval of SCRs within bridge rectifier circuit 4 are controlled by gate firing circuit 22 to regulate the voltage provided to the load.

Once a sufficiently high output voltage $V_O$ has been reached via the ramp-up process, bridge rectifier 4 is locked into a fully-on condition for normal operation. In this regard, the output $V_O$-voltage from smoother 6 is provided to a ramp removal circuit 24 (optionally modified by a power-factor (PF) correction circuit 26) which in turn controls a "fully-on" comparator 30. The polarity and timing of this control signal is modified by an invert/delay module 28. The signal from fully-on comparator 30 is OR'ed with the output of ramp 16 to provide uninhibited firing of the SCRs in bridge rectifier circuit 4 when ramp-up reaches a pre-determined level considered to be sufficient (i.e. 75% of peak line voltage), thus minimizing current drain on the rectifier circuit.

Transient loss of power as supplied by AC source 2 to bridge rectifier 4 is detected by a fast undervoltage circuit 32, which then provides a control signal to ramp removal circuit 24 to re-initiate ramp-up.

Excessive load conditions (caused, e.g., by short circuits in the load) are handled by a watchdog module 34 operating in conjunction with a watchdog reference 36. The output of ramp removal circuit 24 immediately goes high if $V_O$-drops significantly, indicating a short circuit has occurred at the output. Watchdog comparator 34 keeps ramp 16 phased back until the short circuit or overload condition is removed, as explained more fully below.

A drop in housekeeping power below a predetermined limit is detected by an undervoltage lockout circuit 37, which then inhibits gate firing circuit 22, shutting down bridge rectifier 4. When housekeeping power is restored to a level sufficient for proper operation of control circuit 10, the inhibit signal from undervoltage lockout 37 is removed, and the system is permitted to re-soft start.

The structure and operation of each of the circuit blocks in FIG. 1 is now described in greater detail.

1. Bridge Rectifier and Snubber Circuitry

Figure 2:
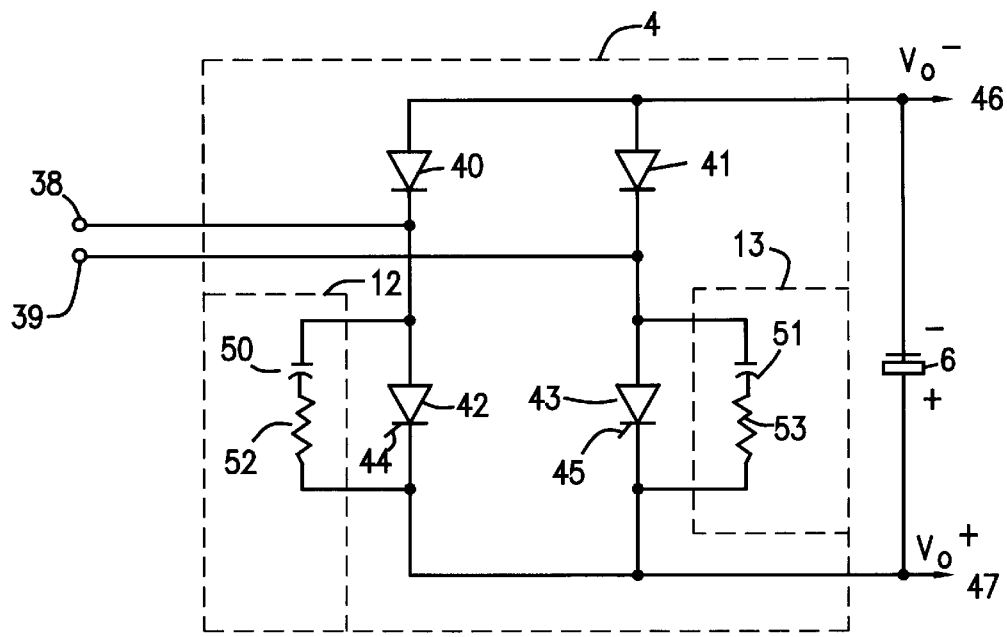
FIG. 2 is a schematic representation of the bridge rectifier circuitry of the embodiment of FIG. 1.

FIG. 2 shows the details of full-wave bridge rectifier 4. The input signal from AC source 2 is applied to bridge rectifier 4 at terminals 38, 39. Bridge rectifier 4 comprises a pair of conventional diodes 40, 41 and a pair of silicon controlled rectifiers 42, 43 in a typical bridge circuit arrangement. Output signals from gate firing circuit 22 are applied to gates 44, 45 of SCRs 42, 43, respectively, to control the firing of the SCRs to thereby regulate output voltage $V_O$ at terminals 46, 47 as detailed in further detail below.

The circuit is provided with dV/dt immunity by snubbers 12, 13, which are connected across in SCRs 42, 43 respectively. As shown in FIG. 2, snubbers 12, 13 comprise capacitors 50, 51 in series with resistors 52, 53, respectively.

2. Housekeeping Power

Figure 3:
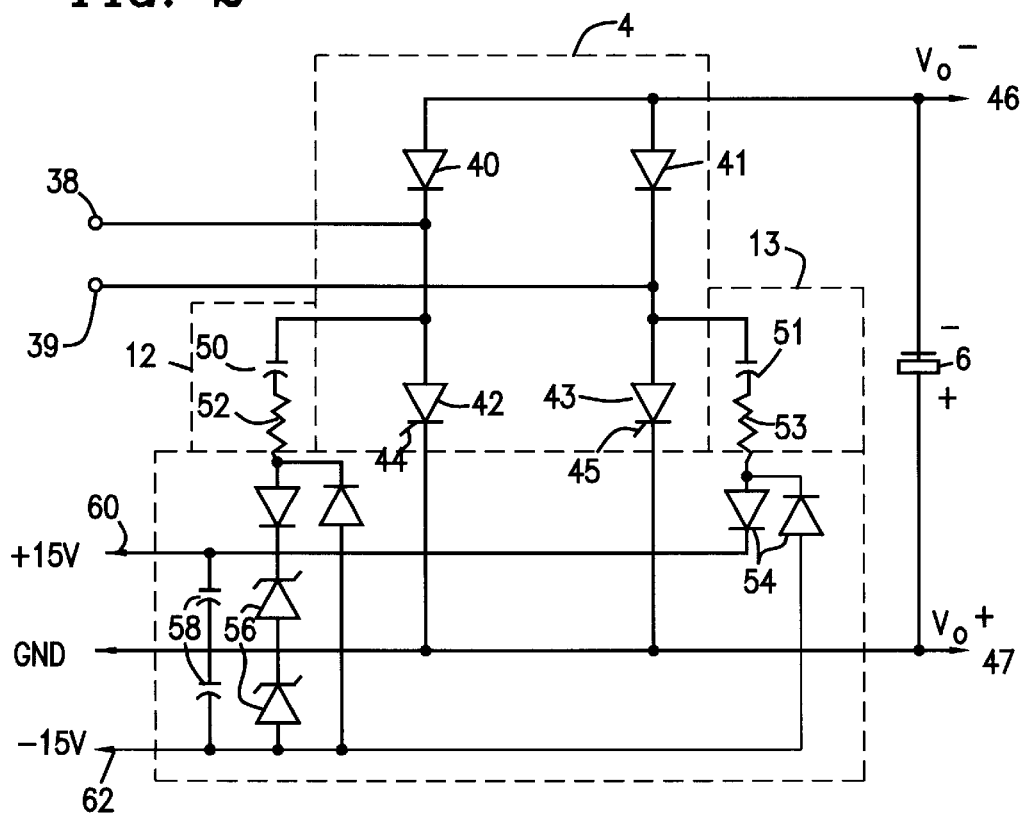
FIG. 3 is a schematic representation of the self-contained housekeeping power circuitry of the embodiment of FIG. 1.

FIG. 3 illustrates the circuitry of self-contained housekeeping power supply 14. As shown therein, snubbers 12, 13 are tapped for the added function of supplying input housekeeping power. Housekeeping power circuit 14 comprises four diodes 54 arranged in a bridge rectifier circuit, the output of which is clamped to ±15 volts by a pair of 15 volt Zener diodes 56 tied oppositely to ground potential. A pair of filtering capacitors 58 smooth the ±15 volt output at terminals 60, 62. The circuit arrangement of FIG. 3 advantageously produces housekeeping power that is positive with respect to the positive output of bridge rectifier 4, a result that would not be achieved with a simple resistive dropper.

3. Gate Firing Circuit

Figure 4:
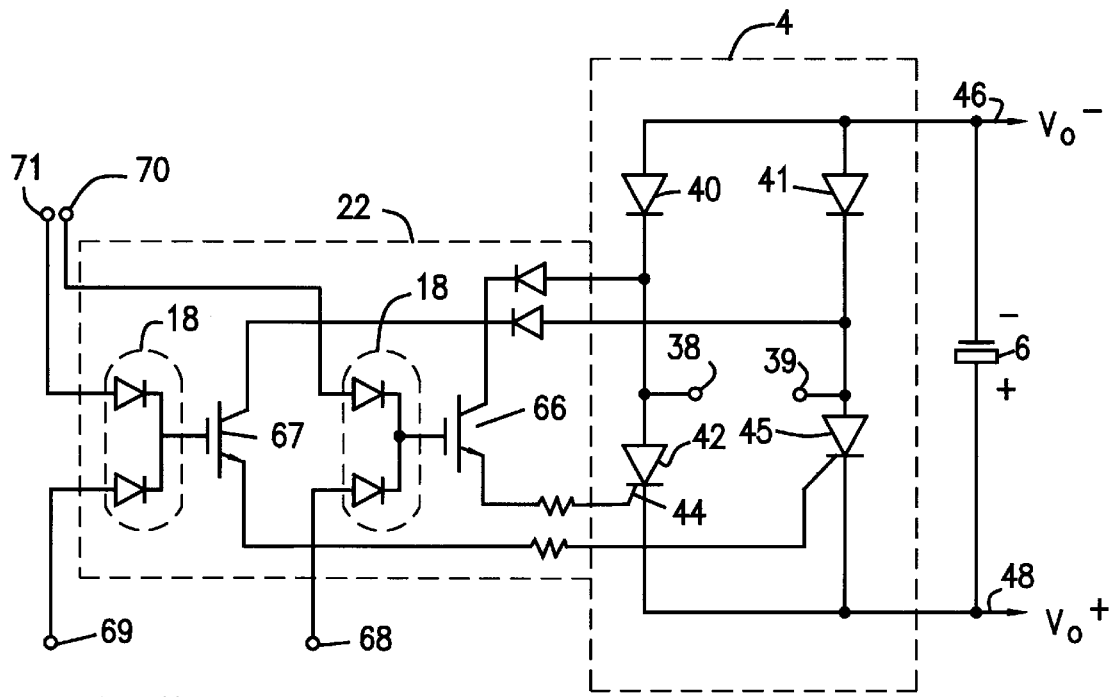
FIG. 4 is a schematic representation of the gate firing circuitry of the embodiment of FIG. 1.

FIG. 4 shows the details of gate firing circuit 22. A pair of high voltage IGBTs or MOSFETs 66, 67 produce the firing signals which trigger gates 44, 45 of SCRs 42, 43 respectively. The input gate signals to MOSFETs 66, 67 constitute signals 68, 69 from fully-on comparator 30 (explained in greater detail below) OR'ed with signals 70, 71 from ramp comparator 16 (explained in greater detail below), respectively. Thus, referring back to FIG. 1, OR gate 18 consists of the respective diode arrangements at the gates of MOSFETs 66, 67 as shown in FIG. 4.

Figure 4A:
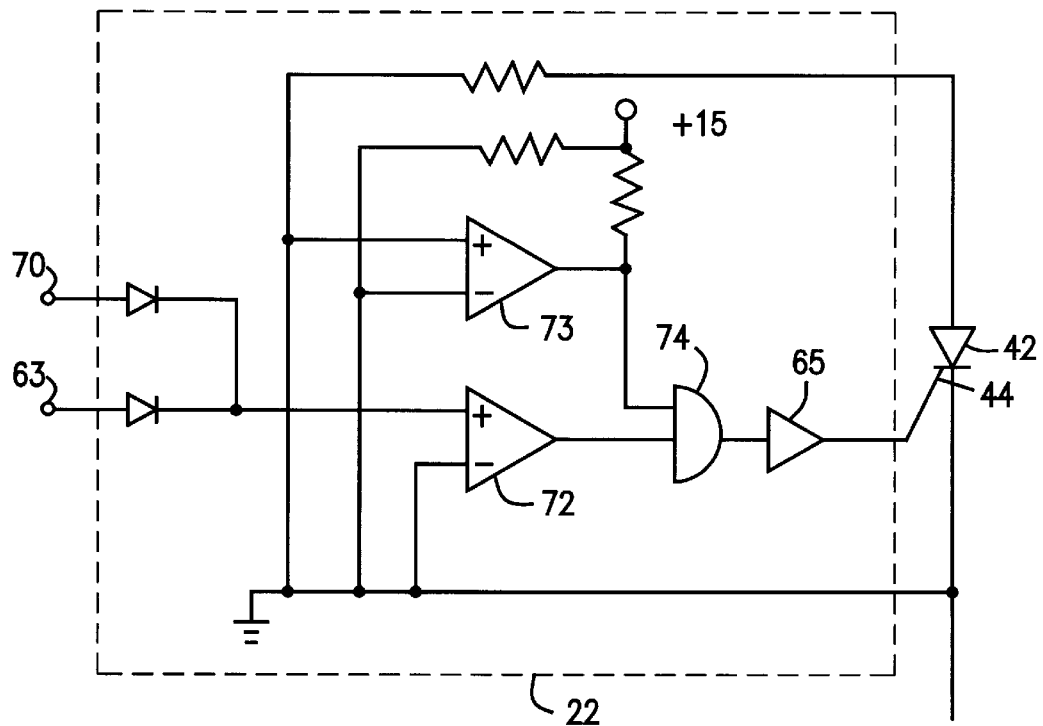
FIG. 4A is a schematic representation of an alternative embodiment of the gate firing circuitry of the embodiment of FIG. 1.

FIG. 4A shows an alternative gate firing circuit, wherein only one SCR is illustrated for purposes of clarity. Firing signals are provided to gate 44 of SCR 42 by comparator 72, which receives the combined result of OR'ing the signals from fully-on comparator 30 and ramp comparator 16. Comparator 73 senses the voltage at the anode of SCR 42. When SCR 42 turns on, the voltage at its anode drops, causing the output of comparator 73 to drop low, causing the output of AND gate 74 to go low, thereby inhibiting the firing of SCR 42. By removing the SCR firing pulse as soon as the SCR turns on, the average current drain is kept to a minimum. The typical average current drain per SCR 42 equals (500 $\mu$A * 3 $\mu$s)/16.66 ms=0.1 mA. The gate firing circuit of FIG. 4A eliminates the need for a high voltage MOSFET or IGBT.

4. Rams Circuit

Figure 5:
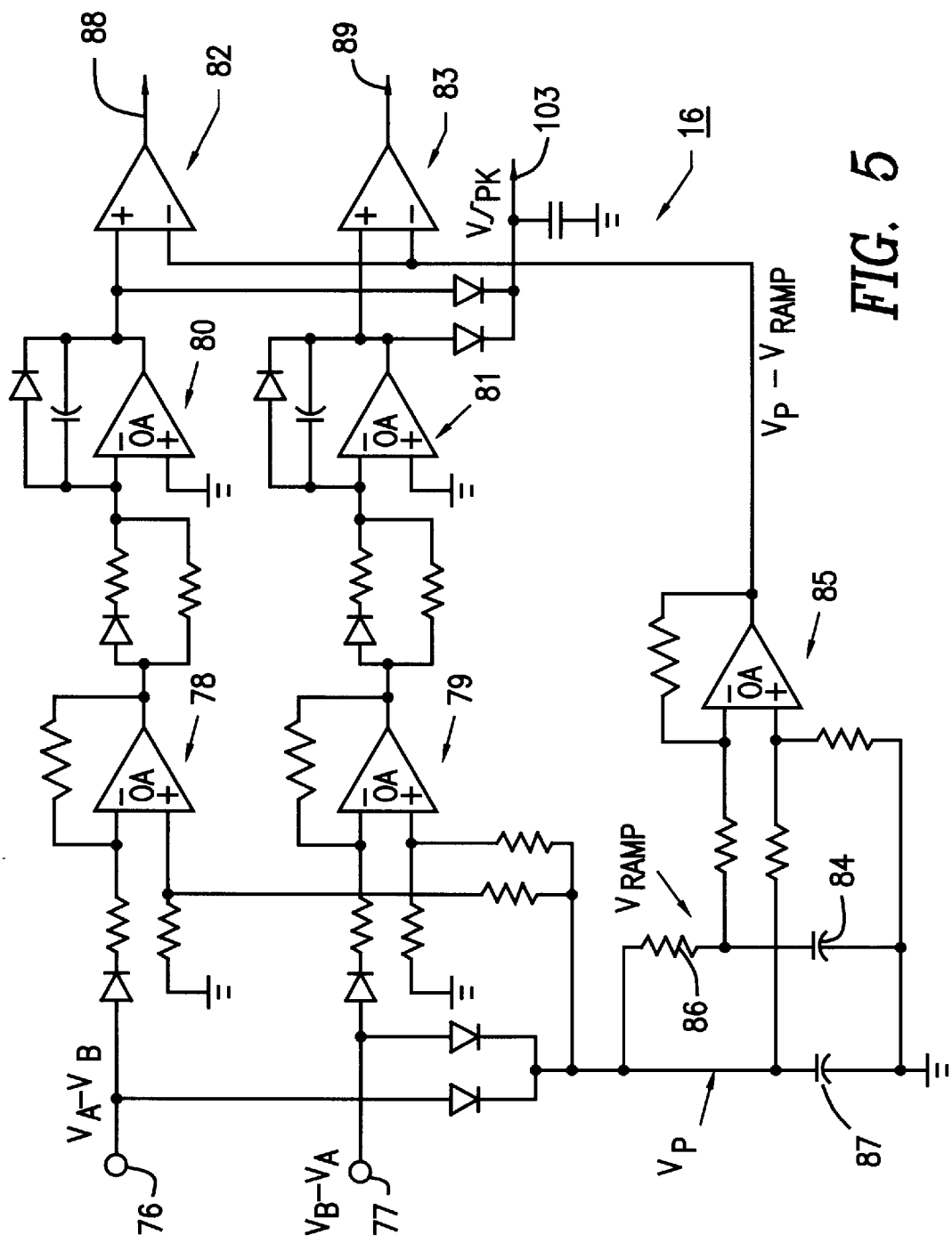
FIG. 5 is a schematic representation of the automatic voltage ramp-up circuitry of the embodiment of FIG. 1.

FIG. 5 shows the details of ramp circuit 16 which produces the automatic, slow ramp-up of bridge rectifier 4 circuit output voltage. A timing diagram of ramp circuit 16 is shown in FIG. 6.

The input line voltage to the soft start circuit of the present invention is formed of two sinusoidal components of opposing phase, $V_A$ and $V_B$, which are divided across bridge rectifier 4 (see FIG. 2). As shown in FIG. 1, summing circuit 15 receives signals $V_A$ and $V_B$ and generates signals representing $V_{A-B}$ and $V_{B-A}$, respectively, shown graphically in FIG. 6 as waveforms A and C, respectively. Ramp circuit 16 receives signals $V_{A-B}$, $V_{B-A}$ at inputs 76, 77, respectively. These signals $V_{A-B}$ and $V_{B-A}$ are input to inverting amplifiers 78, 79 at their respective inverting inputs.

Figure 6:
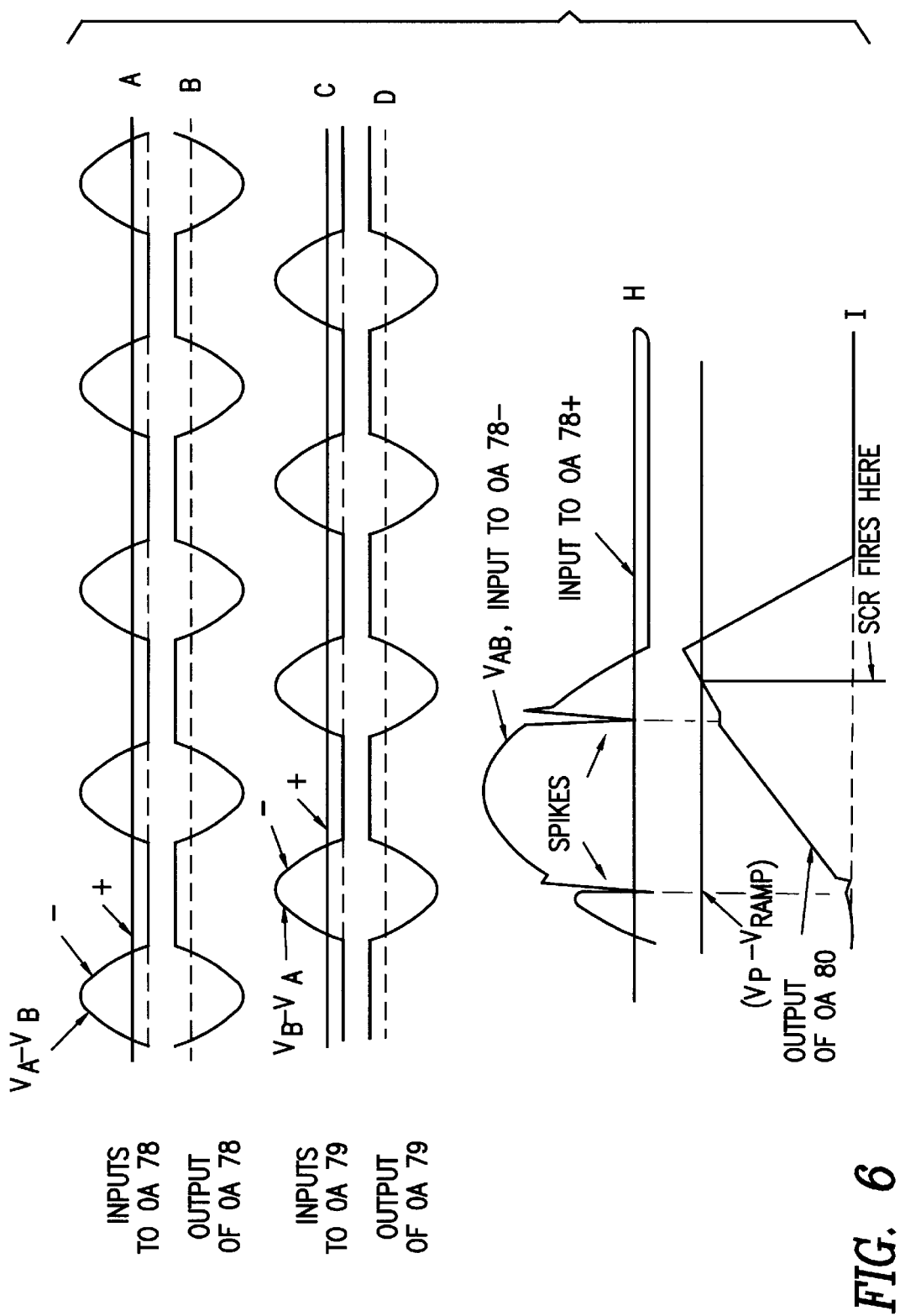
FIG. 6 shows timing diagrams of the ramp circuit of the embodiment of FIG. 1. Waveforms A, B, C, D, E, F and G show timing relationships of the ramp circuit during ramp-up operation. Waveforms H and I show timing relationships during voltage spiking.
Figure 6:
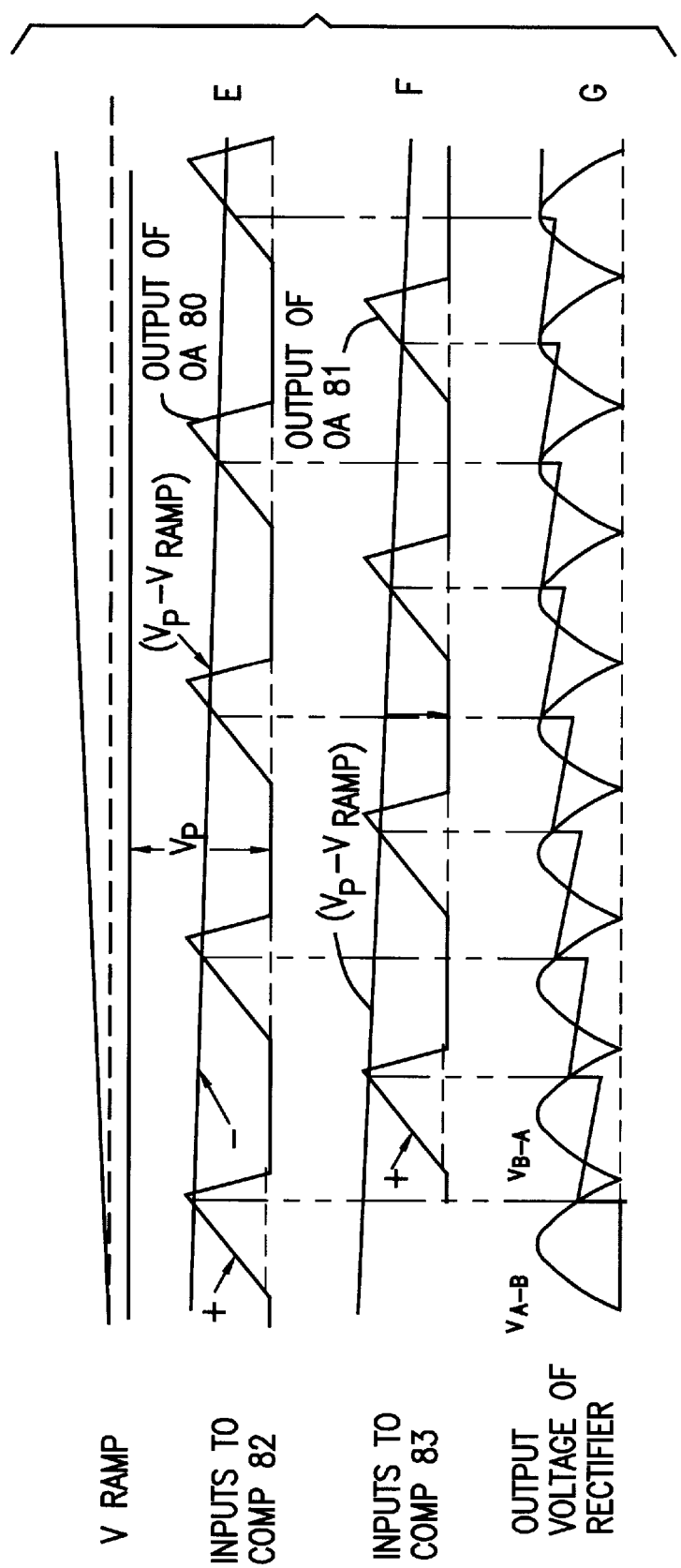

The output signals of inverting amplifiers 78, 79, shown graphically in waveforms B and D of FIG. 6, are applied to integrating op-amps 80, 81. Integrators 80, 81 generate the respective integrated sawtooth signals (waveforms E and F of FIG. 6), which signals are input to comparators 82, 83. These sawtooth signals are also combined to form signal $V \int_{pk}$, which is fed to watchdog reference 36, as described in detail below.

The signals $V_{A-B}$ and $V_{B-A}$ from summing circuit 15 are also OR'ed by a pair of diodes, and the combined OR'ed signal is smoothed by a capacitor 87 as shown in the bottom left portion of FIG. 5 to produce a signal $V_P$, the signal $V_P$ being fed to the non-inverting input of subtraction op amp 85. The signal $V_P$ is also integrated by charging a capacitor 84 through a resistor 86 to generate a ramp signal $V_{RAMP}$, this signal being input to the inverting input of subtraction op amp 85. The subtracted signal $V_P - V_{RAMP}$ at the output of op amp 85 is shown in waveform E of FIG. 6.

Comparators 82, 83, which receive the signal $V_P - V_{RAMP}$ at their inverting inputs and the sawtooth shaped outputs of op amps 80, 81, respectively, at their non-inverting inputs (these signals being shown in waveforms E and F of FIG. 6), generate the pulse signals for gating MOSFETs 66, 67 respectively. These gating signals are depicted in graphical form in FIGS. 8, 9, 10B and 10C, discussed below.

To summarize the operation of the present invention, the rate of in-rush current flow during system start-up is limited by control circuitry 10 which automatically ramps-up the output voltage of bridge rectifier 4. Each SCR 42, 43 is forward biased during each alternate half-cycle of AC input at terminal 2. However, the "duty cycle" during which each SCR 42, 43 conducts current during its forward biased condition, is regulated by the gating signals generated by ramp circuit 16. Waveform G of FIG. 6 shows the step-wise ramp-up of the output voltage of bridge rectifier 4 in relation to the sinusoidal signals $V_{A-B}$ and $V_{B-A}$.

Integrators 80, 81 produce two significant functions as part of the above soft start operation. First, as shown in waveform A of FIG. 6, the sawtooth respectively output by each of integrators 80, 81 (which cause the respective comparators 82, 83 to go positive, generating the SCR firing signal when the sawtooth exceeds $V_P - V_{RAMP}$) effectively delays the SCR firing signal, such that, during initial ramp-up, SCR firing occurs only during the second 90° phase (i.e. the second half) of each $V_{A-B}$ and $V_{B-A}$ half cycle. Secondly, as shown in waveform H and I, the signal integration prevents undesired SCR firing due to line spikes, because line spikes result in only a minimal distortion in the integrated signal. Thus, firing of SCR's 42, 43 occurs only during desired firing instants and unwanted firing pulses are avoided.

5. Fully On

An additional feature of the invention is that the above-mentioned SCR firing delay is eliminated when rectifier bridge is near full voltage output through the operation of fully-on comparator circuit 30, ramp-removal circuit 24 and the logic of OR circuit 18.

Figure 7:
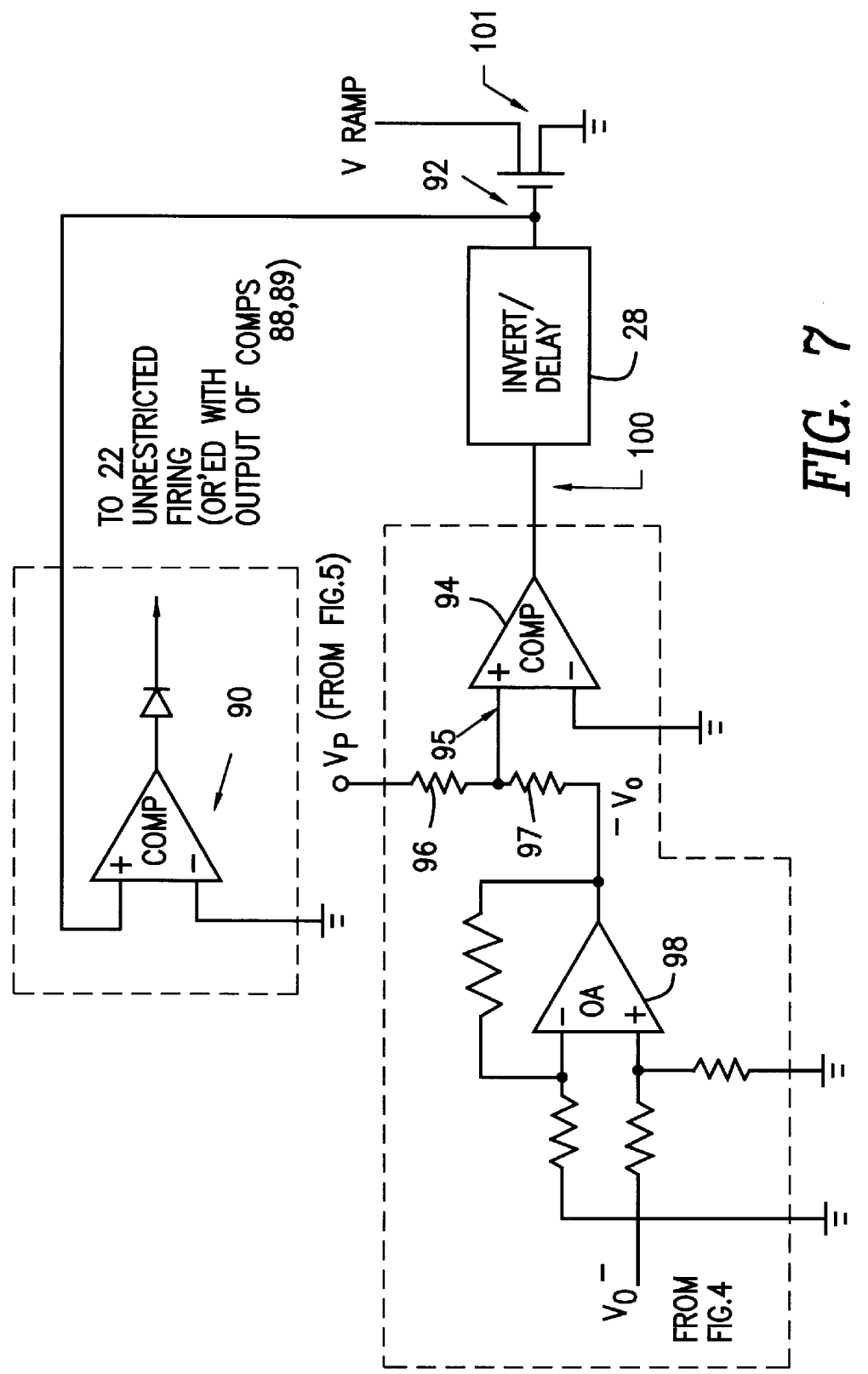
FIG. 7 is a schematic representation of the ramp removal and "fully on" circuitry of the embodiment of FIG. 1.
Figure 8:
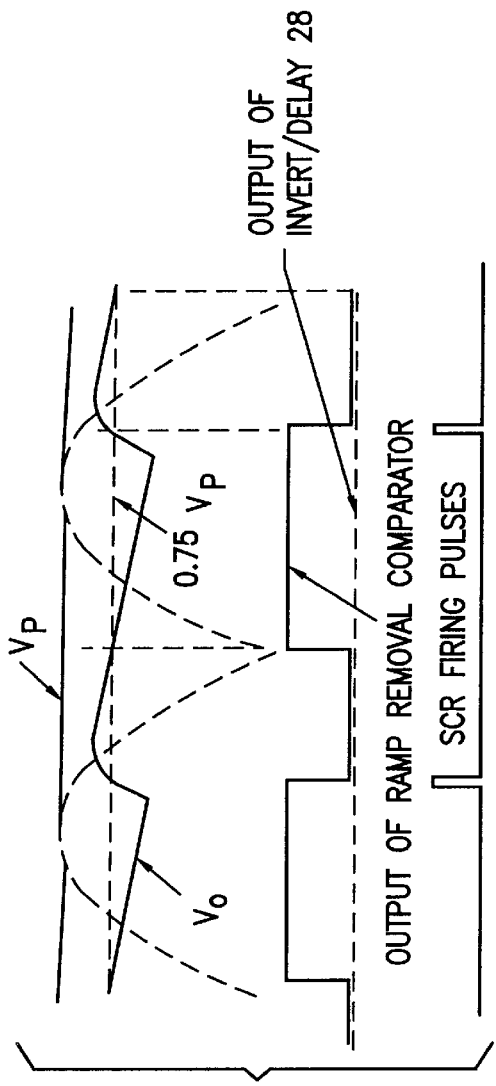
FIG. 8 shows timing diagrams of the operation of the ramp removal circuit.

As shown in FIG. 7, a voltage divider formed by resistors 96, 97 is used to detect when the output voltage $V_O^-$ of the bridge rectifier 4 is near its maximum negative value in ramp-up mode. This is preferably measured in terms of when the magnitude of $V_O^-$ has achieved a predetermined percentage, for example, 75% of $V_P$. As shown in FIG. 8, when such a condition is reached, the output of ramp removal comparator 94 goes low. This low signal is fed to invert/delay circuit 28, whose output (shown by the dashed line in FIG. 8) remains low if the condition is maintained for less than 10 milliseconds. In the situation shown in FIG. 8, the magnitide of $V_O^-$ is not great enough for the condition to be maintained for more than 10 milliseconds. Rather, during that time, the magntidue of $V_O^-$ decreases below the 75% $V_P$ threshold, thus causing the output of ramp removal comparator 94 to go high, such that the output of invert/delay 28 remains low.

Figure 9:
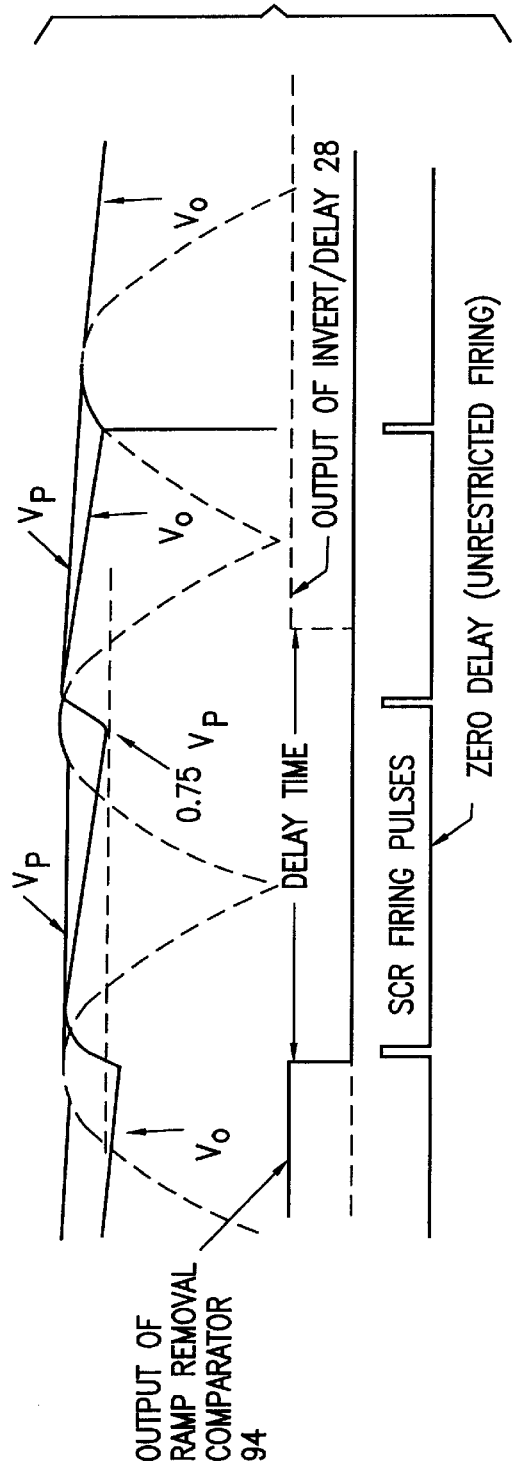
FIG. 9 shows timing diagrams of the operation of the ramp removal circuitry.

However, as shown in FIG. 9, when the magnitude of $V_O^-$ has increased sufficiently high level, more than 10 milliseconds will elapse before it falls below the 75% of $V_P$ threshold, such that the output of invert/delay circuit 28 switches to a high signal. A high signal at the output of invert/delay output 92 causes fully-on comparator 90 to go high, thereby producing unrestricted firing.

At the same time, as shown in FIG. 7, a high signal at the output of invert/delay 28 will turn MOSFET 101 on and pull $V_{RAMP}$ (and thus $V_P$) to ground potential. The 10 millisecond delay before inversion of the output of invert delay 28 prevents premature resetting of $V_P$ 84 prior to the "final leap" to the fully-on condition. If the output of ramp-removal circuit 24 subsequently returns to a high level, the output of invert/delay 28 also will return to a high level, allowing the voltage to rise.

6. Overload/Short Circuit

Figure 10:
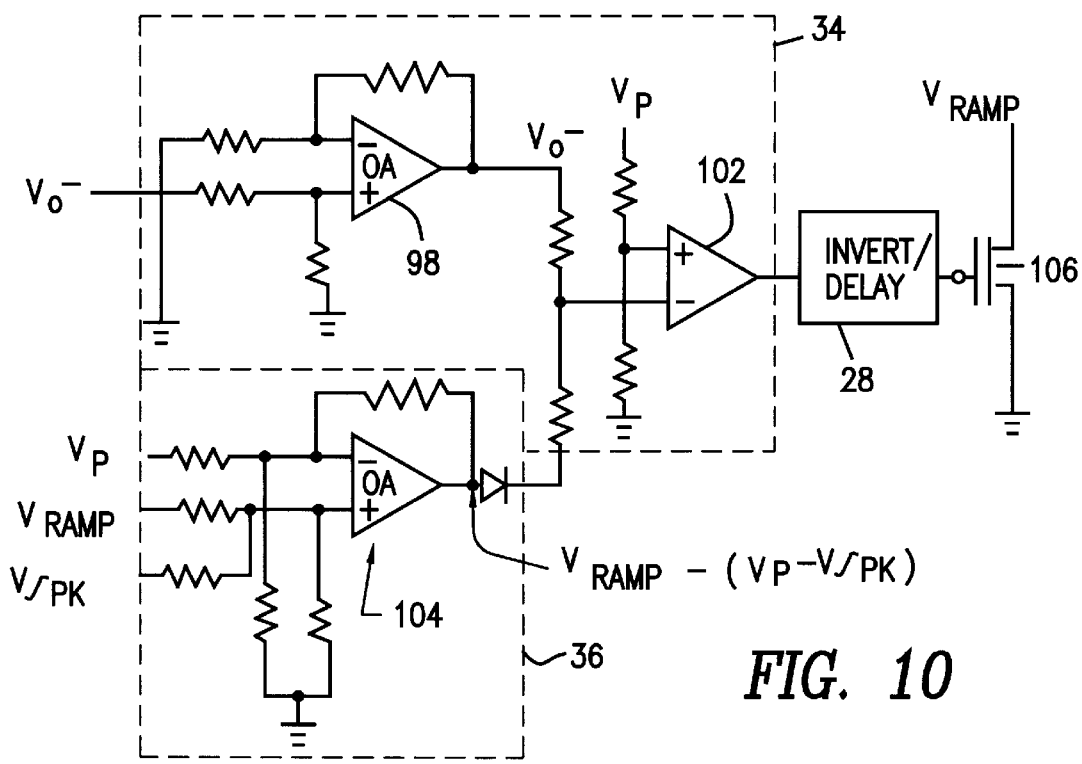
FIG. 10 is a schematic diagram of the watchdog reference and watchdog circuit modules of the embodiment of FIG. 1.

FIG. 10 shows watchdog reference module 36 as it relates to watchdog module 34. Through this circuitry, ramp-up is held back in the event of a short circuit or an excessive load at the output. Once the overload/short circuit condition is removed, ramp-up proceeds normally.

$V_O^-$ is buffered by non-inverting op amp 98 and is subtracted from the signal $V'_{RAMP}$, where $V'_{RAMP}$ represents the quantity $[V_{RAMP} - (V_P - V_{\int PEAK})]$ which is generated by op amp 104 of watchdog reference 36. Note that the voltage $V_{\int PEAK}$ 103 is available from integrators 80, 81 of ramp circuit module 16 (FIG. 5).

Referring to the timing diagram of FIG. 10A, if $V'_{RAMP}$ becomes significantly greater than $V_O^-$, this signifies that $V_O^-$ is not increasing normally in response to $V_{RAMP}$ and that excess current is flowing out of the rectifier. If this condition occurs, the inverting input of comparator 102 ($V'_{RAMP} - V_O^-$) drops lower than the non-inverting input (a specified fraction of $V_P$, e.g. 75%, as determined by a voltage divider), causing the output of watchdog comparator 102 to go high, and $V_{RAMP}$ is reset to zero via the invert/delay circuit 28 and the resulting connection to ground through ramp reset MOSFET 106. The sequence repeats indefinitely so long as the overload remains. Once the overload condition is removed, the watchdog comparator 102 goes low, $V_{RAMP}$ is released, and normal ramp-up commences.

FIG. 10B shows that SCR firing is immediately phased back if an overload/short circuit occurs during normal operation, thus limiting the overload current. As can be seen, the output of ramp removal comparator 94 immediately goes high if an abnormal load is applied. Since $V_P$ is already reset to zero, the SCR firing point is immediately phased back towards 180°. Watchdog comparator 34 then keeps the SCRs phased back until the overload/short circuit is removed.

Figure 10C:
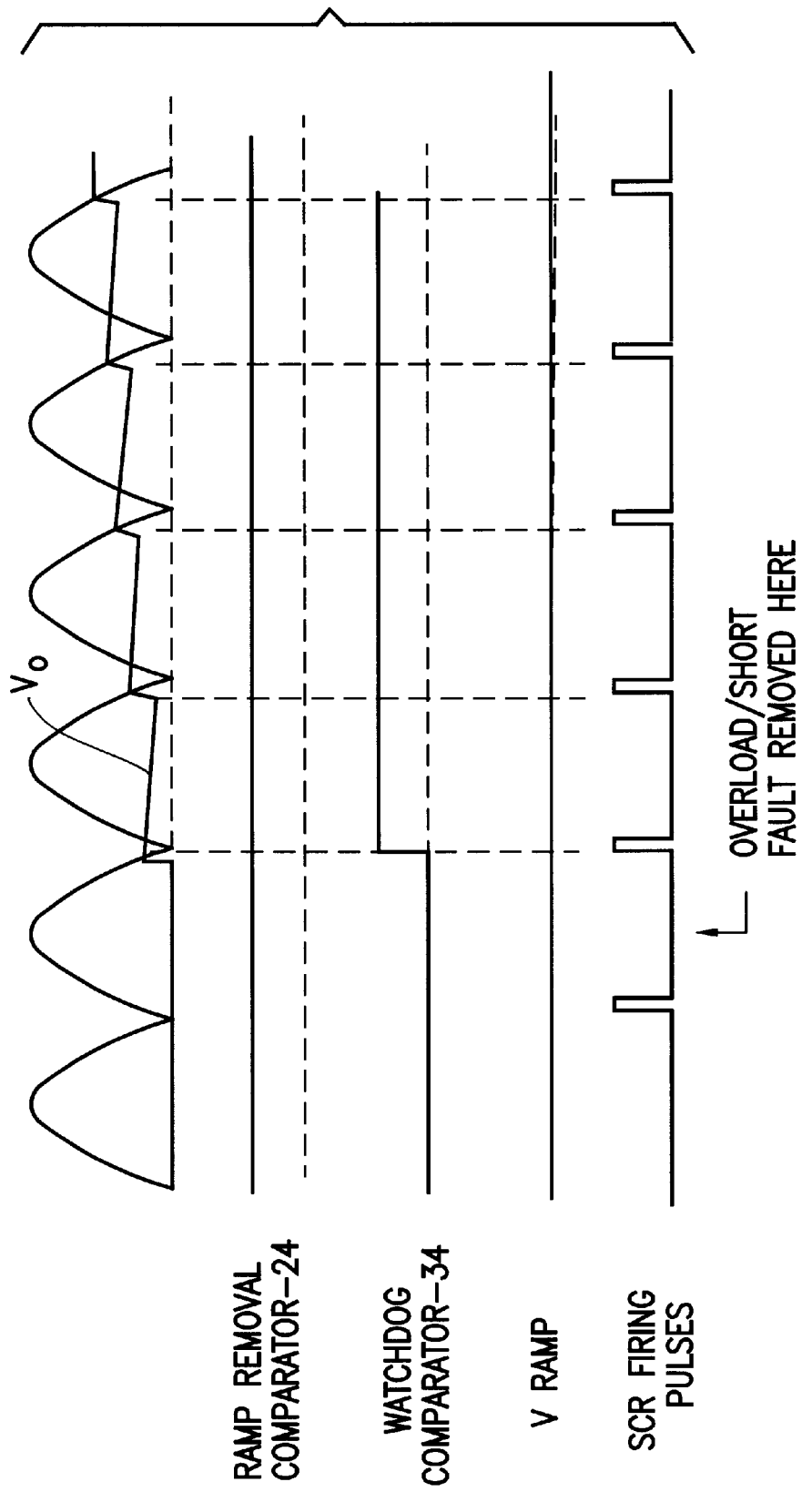

FIG. 10C shows how the rectifier circuit of the present invention automatically re-initiates the soft-start when the overload/short circuit is removed. Specifically, the removal of the overload/short circuit condition causes watchdog comparator 34 to go low, and normal ramp-up commences.

7. Transient Loss of Line

A further feature of the invention is the ability to re-start the ramp-up process correctly after transient loss of line.

Figure 11:
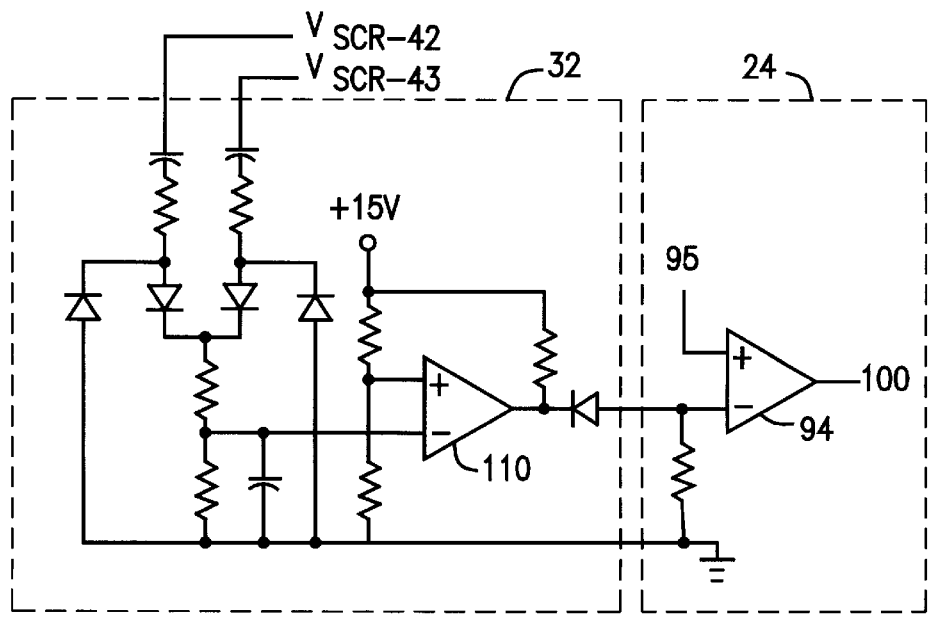
FIG. 11 is a schematic diagram of the fast UV circuitry of the embodiment of FIG. 1.

FIG. 11 shows fast undervoltage (UV) circuitry 32 connected to ramp-removal circuitry 24. Fast UV circuitry 32 receives the voltage across the two SCRs 42, 43 ($V_{SCR\ 42,43}$) and immediately causes ramp removal comparator 94 to go high when that voltage drops below a predetermined threshold, signifying that line voltage has been at least temporarily lost. The high output from ramp removal comparator 94 resets $V_{RAMP}$ (as discussed previously), such that, when line voltage returns, the rectifier re-soft starts. As shown in FIG. 11A, without fast UV circuitry 32, $V_O$ would suddenly jump up when the line voltage returned.

8. Undervoltage Lockout

Figure 12:
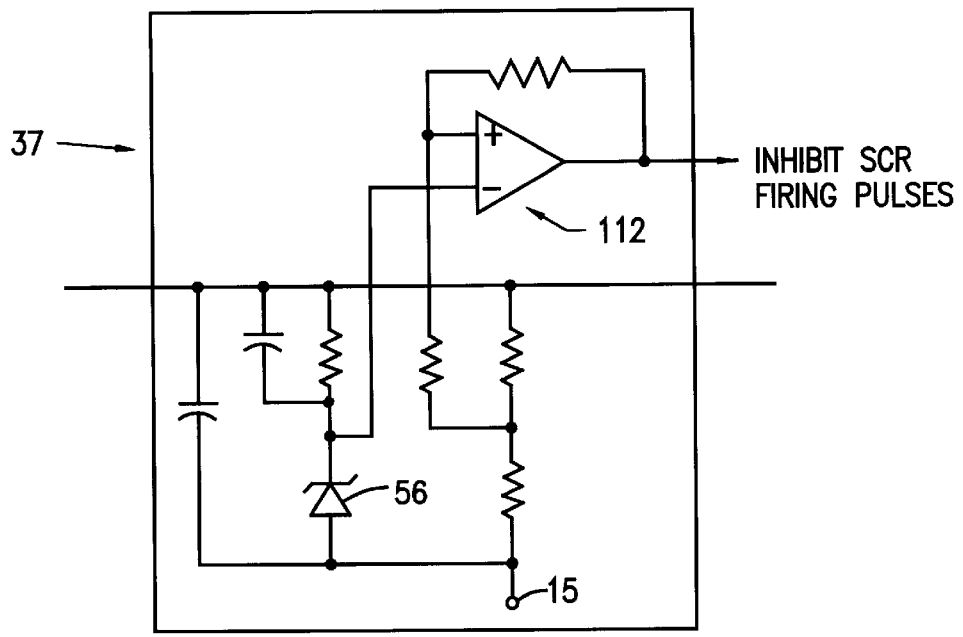
FIG. 12 is a schematic diagram of the housekeeping undervoltage lockout circuitry of the embodiment of FIG. 1.

FIG. 12 is a circuit diagram of undervoltage lockout module 37 showing the undervoltage lockout feature of the present invention. Undervoltage lockout comparator 112 goes high and inhibits SCR firing pulses when −15V zener diode 56 is in conduction. As a result, SCR firing pulses are inhibited when housekeeping voltage is insufficient to drive the control circuitry.

9. Power Factor Boost Converter

Figure 13:
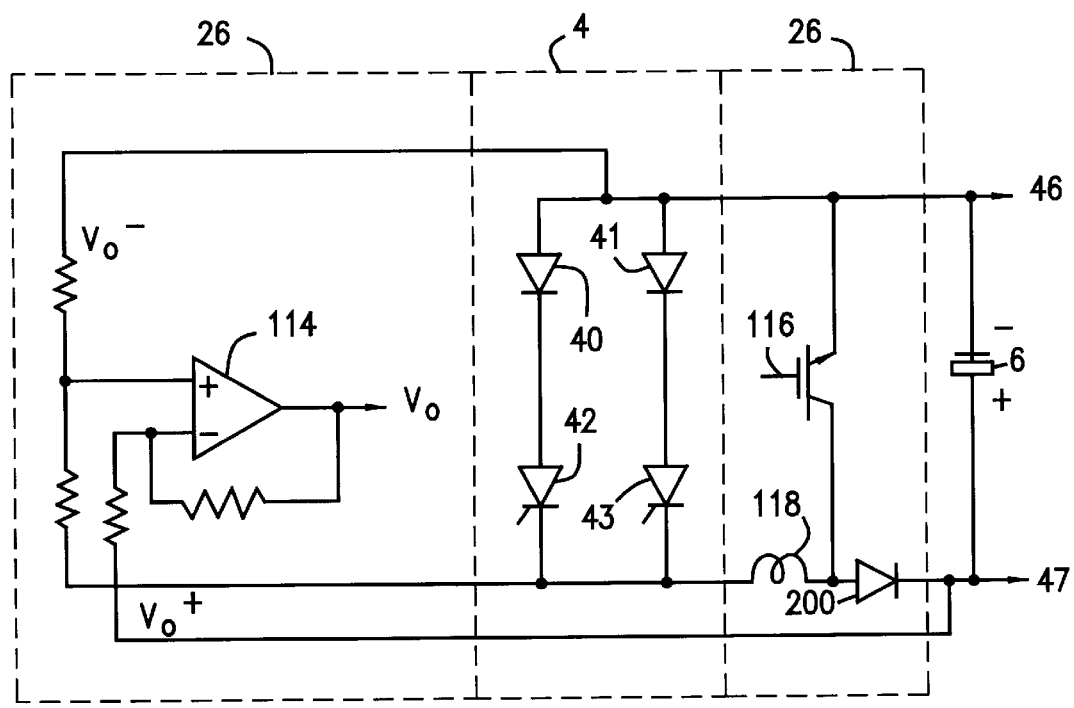
FIG. 13 is a schematic diagram of the embodiment of FIG. 1 with power factor correction circuitry.

FIG. 13 shows the implementation of a power factor correction boost converter 26 in the soft start circuit of the invention. Boost converter 26 comprises an IGBT 116, a dc inductor 118 and a diode 200.

The operation of power factor correction boost converter 26 is as follows. Diodes 40, 41, and SCRs 42, 43 are allocated a possible conduction window of 180°. This window is dictated by the instantaneous polarity of the line voltage at input terminals 2. During one half cycle of the line voltage, diode 41 and SCR 42 can conduct, so long as they are not reverse biased by the output voltage $V_O$. They cannot conduct during the other half cycle of line voltage, regardless of the output voltage. Likewise, during the other half cycles, diode 40 and SCR 43 are also allocated a possible conduction window of 180°.

The function of boost converter 26, with dc inductor 118, diode 200 and IGBT 116, is to force diodes 40, 41 and SCRs 42, 43 to fully use their allocated conduction windows, and in so doing, to shape a half-sinusoidal envelope of current in each of diodes 40, 41 and SCRs 42, 43. A sinusoidal envelope of ac line current is thereby created.

Only the voltage on output capacitor 6 must be sensed for the soft start circuit. The capacitor voltage can be obtained by an additional sensing point between the cathode of diode 200 and the positive terminal of capacitor 6. The voltage at this point ($V_O^+$) is input to a differential amplifier 114, from which it is supplied to watchdog circuitry 34 and ramp removal circuitry 24.

Figure 14:
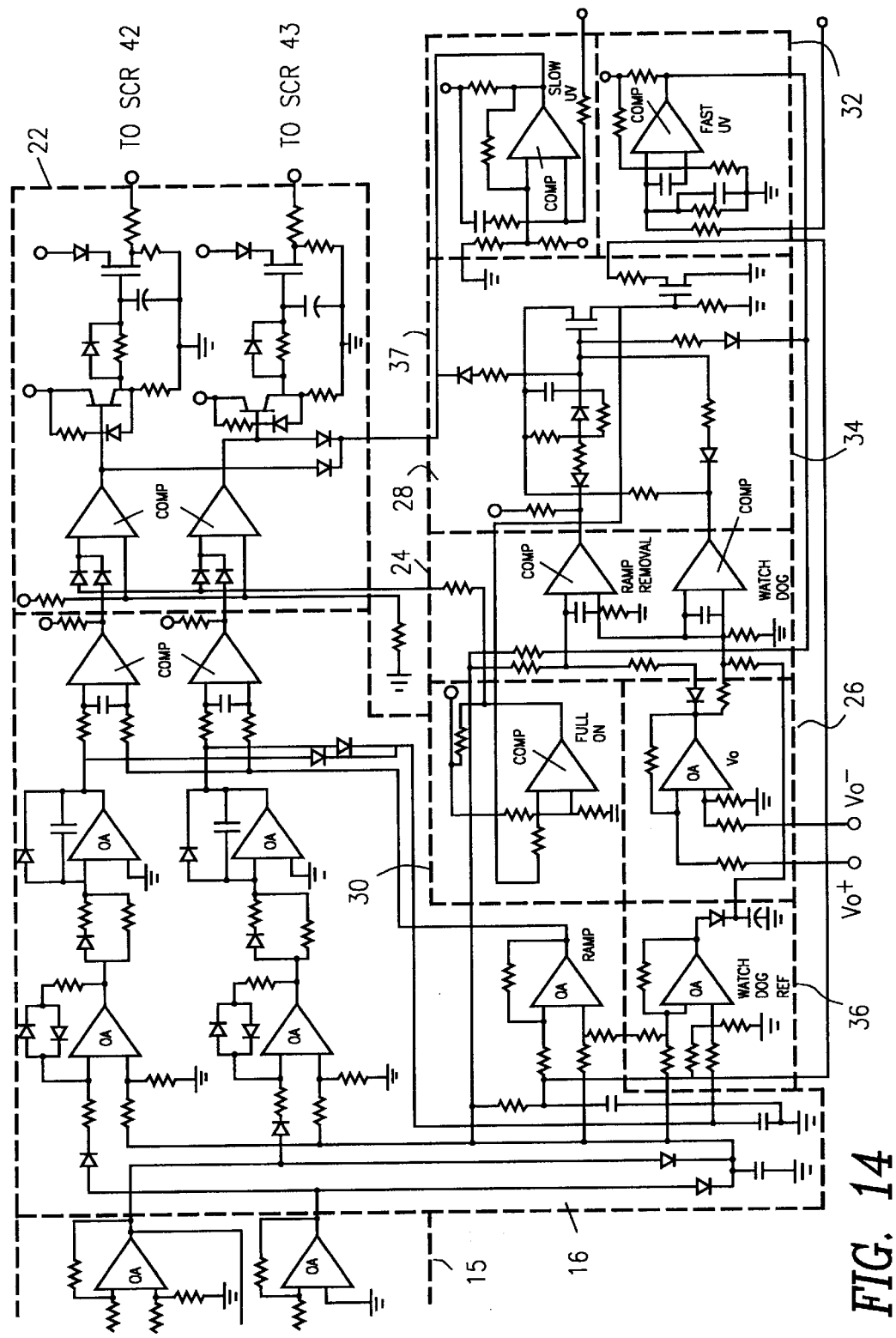
FIG. 14 is a schematic diagram of the overall control circuitry of the embodiment of FIG. 1 in a single phase embodiment.
Figure 15:
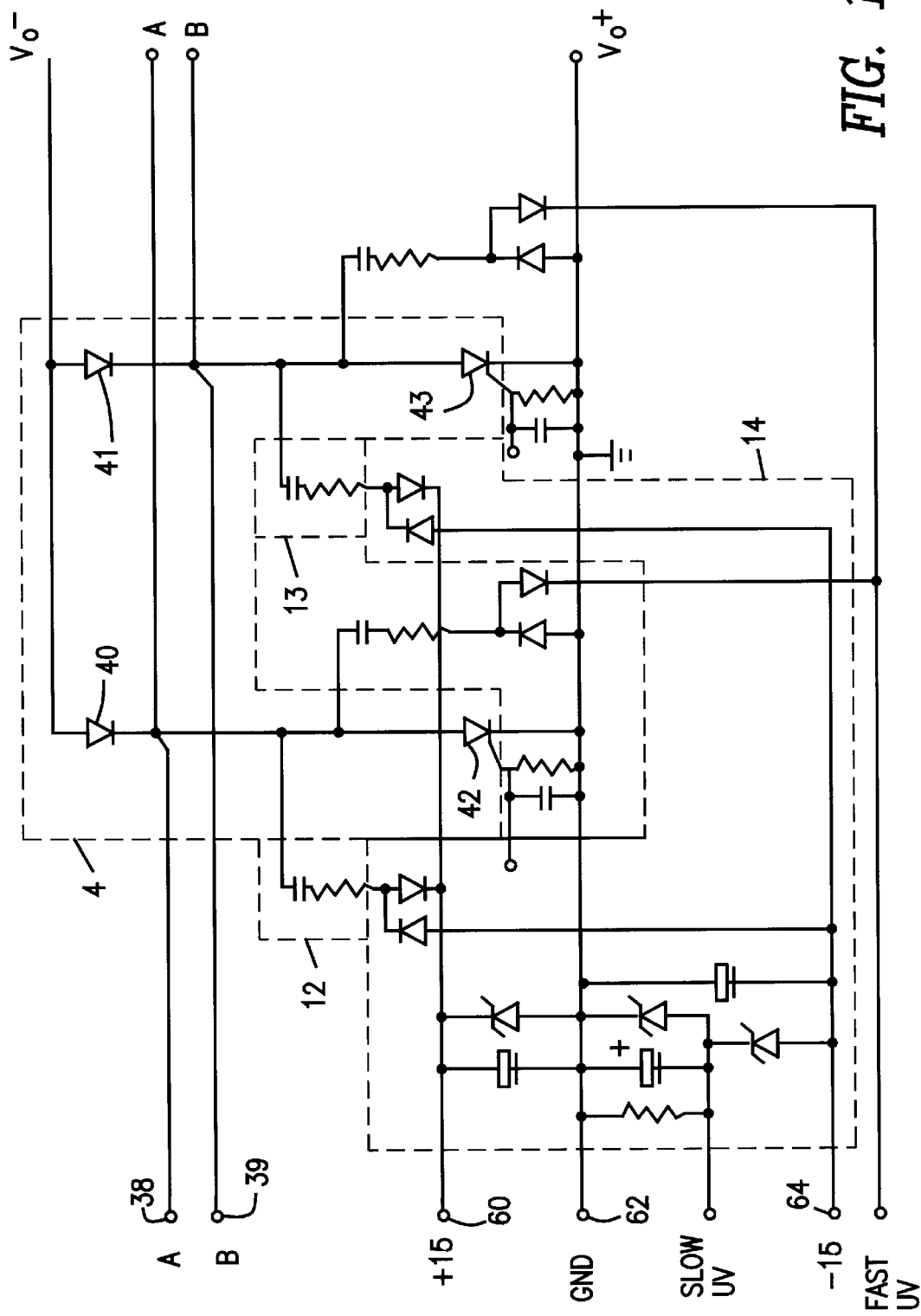
FIG. 15 is a schematic diagram of the bridge rectifier circuit 14 of the embodiment of FIG. 1 in a single phase embodiment.

FIG. 14 shows control circuit 10 in its entirety. FIG. 15 is a circuit diagram of bridge rectifier 4 with snubbers 12, 13 and housekeeping power supply module 14.

10. Alternative Embodiments

The following alternative embodiments are provided as illustrative examples, in which like circuit components from the above-described preferred embodiment are designated with like numbers.

Figure 16:
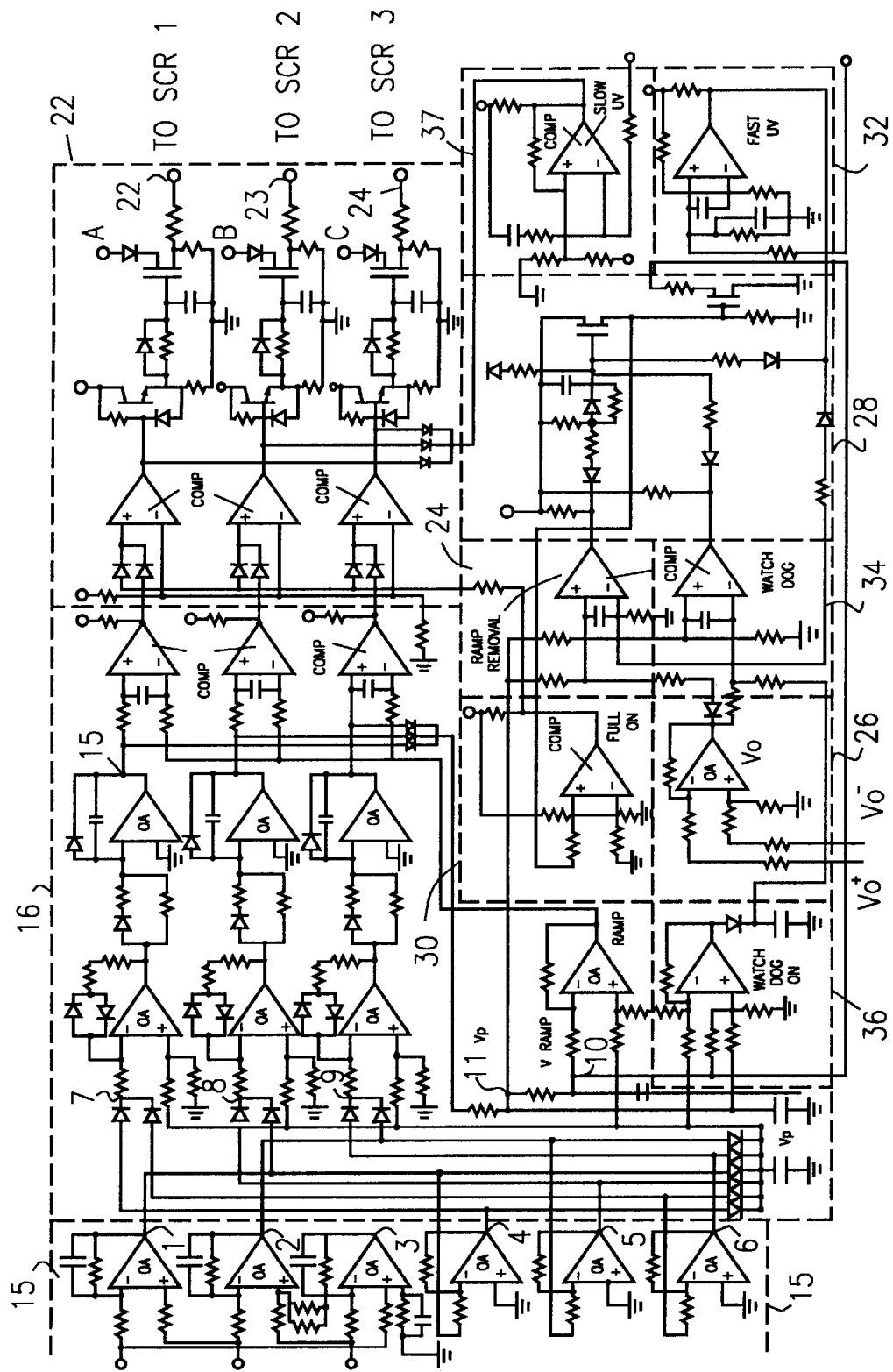
FIG. 16 is a schematic diagram of the overall control circuitry of the embodiment of FIG. 1 in a three-phase embodiment.
Figure 16A:
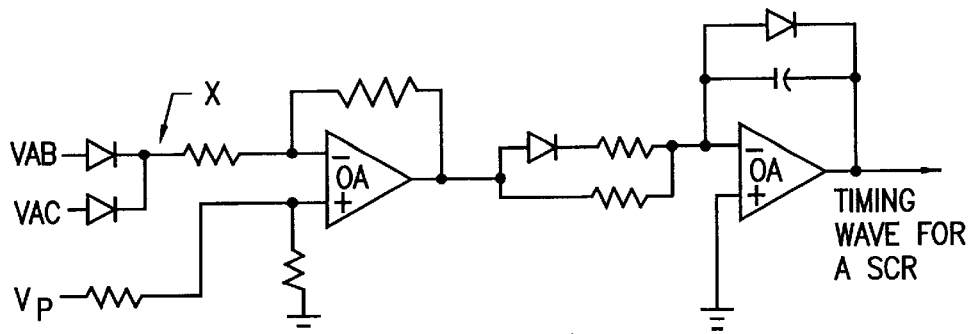
FIG. 16A shows the ramp circuitry of this embodiment.
Figure 16B:
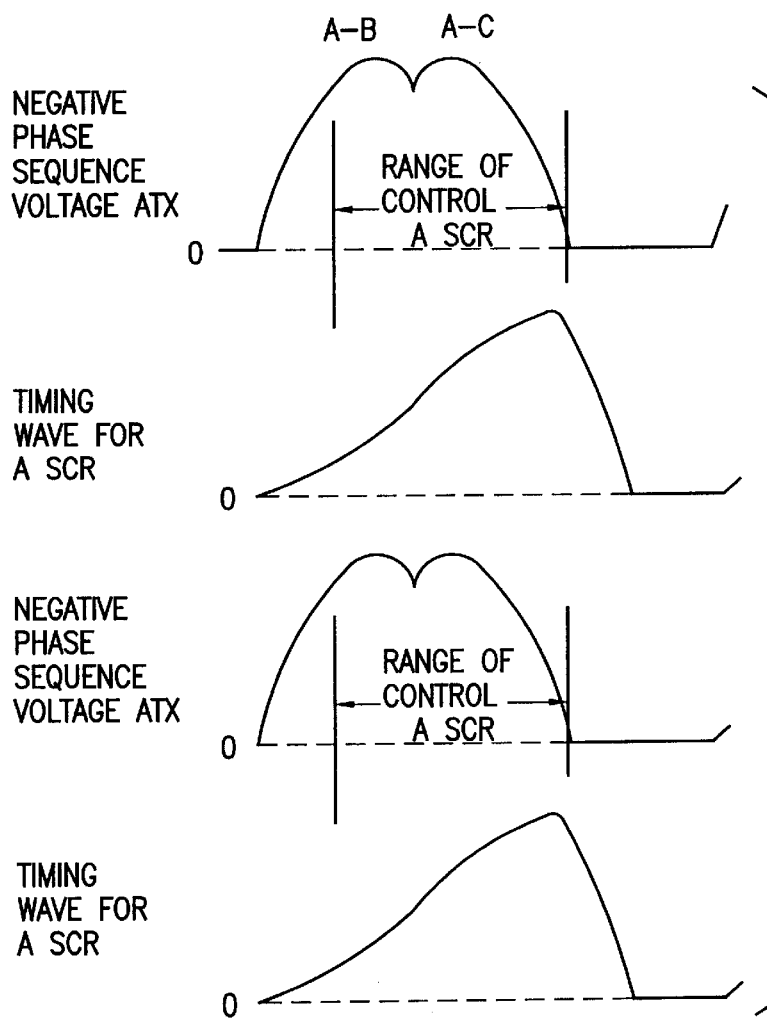
FIG. 16B is a timing diagram showing the operation of the ramp circuitry.
Figure 16C:
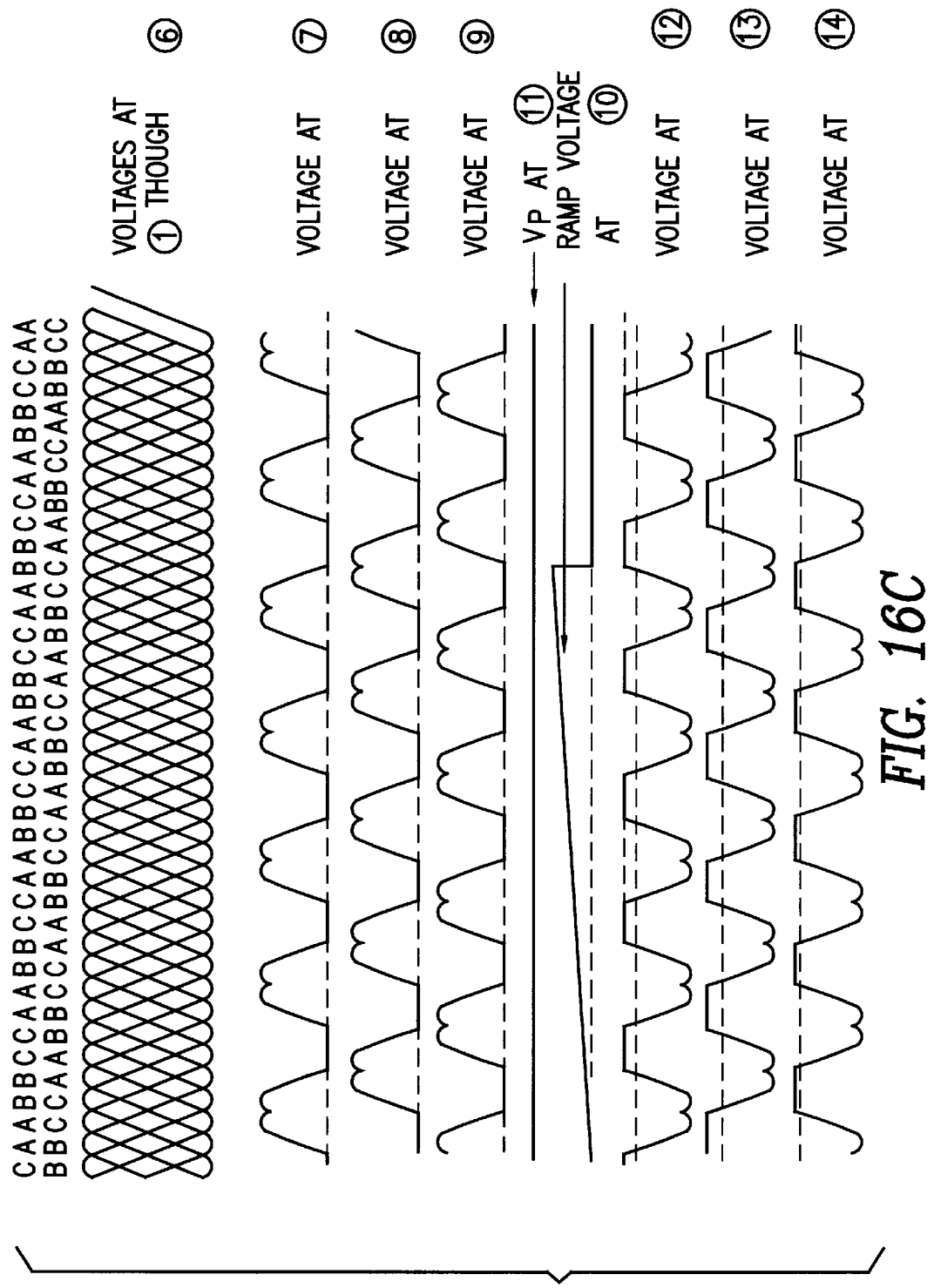
FIG. 16C is a timing diagram showing the waveforms at various points of the three-phase control circuitry of FIG. 16.
Figure 16C:
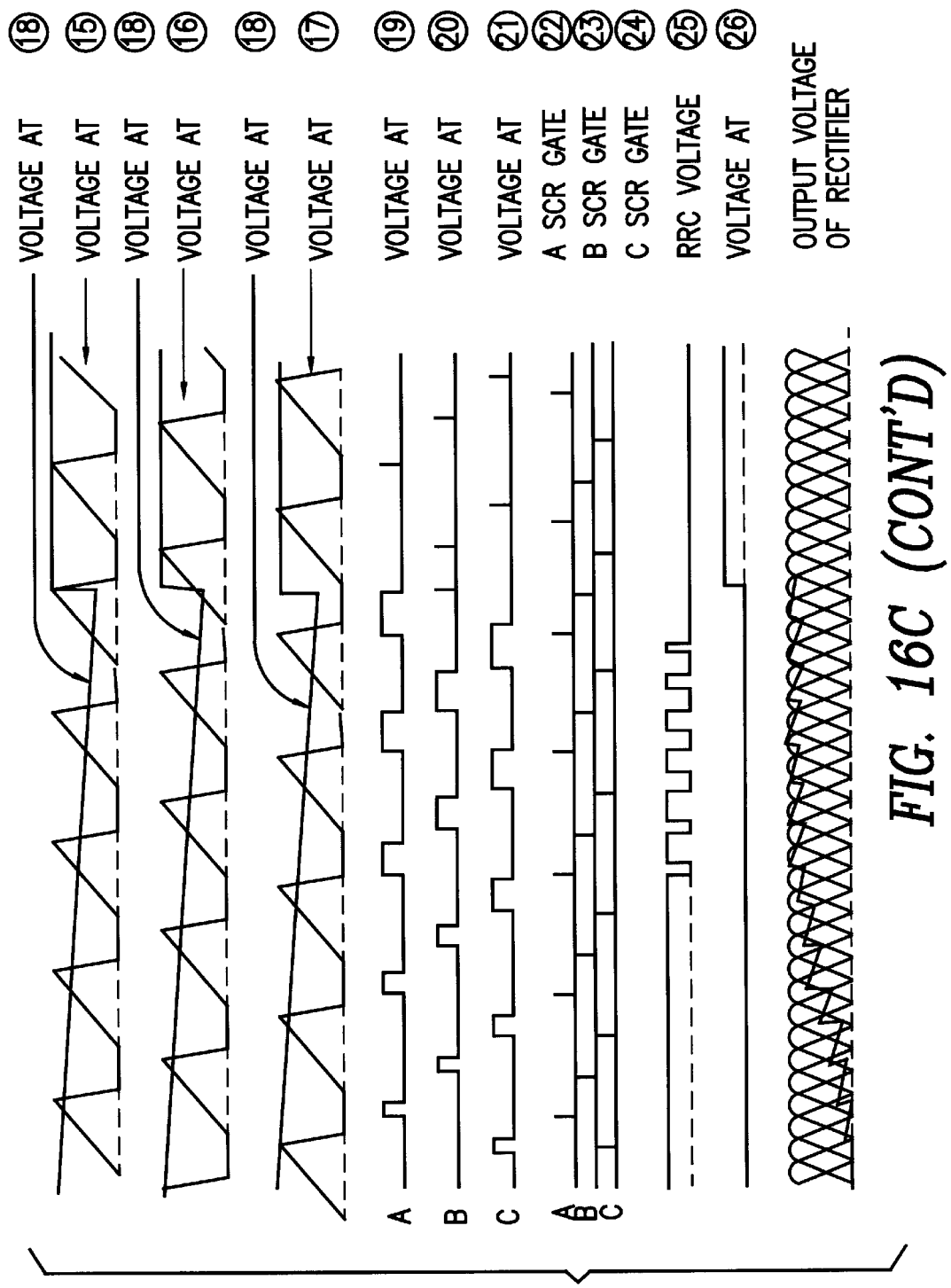

FIG. 16 shows a control circuit for a three-phase bridge rectifier circuit. Advantageously, the control circuit is designed such that it is insensitive to phase rotation. Thus, the SCR timing waveform produced by the ramp circuitry (ramp circuitry is shown in detail in FIG. 16A) spans the required range of phase-control, regardless of phase sequence, as shown in the timing diagram of FIG. 16B. FIG. 16C is a timing diagram showing the waveforms during ramp-up at various points of the three-phase control circuitry of FIG. 16.

Figure 17:
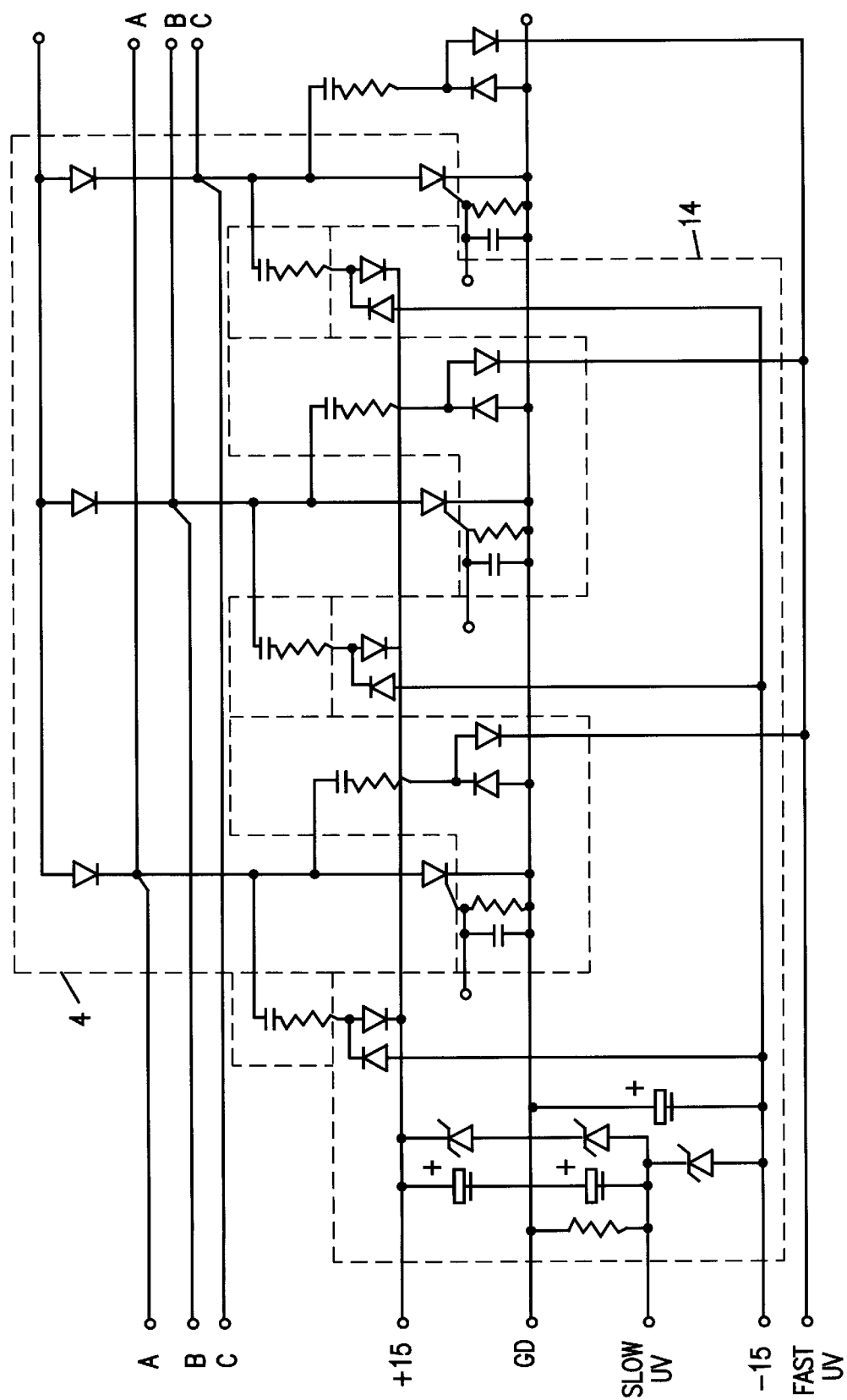
FIG. 17 is a schematic diagram of the three-phase bridge rectifier corresponding to the control circuit of FIG. 16.

FIG. 17 shows the three-phase bridge rectifier circuit corresponding to the three-phase control circuit of FIG. 16.

Figure 18:
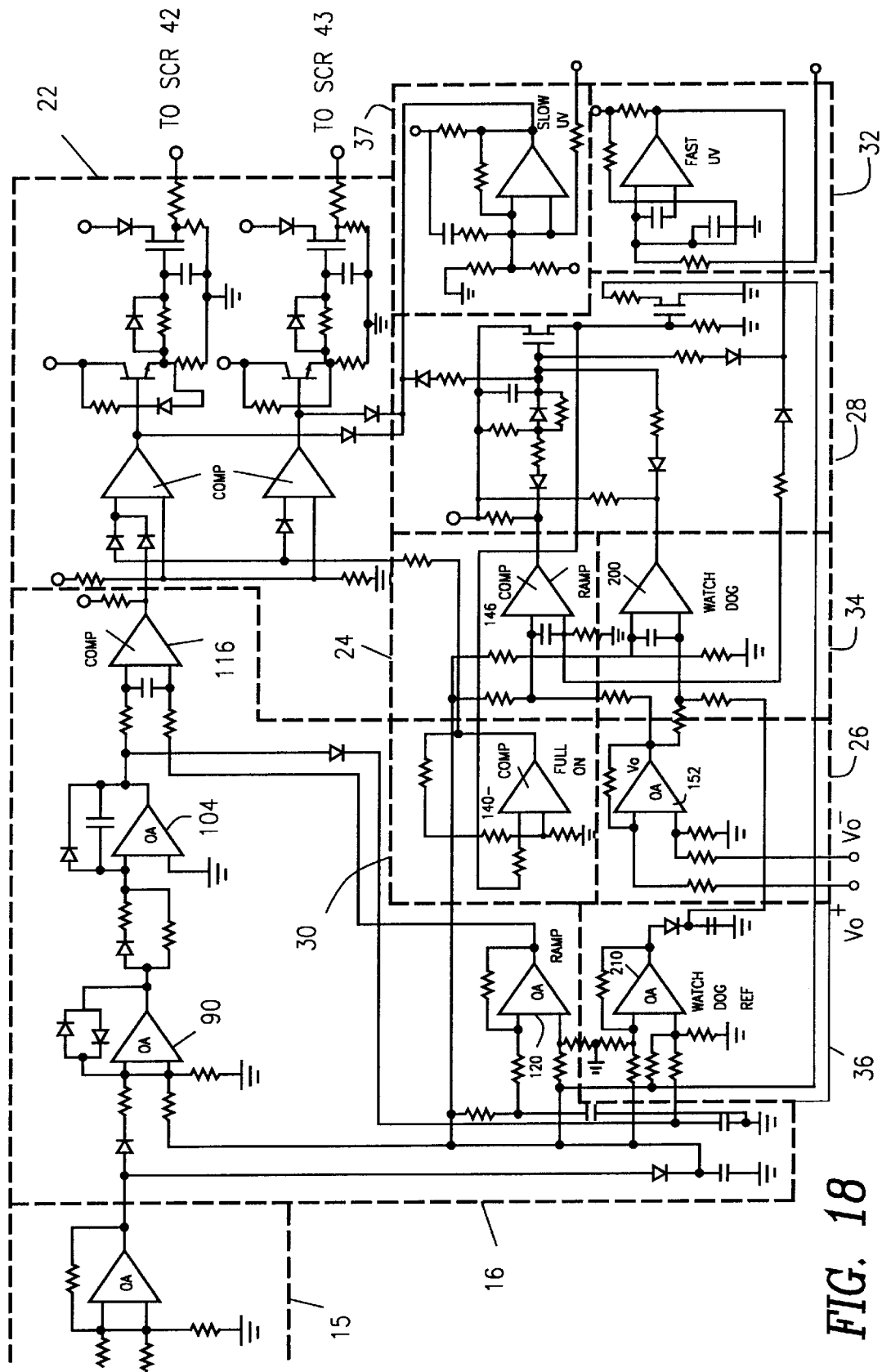
FIG. 18 is a schematic diagram of a "one-cylinder" single phase soft start control circuit embodiment of the present invention.
Figure 19:
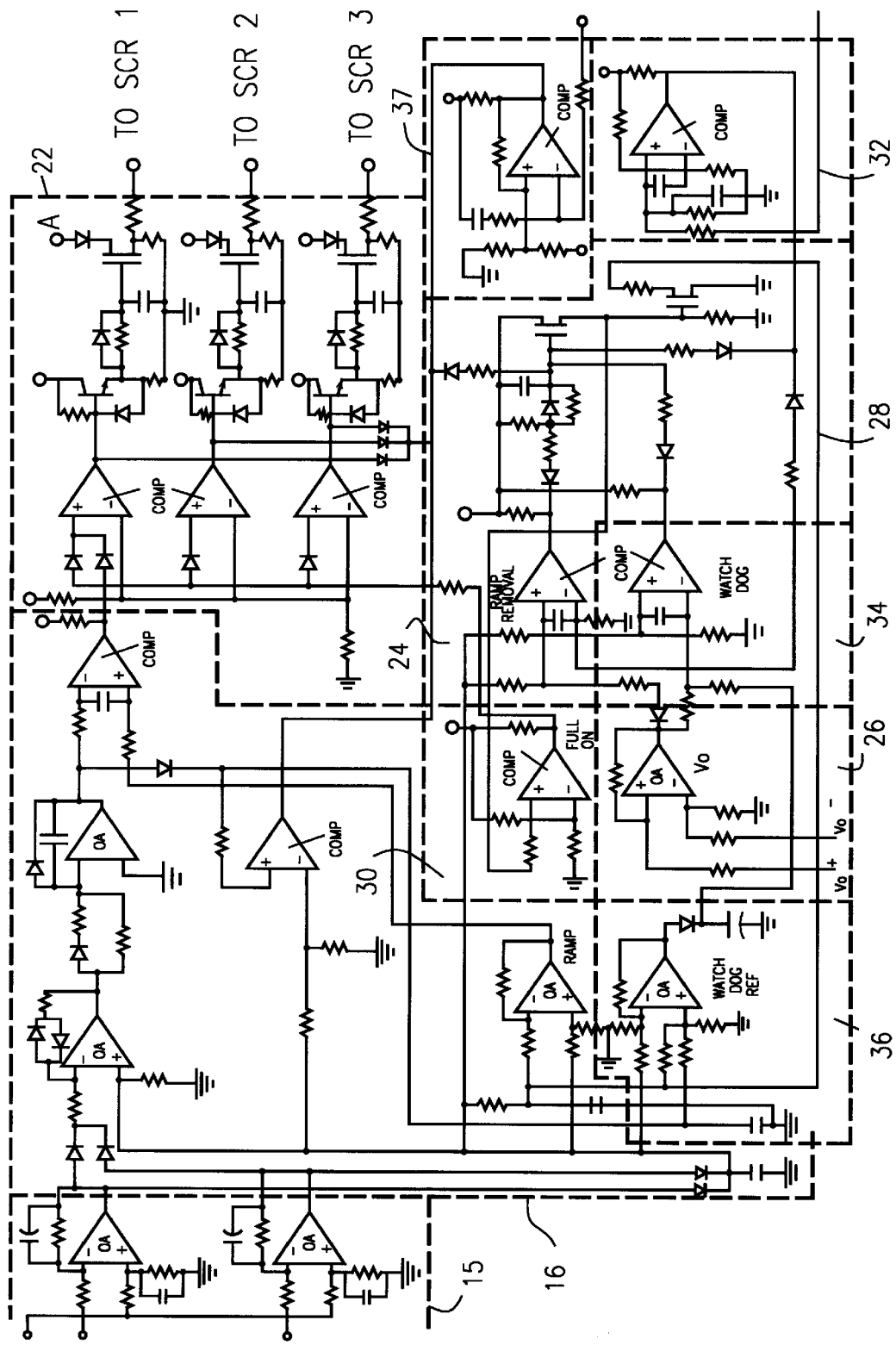
FIG. 19 is a schematic diagram of a "one-cylinder" three-phase soft start control circuit embodiment of the present invention.

FIGS. 18 and 19 shows a further alternative embodiment of the invention, which is best described as a "one-cylinder"

start-up option. FIG. 18 shows the circuitry of the "one-cylinder" start-up option for a single phase bridge. FIG. 19 shows circuitry of the "one-cylinder" start-up option for a three-phase bridge.

The "one-cylinder" circuitry achieves ramp-up, in both the single-phase and three-phase embodiments of FIGS. 18 and 19, respectively, using only one SCR. The remaining one (single phase bridge) or two (three phase bridge) SCRs remain off until the ramp removal comparator allows unrestricted firing of all SCRs. This "one-cylinder" embodiment of the invention requires less ramp-up circuitry and is particularly adapted for applications with lower load conditions. However, start-up under load may be more difficult. Also, in the three-phase embodiment, if the "phase-control" phase is missing, start-up will not occur.

Figure 20:
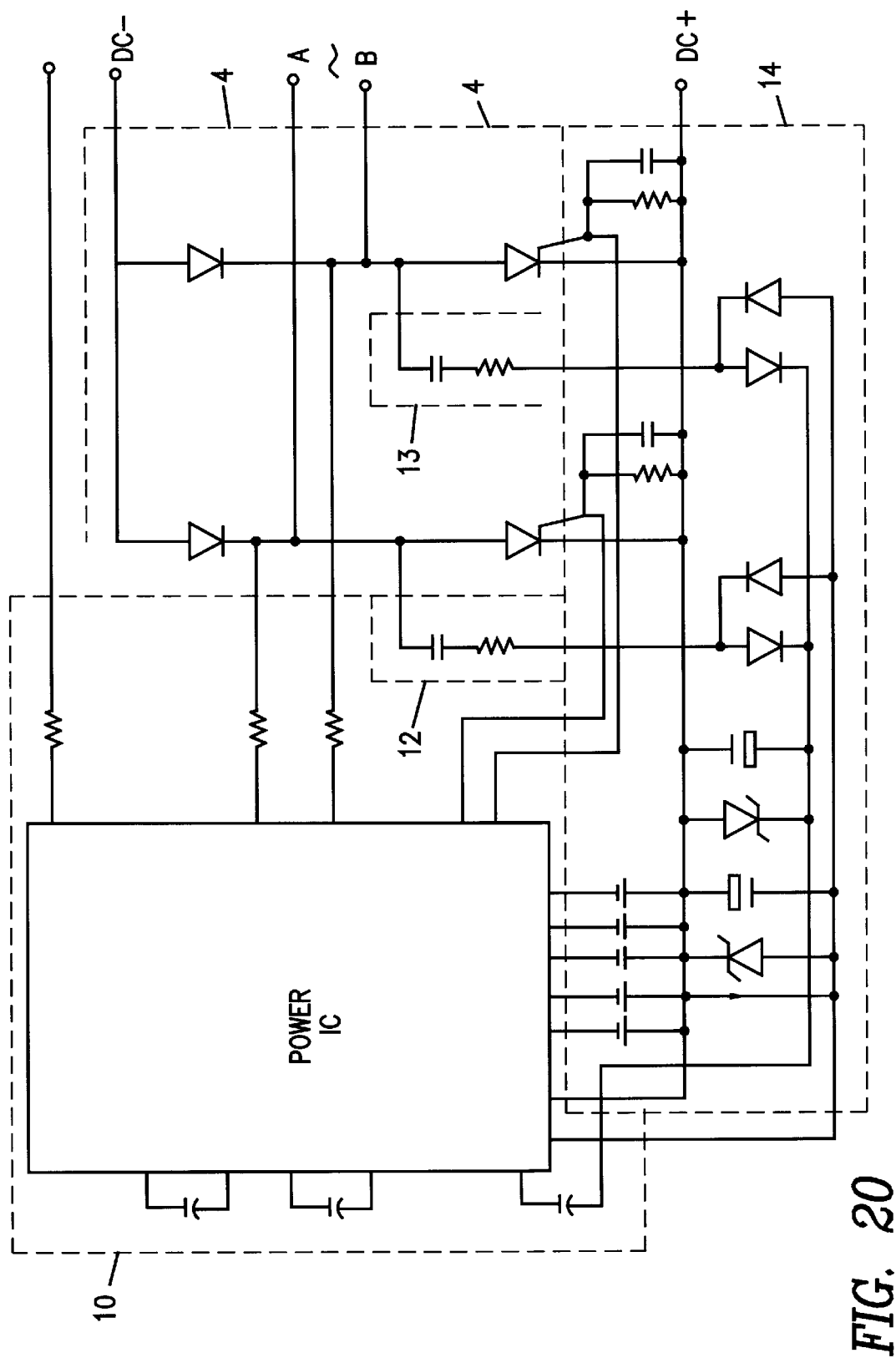
FIG. 20 is a schematic diagram of a single phase embodiment of the present invention utilizing a power integrated circuit.

FIG. 20 is a schematic diagram of a one-phase version of the present invention in which control circuit 10 is a power integrated circuit.

Figure 21:
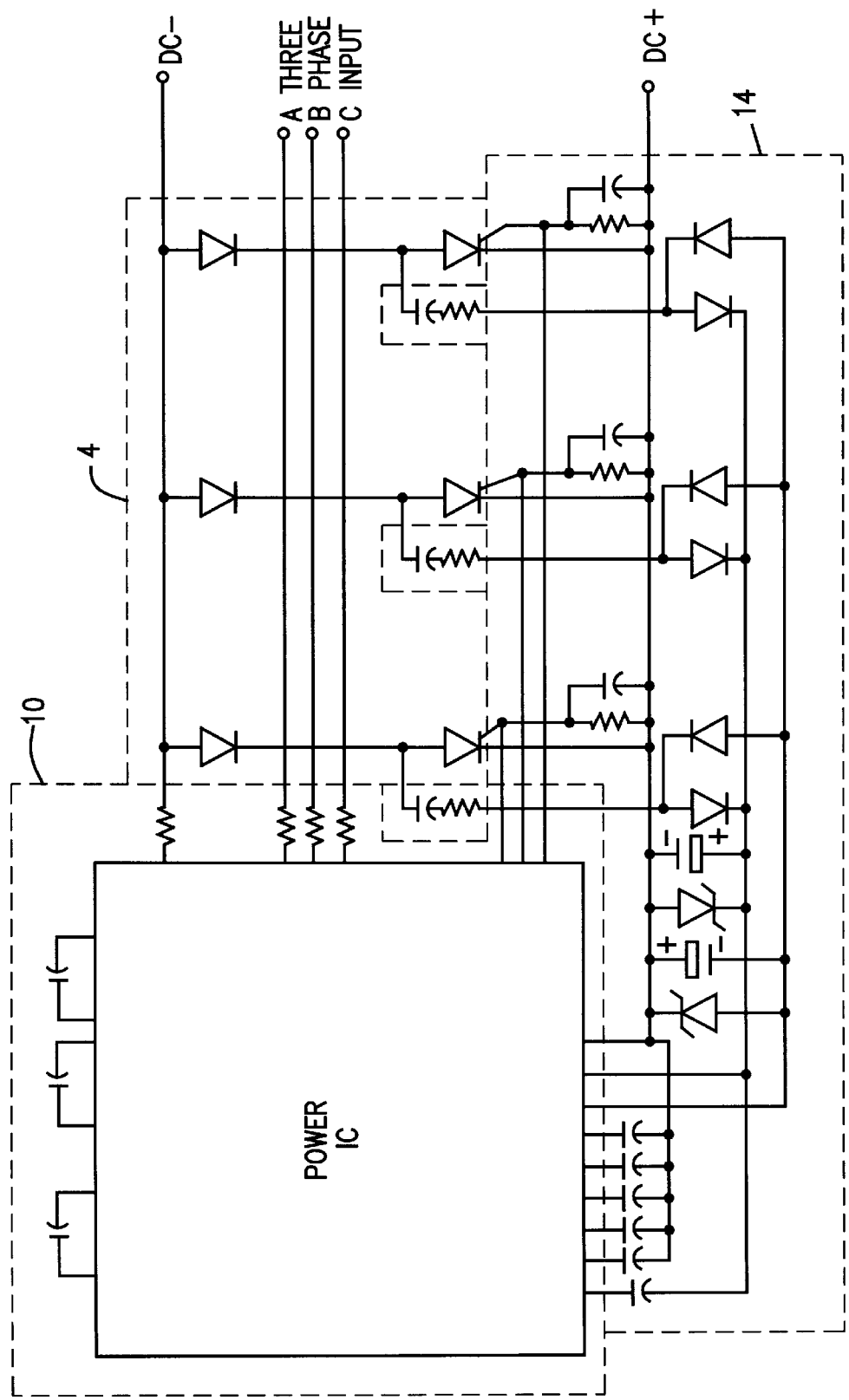
FIG. 21 is a schematic diagram of a three-phase embodiment of the present invention utilizing a power integrated circuit.

FIG. 21 is a schematic diagram of a three-phase version of the present invention in which control circuit 10 is a power integrated circuit.

Figure 22:
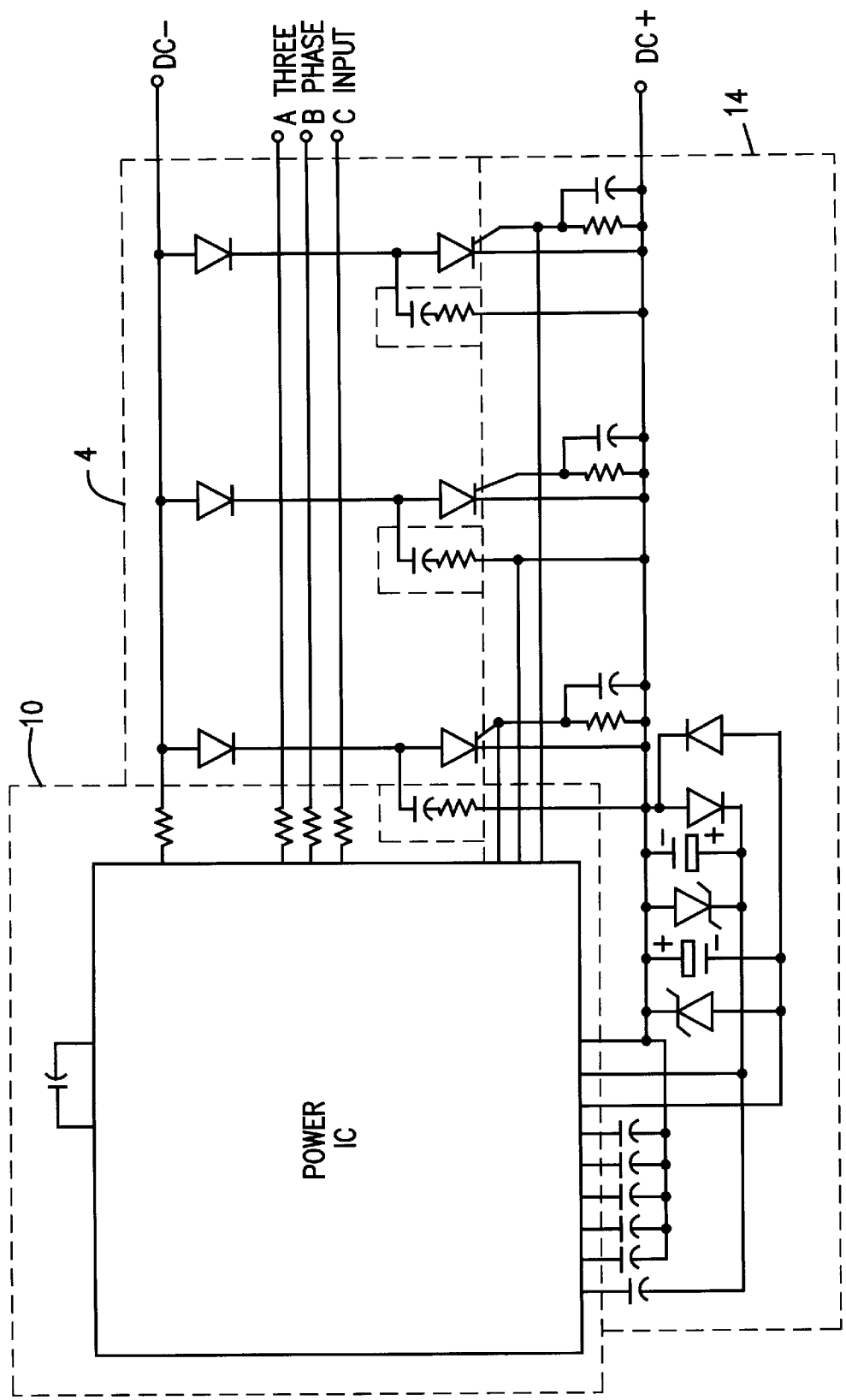
FIG. 22 is a schematic diagram of the three-phase bridge rectifier in the "one cylinder" soft start embodiment of the present invention utilizing a power integrated circuit.

FIG. 22 is a schematic diagram of the three-phase bridge rectifier in the "one-cylinder" start up version of the present invention in which control circuit 10 is a power integrated circuit.

II. Alternative Soft Start Rectifier with Control IC

Figure 23:
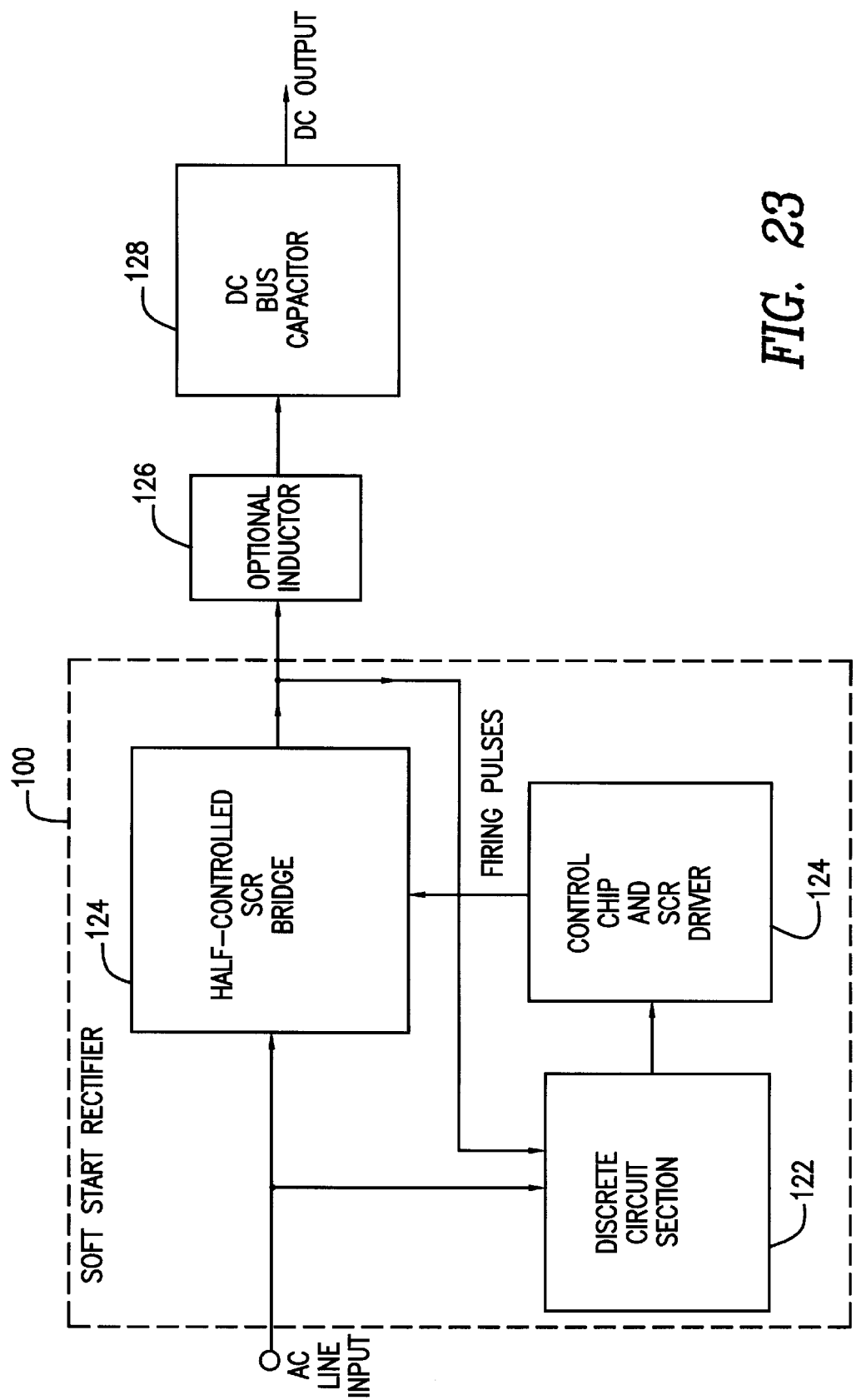
FIG. 23 is a block diagram of the overall circuitry of another embodiment of the present invention.

An alternative soft-start rectifier using phase-controlled SCRs to limit the charging current of the dc bus capacitor is partitioned into the basic building blocks shown in FIG. 23. The blocks are as follows:

A half-controlled SCR bridge 124 provides ac to the dc rectification, with control of the amplitude of the output voltage, by phase-control of the firing pulses for the SCRs.

The ability to control the output voltage allows the charging current for the dc bus capacitor to be controlled whenever an abnormal imbalance exists between the bus capacitor voltage and the input line voltage. Such an imbalance generally occurs when the ac line is switched on, after a temporary line voltage outage, or when the dc output is overloaded. The ability to control the output voltage also allows the dc bus voltage to be regulated to a predetermined level during normal operation.

A discrete circuit section 122 provides: (i) dv/dt R-C snubbers, to prevent unwanted dv/dt firing of the SCRs; (ii) derivation, via the snubbers, of the low-level dc supply voltage needed for the control IC and SCR driver 120; (iii) attenuation and feedback of high voltage signals from the SCR bridge 124 for control purposes; and (iv) individual discrete components, mainly small capacitors, that are too large to integrate into the control IC but are necessary for its operation.

A control IC delivers line-synchronized phase-controlled timing pulses to the SCR driver in response to voltage feedback signals from the SCR bridge 124. The timing of the pulses is controlled by the IC to achieve the desired system operation. The duration of the timing pulses is dynamically set to be sufficient to turn on the SCRs and is generally several microseconds. By minimizing the SCR firing pulse duration, the average current drain on the control power supply is minimized.

An SCR driver boosts the timing pulses to the level needed to fire the SCRs. The SCR driver also may be integrated into the control IC when cost effective.

It is desirable that the soft start rectifier have the following functions and specifications:

1. Automatic phase-control of the SCR firing pulses that serves to ramp-up the dc output voltage and limit the charging current in the dc bus capacitor when the ac input line is switch on. The maximum permissible time from line switch-on to full dc bus voltage is typically 200 ms.

2. The soft start rectifier should operate from either a 3-phase or a 1-phase line input.
3. The soft-start rectifier should be insensitive to input phase rotation.
4. Operation should be maintained even when one input phase is lost during 3-phase operation.
5. Automatic phase-controlled ramp-up of dc bus voltage should be present after momentary loss of line voltage. The full dc bus voltage should be restored within k×200 milliseconds, where k is the per-unit loss of dc bus capacitor voltage during the line stage.
6. SCR firing pulses are to be held back if the rectifier output is overloaded or short-circuited when the ac line is switched on, thereby preventing increase of dc bus voltage and limiting the fault current.
7. SCR firing pulses are to be phased back within a half-cycle when overload occurs during normal operation, thus limiting the duration of fault current to, at most, a half-cycle.
8. The soft-start rectifier should operate whether or not a smoothing inductor or a PFC boost inductor is included at the rectifier output.
9. Automatic regulation of the steady-state dc bus voltage to a predetermined value at input line voltage above a predetermined minimum should be included. The predetermined bus voltage is to be determined by a chosen value of a fixed resistor that is external to the control IC.
10. The soft-start rectifier should operate over a preferred range of input voltage, typically from at least from 70% to 130% of nominal line operating voltage. Below the minimum line voltage, the firing pulses are not delivered to the SCRs, and the rectifier is shut down.
11. The rectifier should operate at the following nominal ac line voltages:
    (a) at 115V, 1-phase operation;
    (b) at 208/220/240V, 1-phase and 3-phase operation; and
    (c) at 380/440/480/560V, 3-phase operation that continues operation with one phase missing.
12. The half-controlled SCR bridge 124 and the discrete circuit section 122 may differ for each of the above line voltage categories. The control IC and buffer amplifier should be common for all voltages.
13. The maximum current consumption of the control IC in combination with the SCR driver should preferably not exceed 5 mA.
14. The ratings of the rectifier bridge will range from 5 A to 1000 A. The control IC should be common to all current levels. The design of the SCR driver, if separate from the control IC, may change, if necessary, for different levels of rated rectifier output current.
15. The baseline SCR firing pulse output of the buffer amplifier should be 12 to 15V for an open circuit, and 500 MA of short-circuit current. The pulse rise time is typically 1 $\mu$s maximum.
16. The operating ambient temperature range should be −40° C. to +85° C. The maximum operating temperature of the control IC 120 should preferably be 125° C. to allow integration of the control IC and buffer amplifier into a power rectifier package.
17. Status feedback signals are to be included for low line voltage and loss of one input phase. These signals should be capable of driving 0.5 mA into an opto-isolator, such as an HPCL 0701, to provide isolated status feedback.

1. 3-phase soft-start rectifier power section

Figure 24:
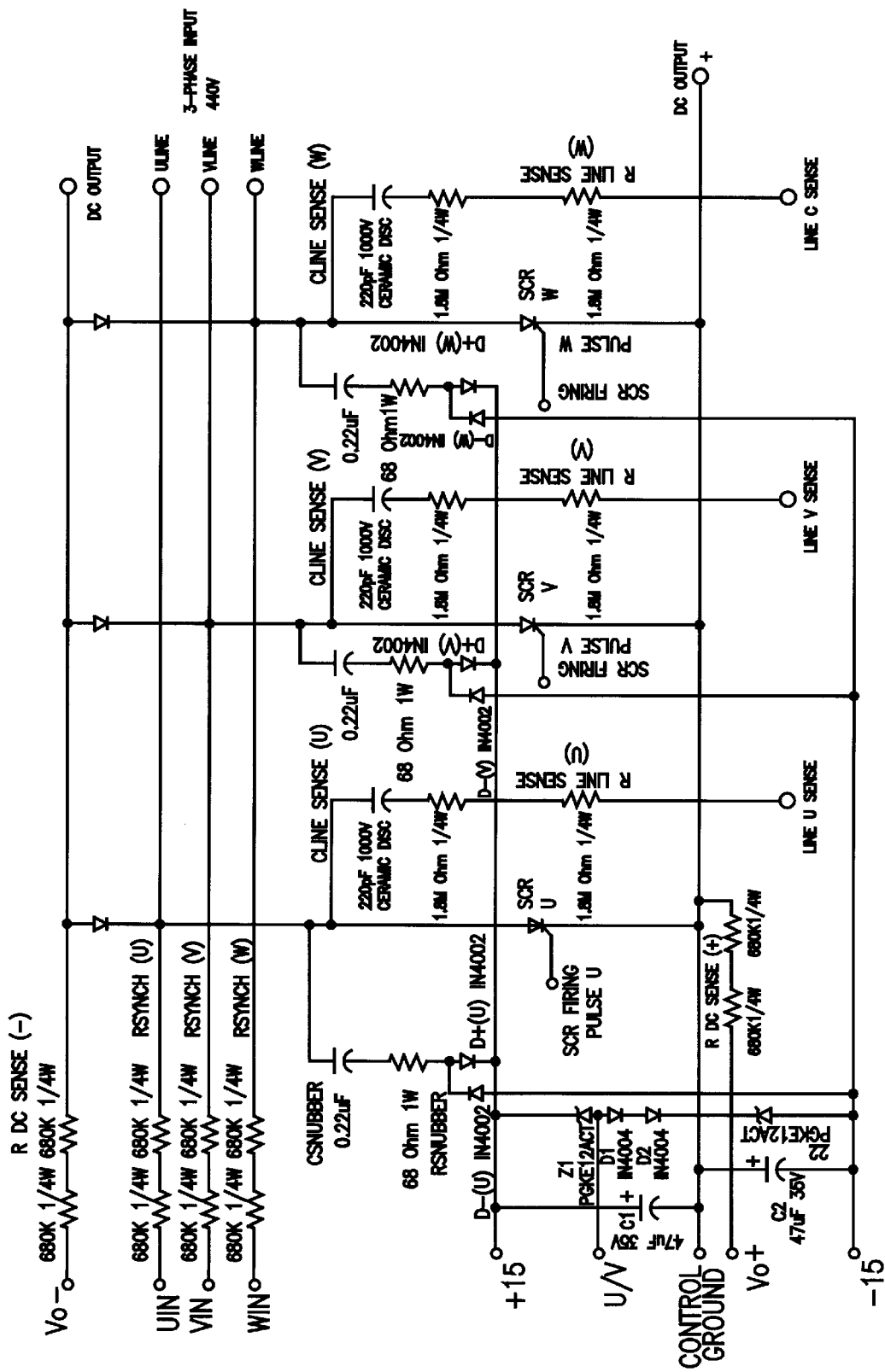
FIG. 24 is a schematic representation of a 3-phase smart bridge power section of the embodiment of FIG. 23.

A detailed diagram of the power section is shown in FIG. 24. The rectifier shown is a 3-phase half-controlled bridge with SCRs in the positive side of the bridge.

The positive output terminal of the bridge is the "ground" rail for the SCR control and firing circuit.

Capacitor $C_{SNUBBER}$ and resistor $R_{SNUBBER}$ serve the dual purposes of shaping the anode-cathode dv/dt across each SCR and providing a nominal +/−15V supply voltage for the control and firing circuit.

Positive snubber current flows via a capacitor $C_{SNUBBER}$, resistor $R_{SNUBBER}$, diode D+, and the +15V supply rail to the control ground. Negative snubber current flows via capacitor $C_{SNUBBER}$, resistor $R_{SNUBBER}$, diode D−, and the −15V supply rail to the control ground. Capacitors C1 and C2 smooth the +/−15V supply voltages.

Capacitor $C_{LINE\ SENSE}$ and Resistors $R_{LINE\ SENSE(U)}$, $R_{LINE\ SENSE(V)}$, and $R_{LINE\ SENSE(W)}$ provide ac current feedback for detecting the presence of the individual line voltages.

DC sensing resistors $R_{DC\ SENSE(+)}$ and $R_{DC\ SENSE(-)}$ provide feedback of the voltage across the DC bus capacitor, not shown, but are typically connected directly across the bridge output terminals. If a smoothing or boost-converter inductor is interposed between the bridge output and the bus capacitor, the dc sensing resistors would connect to the bus capacitor terminals, not directly to the bridge output.

Resistors $R_{SYNCH(U)}$, $R_{SYNCH(V)}$, and $R_{SYNCH(W)}$ provide feedback of the line voltage waveshapes for synchronizing the SCR firing pulses to the line voltages and for viewing each instantaneous anode-cathode SCR voltage so that the gate firing pulse can be terminated as soon as the SCR turns on.

2. Control Circuit

Figure 25:
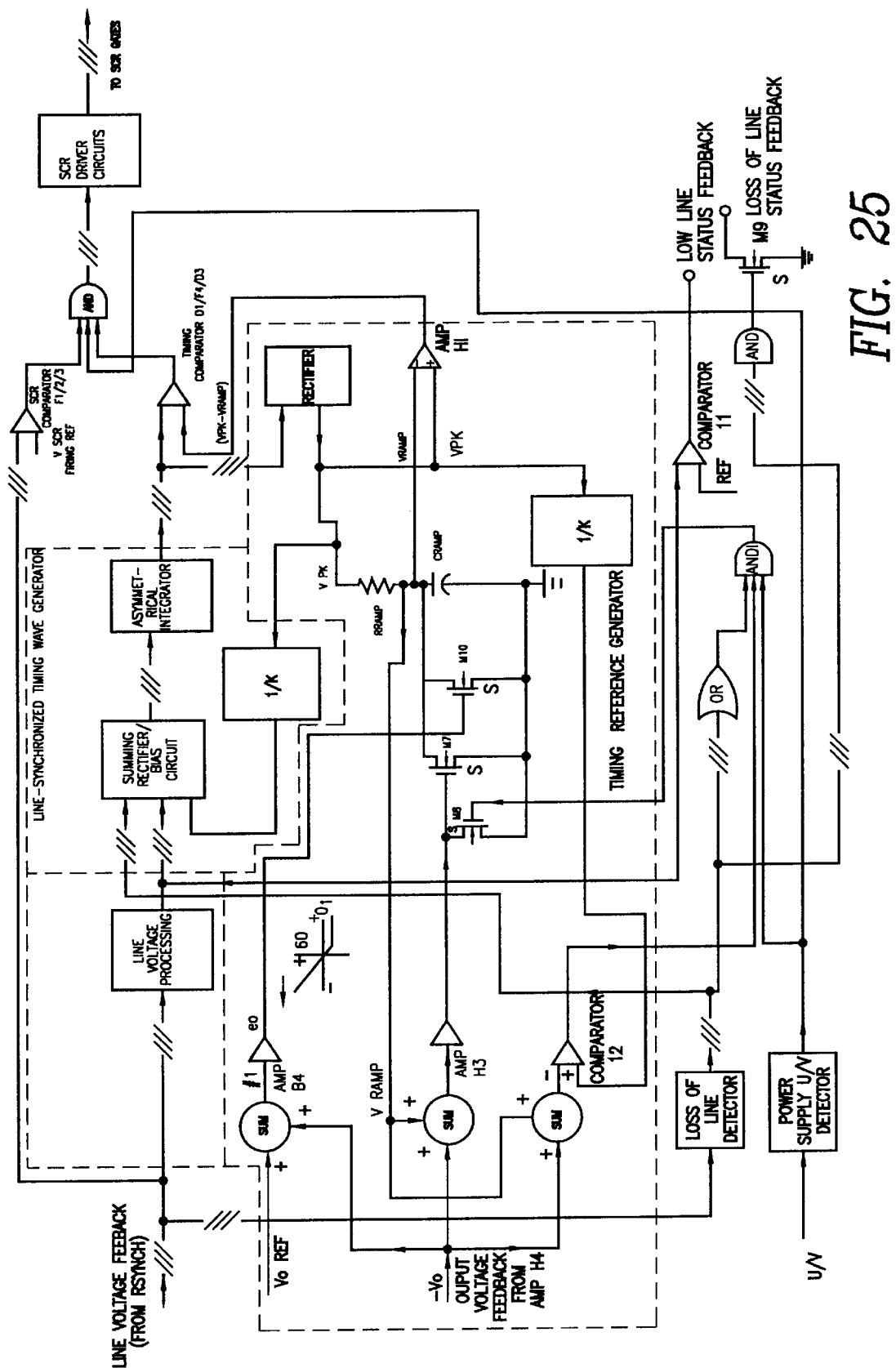
FIG. 25 is a functional diagram showing the control circuit for a soft-start rectifier of the embodiment of FIG. 23.
Figure 26:
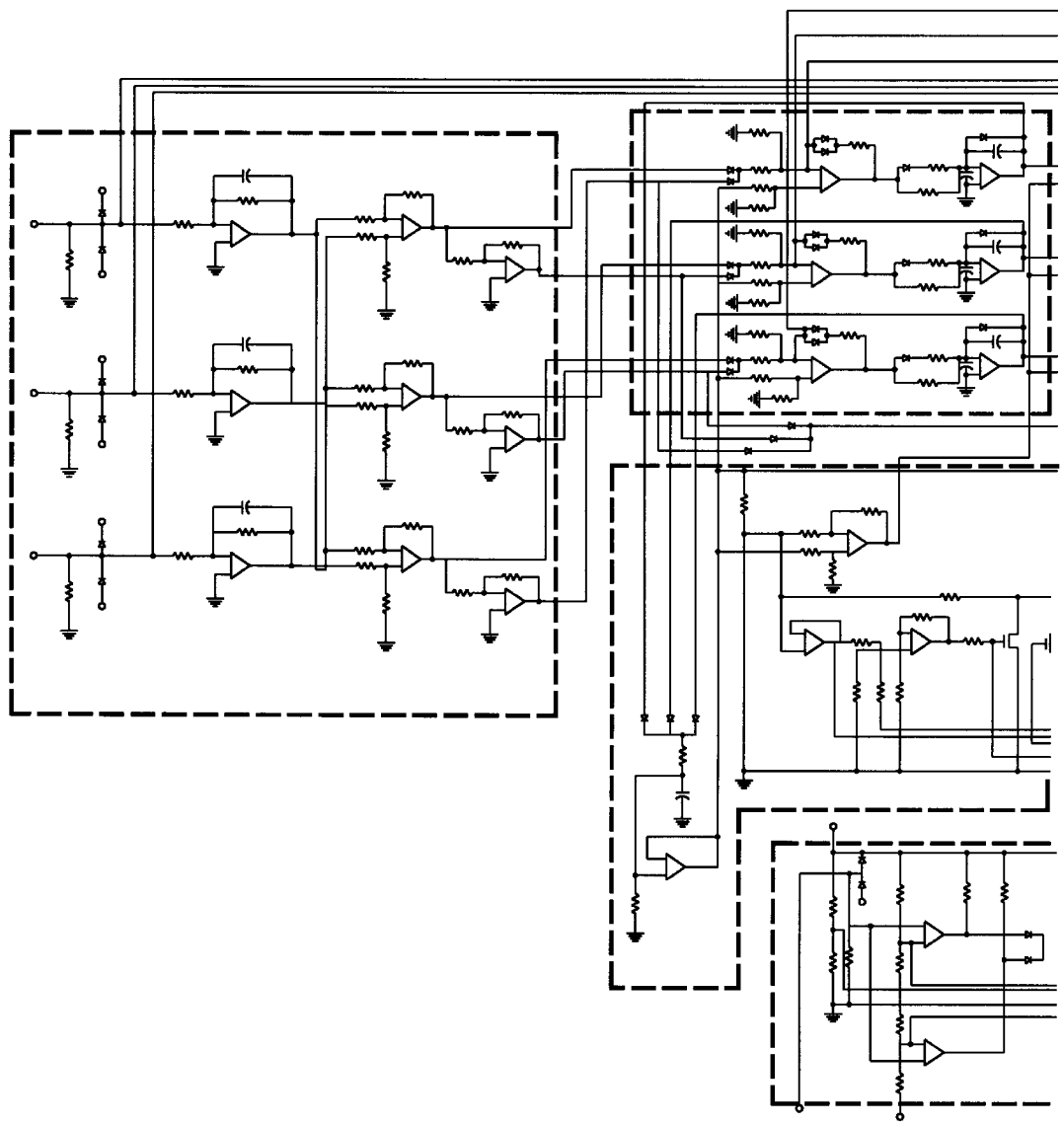
FIG. 26 is a schematic diagram showing an example of the control circuit of FIG. 25 in greater detail.
Figure 26:
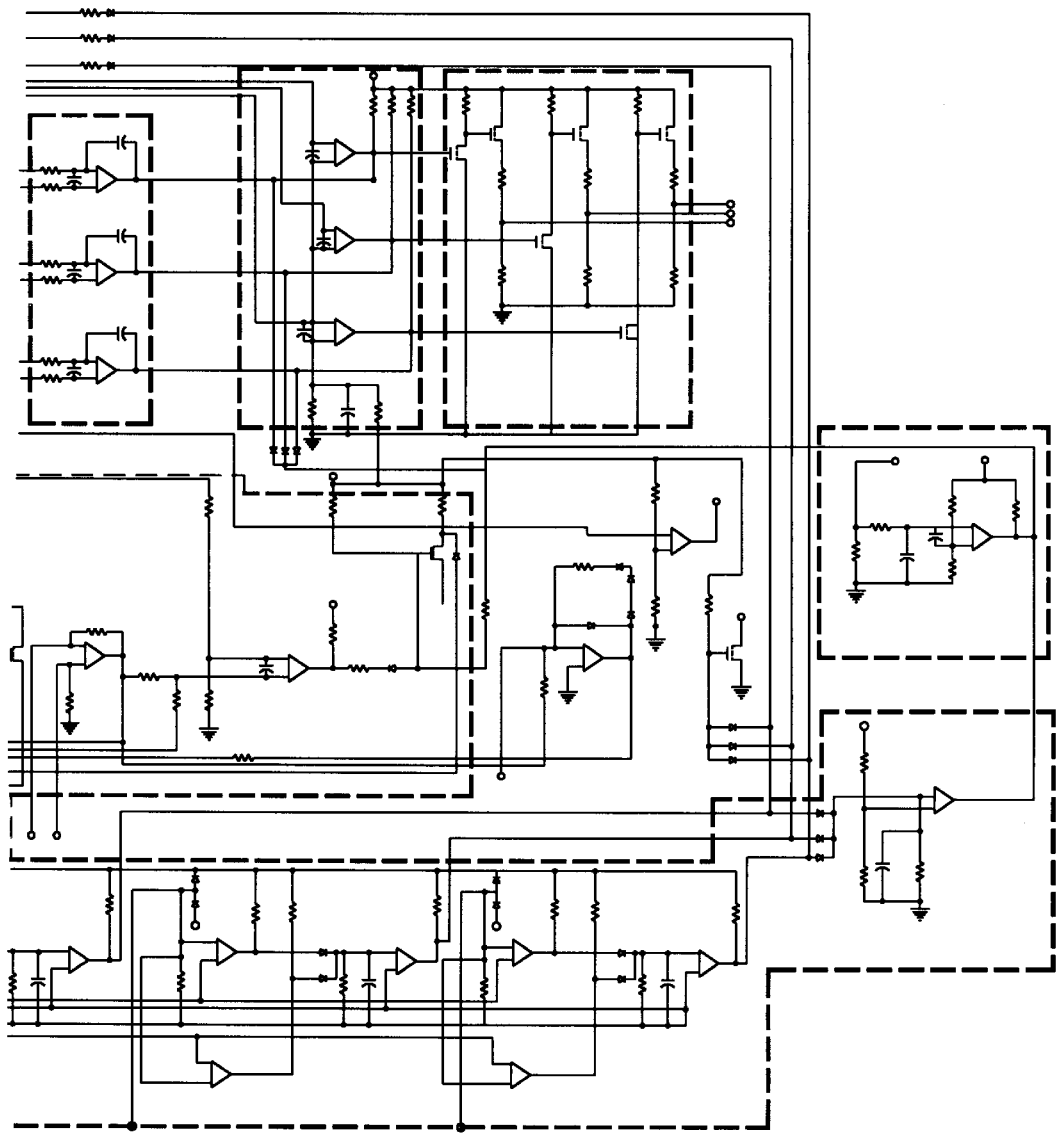

A functional block diagram of the control circuit is shown in FIG. 25. An example of a more detailed circuit diagram is shown in FIG. 26. The operation of the control circuit is as follows:

a. Line-synchronized timing wave generator

Referring to the functional block diagram shown in FIG. 25, the line-synchronized timing wave generator produces a 3-phase set of quasi-triangular timing waves that are synchronized to the line voltages and significantly are highly insensitive to line voltage spikes and disturbances.

The firing instants for the three SCRs are determined by the intersection of these three timing waves with a common timing reference voltage, ($V_{PK}-V_{RAMP}$), which is dynamically controlled to provide the desired ramp-up and regulation of the dc bus voltage.

Referring to the detailed circuit diagram shown in FIG. 26, the line voltage processing function, shown in block form in FIG. 25, is provided by amplifiers U1, U2, U3, V1, V2, V3 and W1, W2, W3.

Regarding the U amplifiers, a current proportional to the voltage from input line U into control ground flows via $R_{SYNCH(U)}$, shown in FIG. 24, developing a voltage across R3 that represents the voltage from line U into the control ground, i.e. the voltage across the SCR U. Amplifier U1 inverts this voltage, and capacitor C3 provides filtering and phase lag. The output of amplifier U1, $-U_{in\ FILT}$, lags $U_{in}$ by about 180°±20°. The phase shift between $U_{in}-V_{in}$ and $(U-V)_{FILT}$ is shown in FIG. 27.

Figure 27:
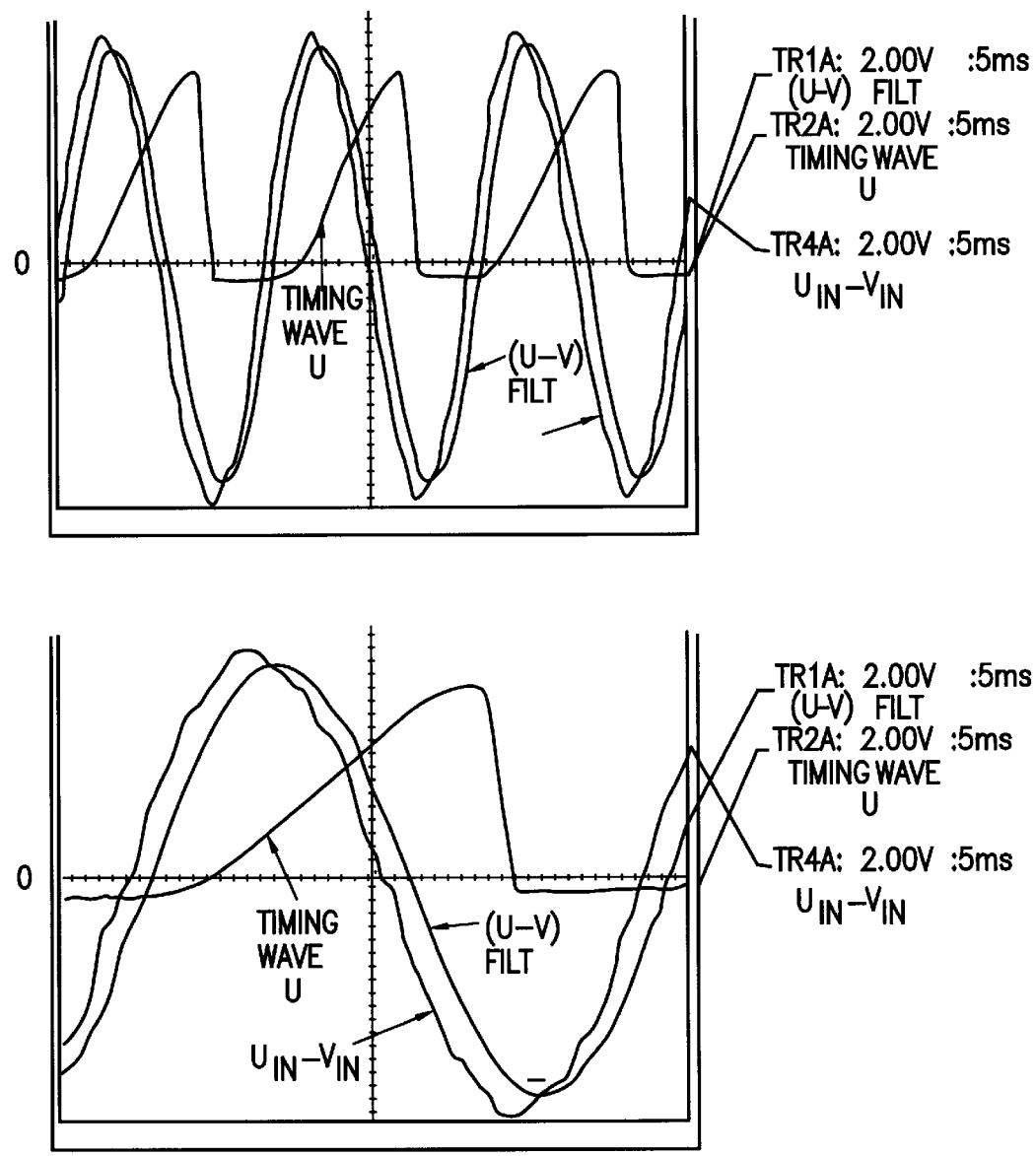
FIG. 27 shows timing diagrams of various inputs and outputs for the line voltage and line-synchronized timing wave generator circuits of FIGS. 25 and 26.
Figure 28:
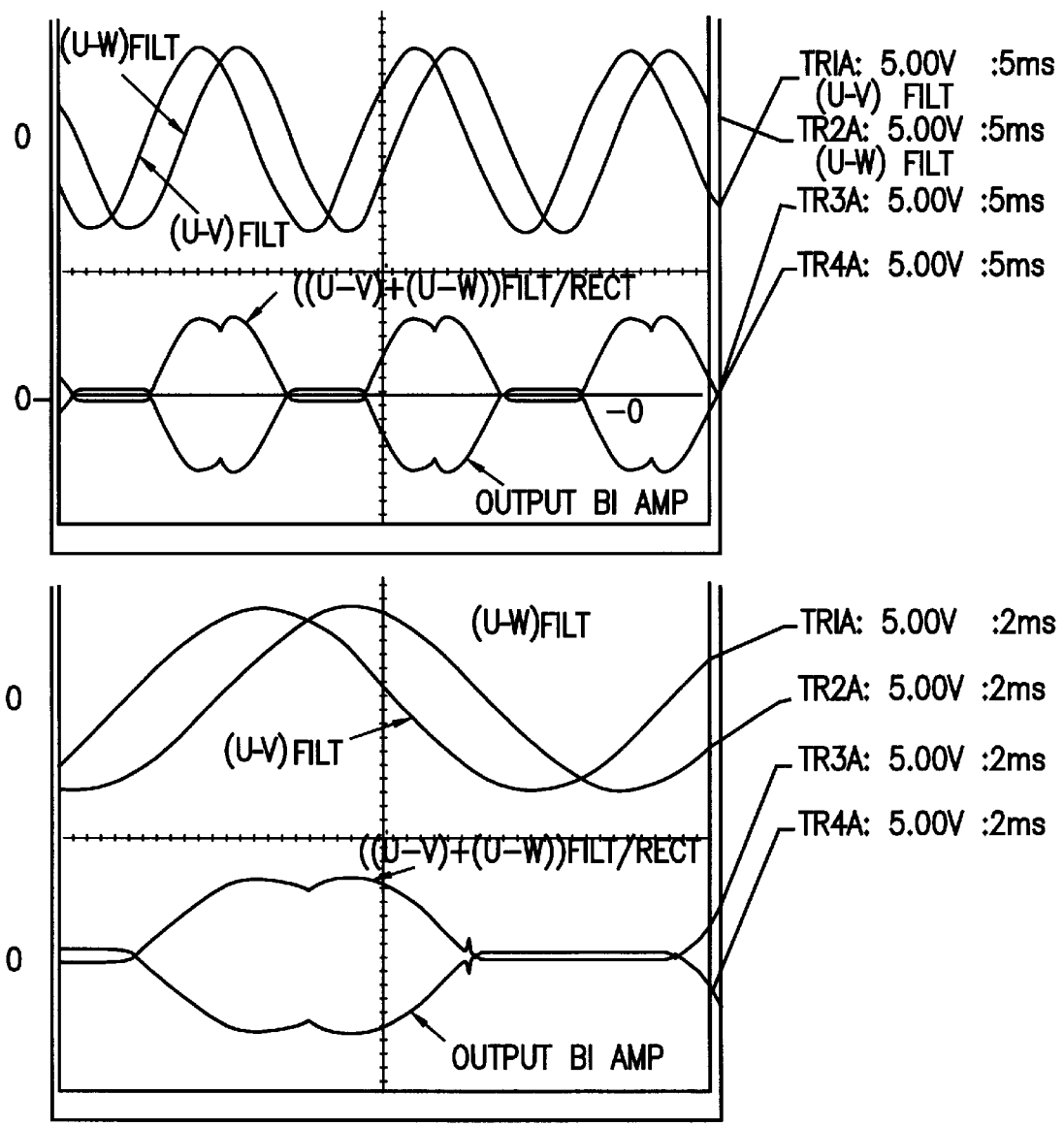
FIG. 28 shows timing diagrams of additional inputs and outputs for the line voltage and line-synchronized timing wave generator circuits of FIGS. 25 and 26.

Outputs $-U_{in\ FILT}$ and $-V_{in\ FILT}$ are applied as inputs to differential amplifier U2 and appear at the output of U2 as $(U-V)_{FILT}$, shown in FIGS. 27 and 28. The output of inverting amplifier U3 is $(V-U)_{FILT}$.

The complete 3-phase line voltage processing circuit delivers a total of six line-synchronized output voltages: $(U-V)_{FILT}$, $(V-U)_{FILT}$, $(V-W)_{FILT}$, $(W-V)_{FILT}$, $(W-U)_{FILT}$, $(U-W)_{FILT}$.

The summing rectifier/bias function of FIG. 25 is implemented in FIG. 26 for the SCRs U, V, W by amplifiers B1, B2, B3, respectively, having associated input diode pairs D3 and D6, D2 and D5, and D1 and D4, respectively.

$(U-W)_{FILT}$ and $(V-W)_{FILT}$ are rectified by diodes D3 and D6 to form the composite waveform $((U-V)+(U-W))_{FILT/RECT}$ shown in FIG. 28. This composite voltage waveform is applied to the inverting input of amplifier B1. A dc bias voltage, proportional to the peak line voltage, and derived via diodes D25, D27, D28, is applied to the positive input of amplifier B1.

Figure 29:
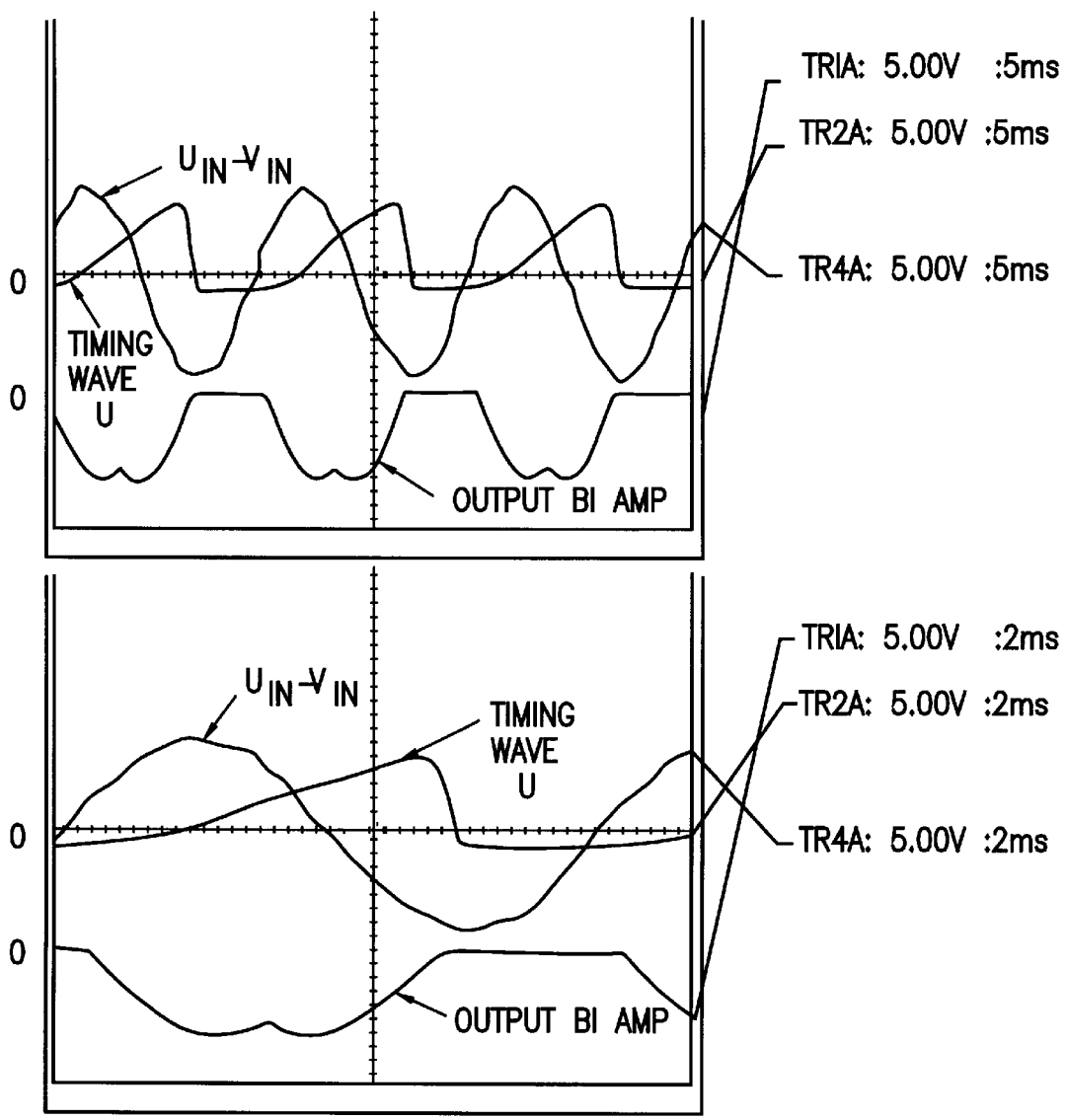
FIG. 29 shows timing diagrams of further inputs and outputs for the line voltage and line-synchronized timing wave generator circuits of FIGS. 25 and 26.
Figure 30:
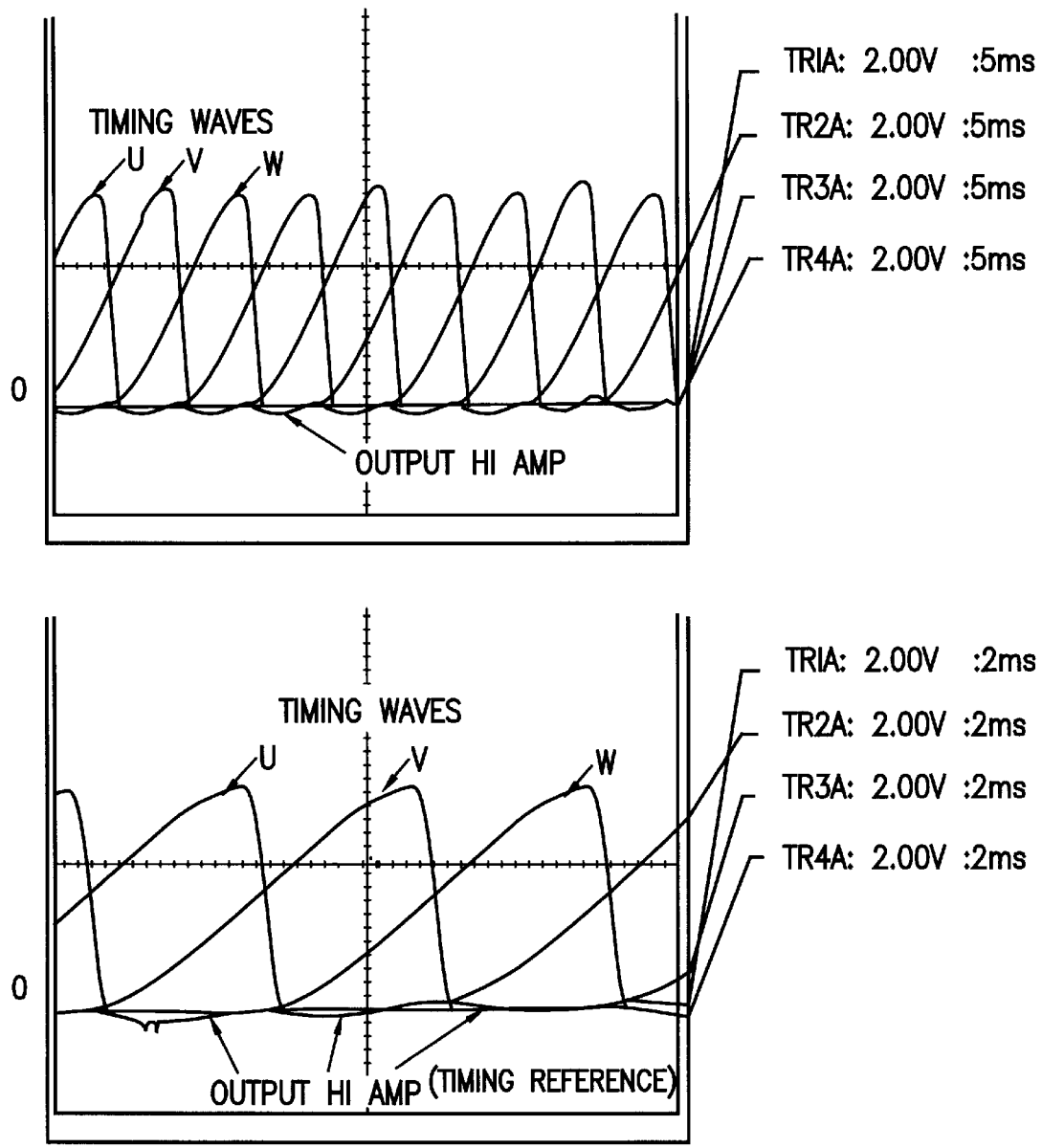
Figure 31:
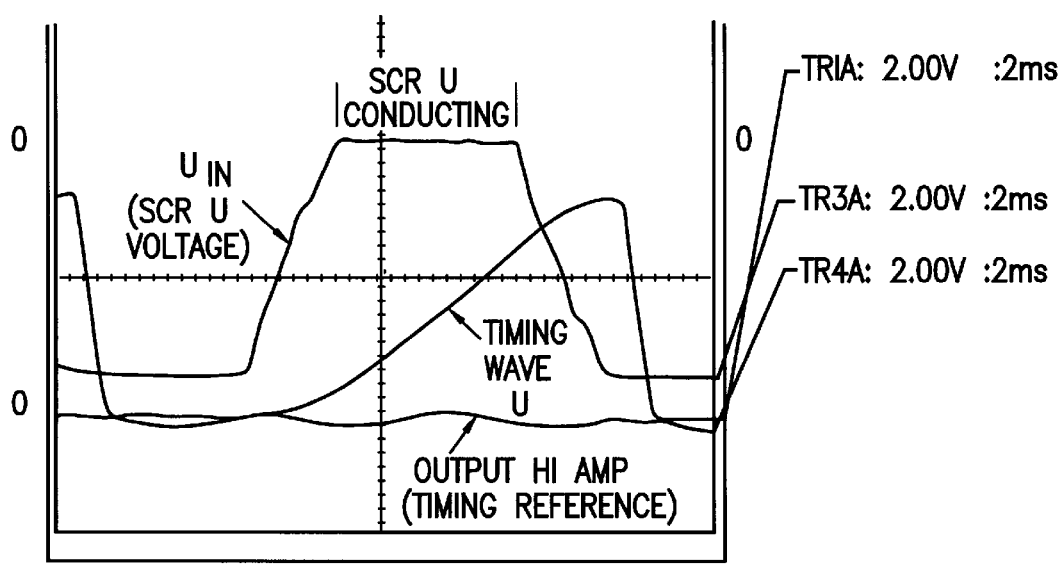

The output of amplifier B1, shown in FIGS. 28 and 29, is the inverse of $((U-V)+(U-W))_{FILT/RECT}$ with an added small positive bias.

The asymmetrical integrator function of FIG. 25 is implemented in FIG. 26 by amplifiers C1, C2, C3 and their associated components for SCRs U, V, and W, respectively.

Turning now to amplifier C1, for example, when the input voltage is positive, current flows towards the negative input terminal mainly via diodes D15 and R33. Only a small current flows via resistor R36, because resistor R36 has a much higher resistance value than resistor R33. The positive input current drives the output voltage of amplifier C1 in a negative direction until it is clamped by diode D18 at about -0.5V.

When the input voltage to amplifier C1 is negative, diode D18 does not conduct. The current flows away from the negative input terminal, via resistor R36. The negative input terminal of amplifier C1 is at virtual ground. Thus, the current in resistor R36 is proportional to the negative input voltage. This current flows through the integrator capacitor C13, producing a positive "sawtooth" timing wave at the output of amplifier C1, shown in FIGS. 27, 29, 30 and 31. This timing wave is proportional to the integral of the input voltage $((U-V)+(U-W))_{FILT/RECT}$ while the voltage is instantaneously negative.

When the input voltage is again positive, the timing wave is driven rapidly in a negative direction by the current in resistor R33 until diode D18 clamps at approximately -0.5V.

The filtering action of the capacitors C3, C2, and C1 of the U1, V1, W1 input amplifiers, combined with the integrating function of the asymmetrical integrators, ensure that the synchronized timing waves are largely sheltered from line voltage spikes and disturbances.

The timing diagrams shown in FIGS. 27 and 29 also show the phase relationship between the synchronized timing wave U and the raw unfiltered line-to-line voltage, $U_{in}-V_{in}$.

b. Timing Reference Generator

Referring again to FIGS. 25 and 26, the timing reference generator develops a common timing reference voltage, $V_{PK}-V_{RAMP}$, that is compared with the three line-synchronized timing waves. The crossover points between the common timing reference and the three synchronized timing waves determine the SCR firing instants.

Figure 32:
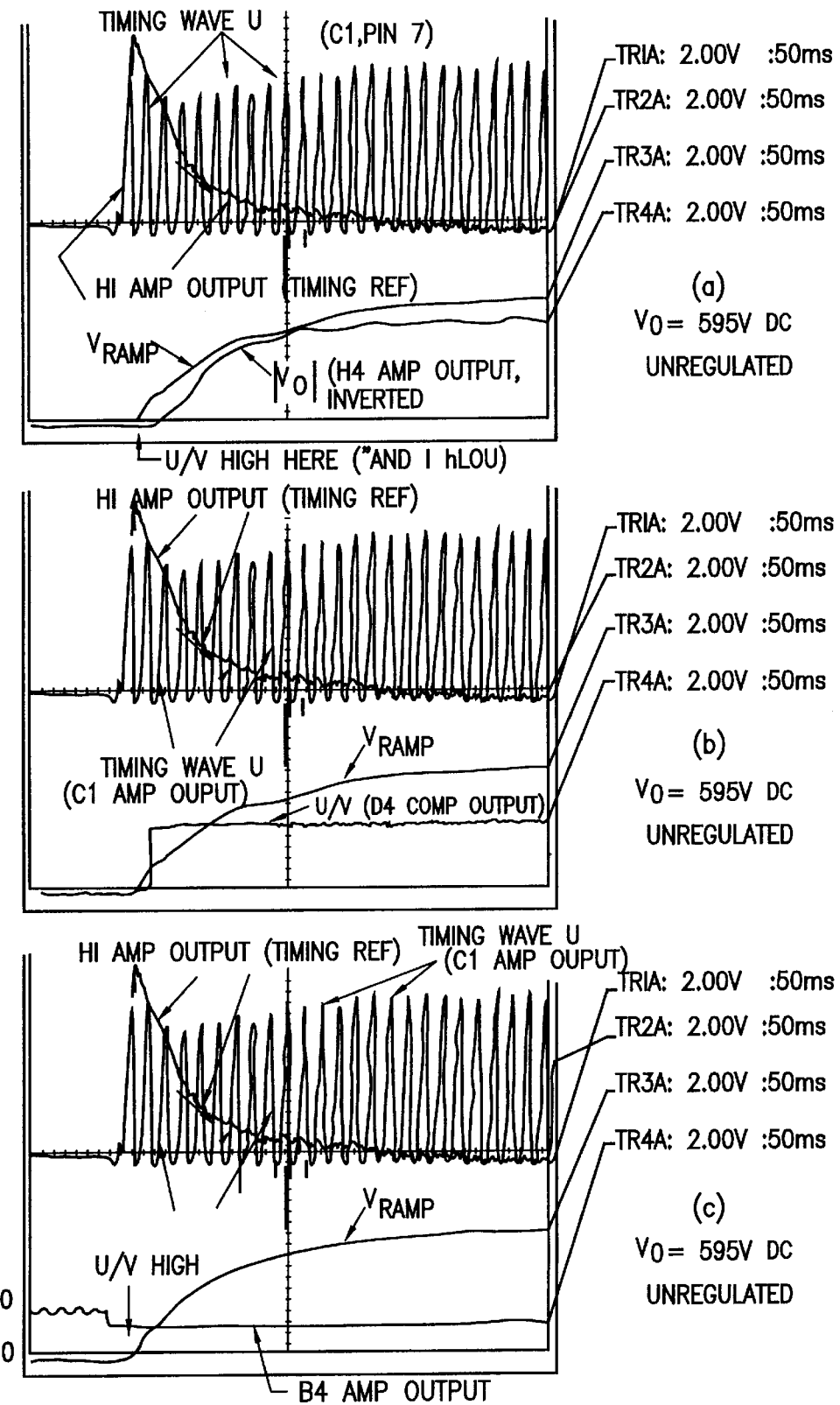
FIG. 32 shows timing diagrams of various inputs and outputs during the dynamic ramp-up of the output voltage when the final output voltage is not regulated.
Figure 33:
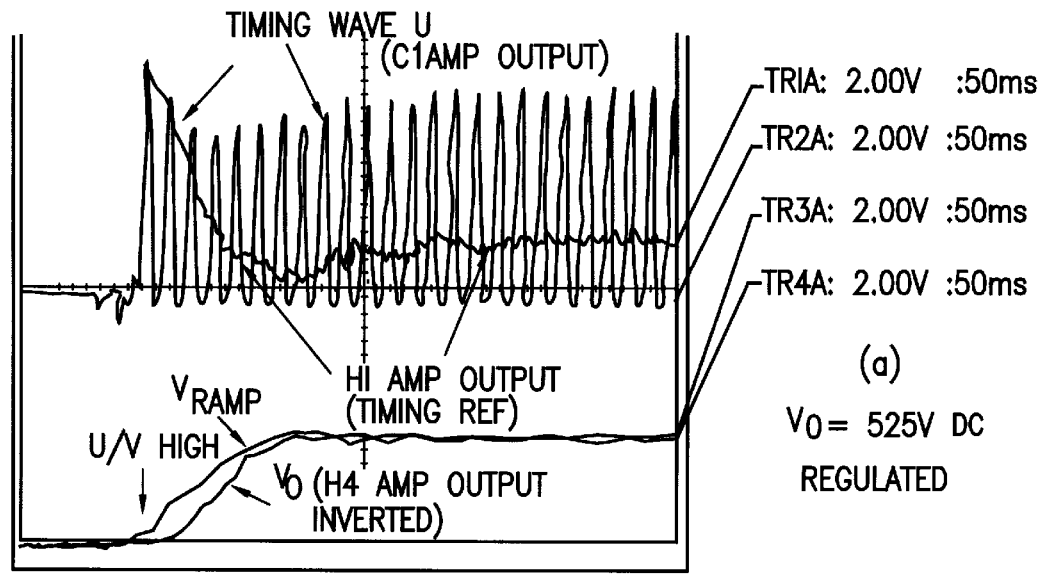
FIG. 33 shows timing diagrams of additional inputs and outputs during the dynamic ramp-up of the output voltage when the final output voltage is not regulated.
Figure 33:
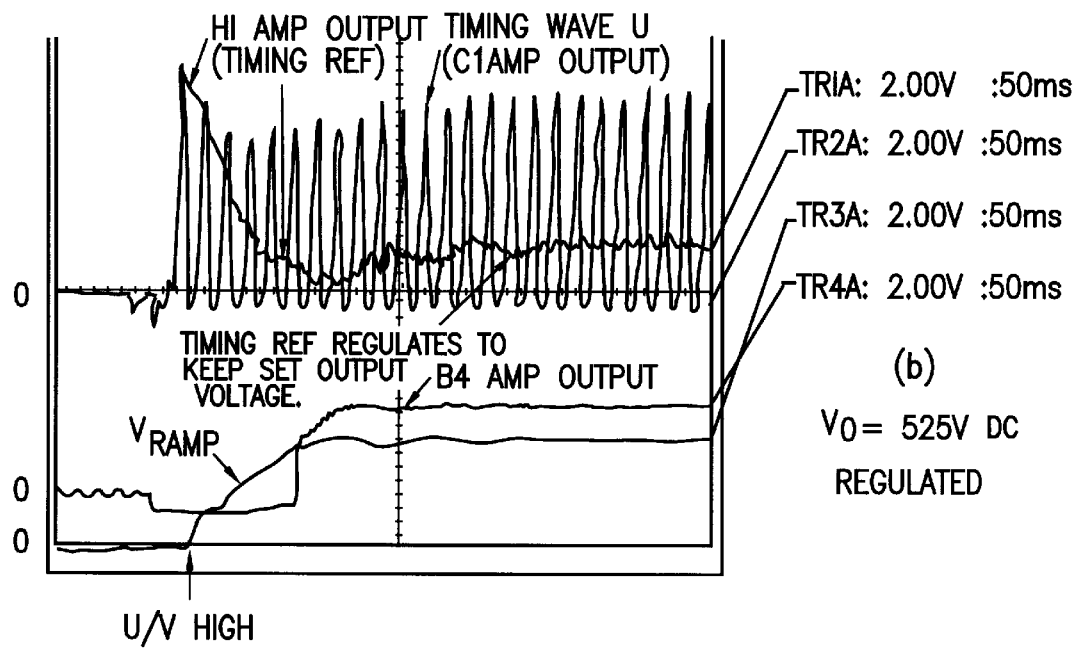
Figure 34:
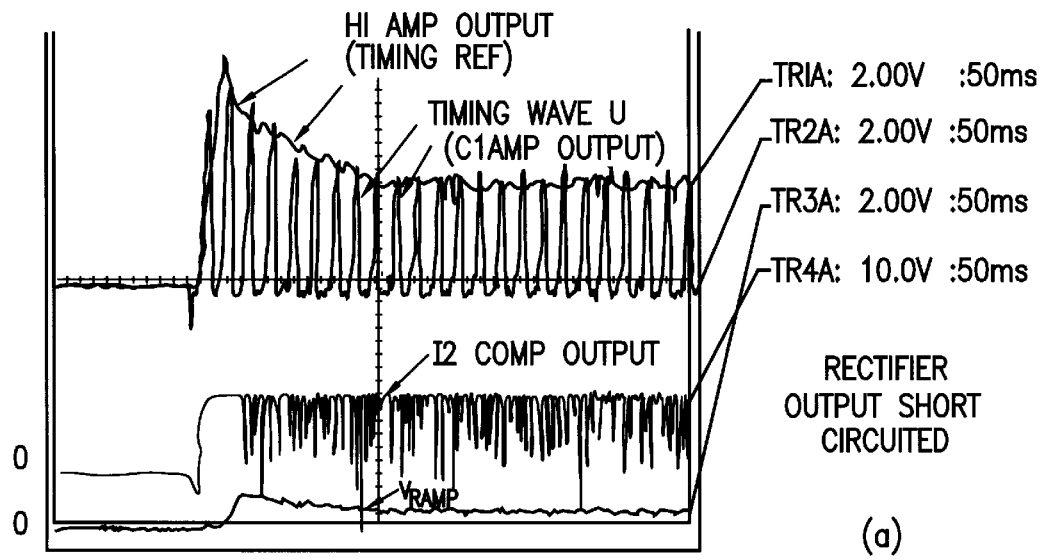
FIG. 34(a) shows a timing diagram during start up when the rectifier output is short circuited.
FIG. 34(b) shows timing diagrams of the steady state waveforms with only a resistive load present and no capacitor is present.
Figure 34:
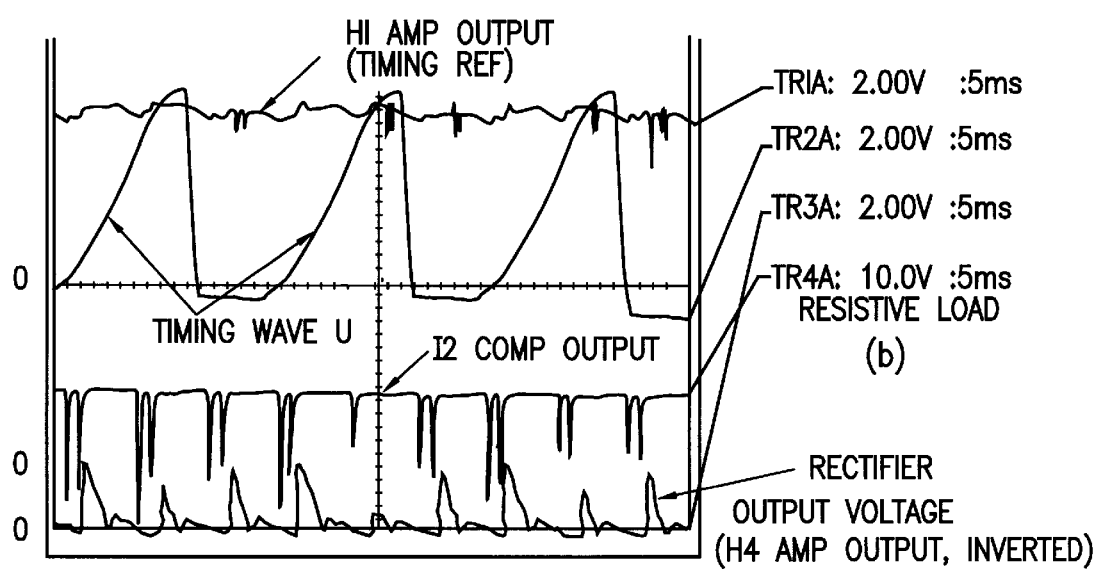

When the line voltage is first switched on, the line-synchronized timing wave generator starts to produce timing waves, shown in FIGS. 32, 33 and 34, and the rectifier delivers a voltage having a peak value that is essentially equal to the peak of the timing waves, $V_{PK}$.

Figure 37:
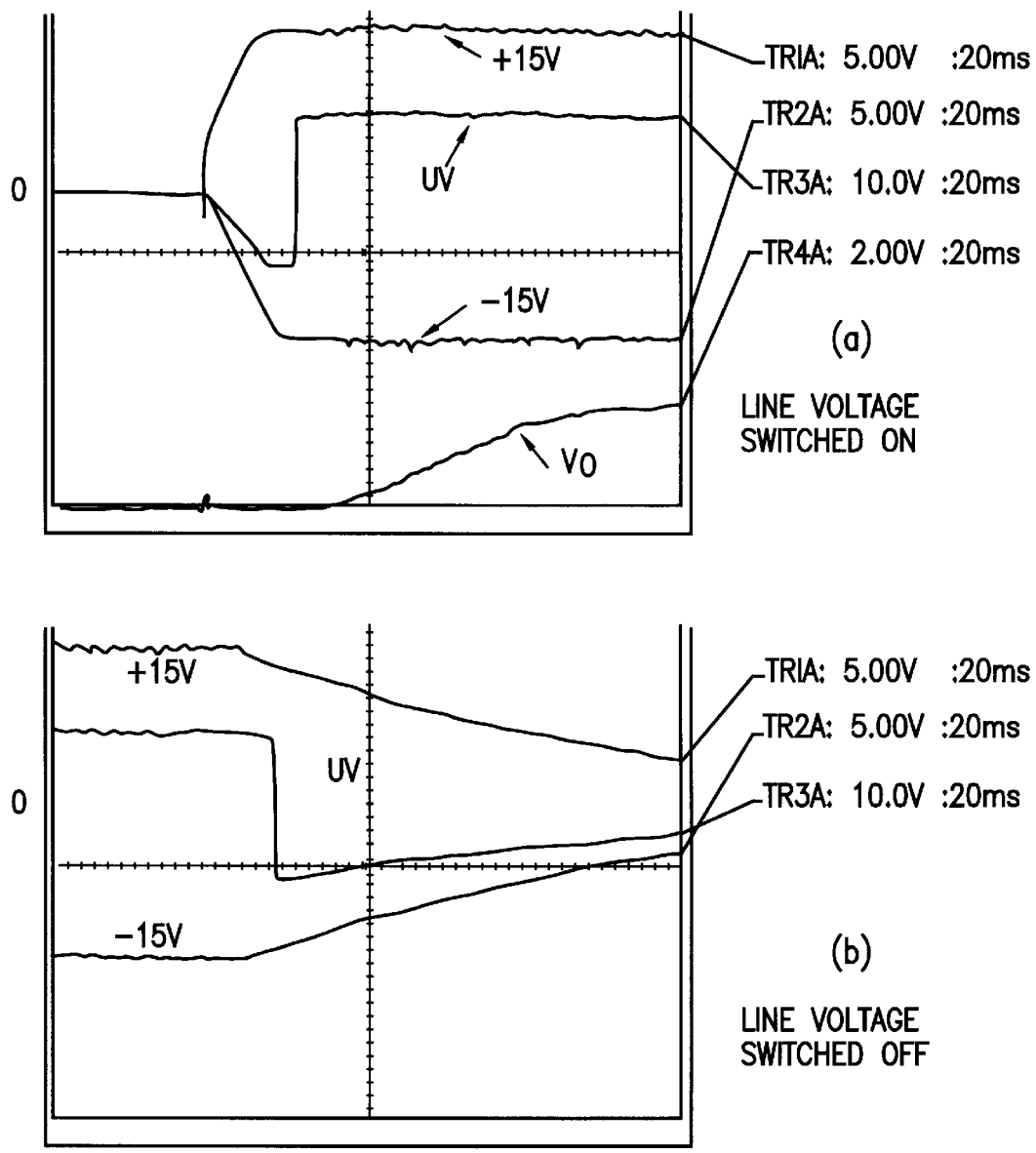
FIG. 37 shows timing diagrams of the control power supply voltages and the undervoltage/overvoltage signal when the input line voltage switches on and off.

Voltage $V_{PK}$ sends a current through the $R_{RAMP}$ resistor R80. The output of the power supply undervoltage/overvoltage detector stays low for about 35 ms after initial switch-on, as FIGS. 32 and 37 show. During this period, the output of gate AND1 is low, transistor M8 is off, and transistor M7 is driven into conduction by the output of amplifier H4. This amplifier compares the bus capacitor feedback voltage, $-V_O$, with $V_{RAMP}$. The amplified error between these two voltages drives transistor M7 so that it absorbs the current from the $R_{RAMP}$ resistor, R80, and regulates $V_{RAMP}$ to be essentially equal to $|V_O|$.

If $|V_O|$ is zero at switch-on, as it typically will be, $V_{RAMP}$ is regulated to zero until the output of gate circuit AND1, shown in FIG. 25, goes high. (See FIGS. 32 and 33). If $|V_O|$ has an initial value at switch on, such as following a brief line outage, $V_{RAMP}$ will be regulated to the value $|V_O|$ until the output of gate circuit AND1 goes high.

When the output of gate circuit AND1 goes high, transistor M8 is turned on, turning off transistor M7 which breaks the closed loop that forces $V_{RAMP}$ to equal $|V_O|$.

The $C_{RAMP}$ capacitor C23 starts to charge freely from $V_{PK}$ via the $R_{RAMP}$ resistor, R80, with a time constant of $C_{RAMP} \cdot R_{RAMP}$, as shown in FIGS. 32 and 33.

The regulating of $V_{RAMP}$ to be equal to $|V_O|$ before the start of ramp-up sets an approximately correct initial value of $V_{RAMP}$. Thus, $V_{RAMP}$ does not require a significant time to "catch up" to a pre-existing value of $|V_O|$ when ramp-up starts.

The output of amplifier H1 is the timing reference and is essentially the difference between voltages $V_{PK}$ and $V_{RAMP}$. As $V_{RAMP}$ increases, the timing reference decreases and the crossover points between $(V_{PK}-V_{RAMP})$ and the synchronized timing waves advance in phase to advance the firing angle of the SCRs and ramp up the dc bus voltage shown in FIGS. 32–33.

The difference between a fixed reference voltage $V_{O,REF}$, which represents the desired fixed steady state operating level of dc bus voltage, is compared with the feedback signal $-V_O$. The output of amplifier B4 becomes positive when $|V_O|$ starts to exceed $V_{O,REF}$, as FIG. 33 shows. When this occurs, transistor M10 starts to conduct. The action of this local closed-loop circuit regulates $V_{RAMP}$ to minimize the error between $V_{O,REF}$ and $|V_O|$. Once the initial ramp-up is completed and $|V_O|$ reaches $V_{O,REF}$, the bus voltage is regulated to the preset value.

c. Operation with an overload or a short-circuit

It has been assumed in the above description that the output of comparator I2 of FIG. 26 is high during start-up, namely that the output of gate circuit AND1 of FIG. 25 is high once the outputs of the loss-of-line and power supply U/V circuits are high, thereby allowing transistor M8 to turn on and $V_{RAMP}$ to increase.

The output of comparator I2 is high only when the following condition is met:

$$(V_{RAMP}-V_O) < V_{PK/k},$$

where $k=(R91+R92)/R92$ and resistors R91 and R92 are shown in FIG. 26.

During a normal start, as $V_{RAMP}$ increases, $V_O$ lags behind and the difference between these two voltages remains less than $V_{PK/k}$, thus satisfying the above condition and keeping the output of comparator I2 high.

If an overload or short-circuit occurs at the output of the bridge rectifier, $V_O$ no longer follows closely behind $V_{RAMP}$, and the instantaneous difference soon exceeds $V_{PK/k}$. The output of comparator I2 and the output of gate AND1 go low, turning off transistor M8. The output of amplifier H4 now drives transistor M7 into conduction, thus pulling $V_{RAMP}$ back towards $|V_O|$, as FIG. 34(a) shows.

Then, the output of comparator I2 again goes high, turning on transistor M8, and allowing $V_{RAMP}$ to again increase. When the difference again becomes equal to $V_{PK/k}$, the output of comparator I2 goes low, and the cycle repeats. The repeated cycling prevents $V_{RAMP}$ from exceeding $V_O$ by more than the value of $V_{PK/k}$, regardless of the value of $V_{RAMP}$. $V_{RAMP}$ is thus prevented from increasing at start-up if the output of the rectifier is overloaded, as FIGS. 34(a) and (b) show.

Figure 35:
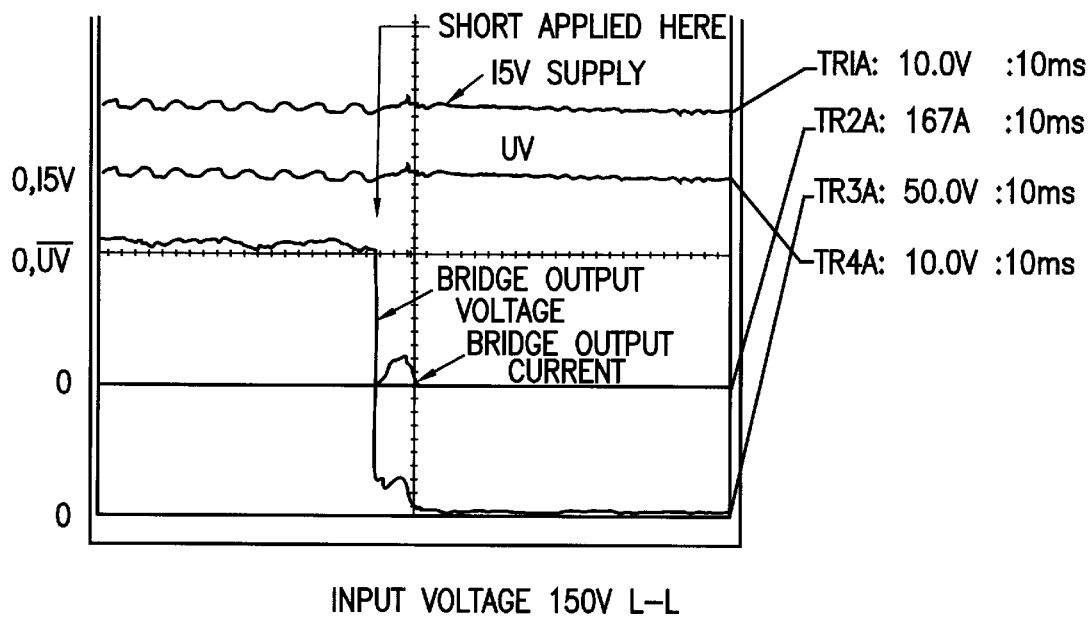
FIG. 35 shows waveforms for a short under load, 3-phase input.
Figure 35:
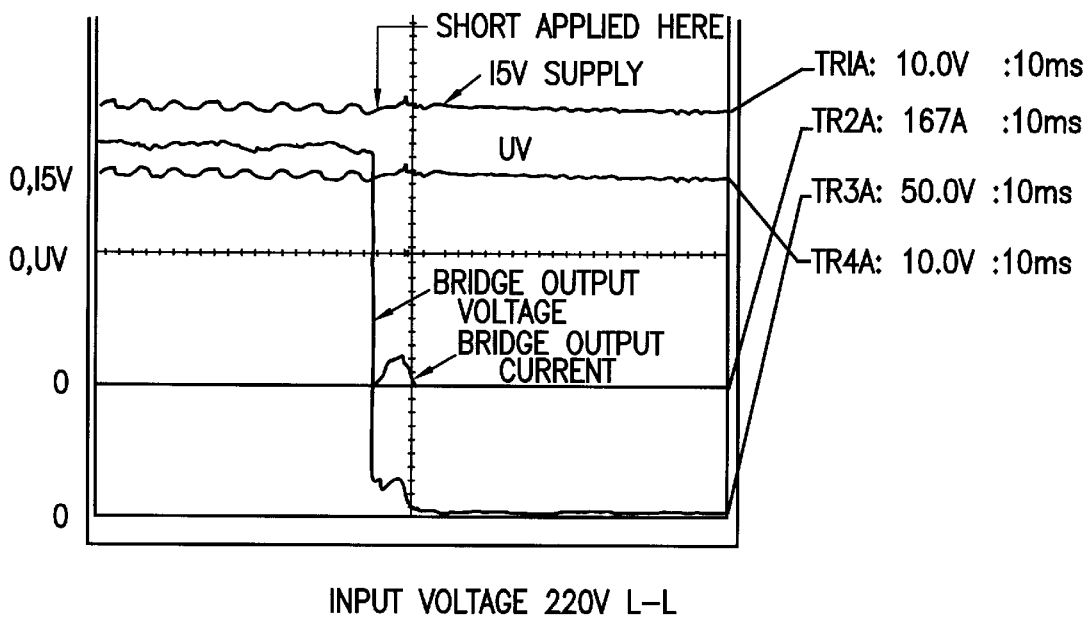

During normal operation, with $V_{RAMP}$ already high, an overload or short-circuit will cause $V_{RAMP}$ to be "clamped" to the same value as $V_O$ quickly phase back the firing pulses and limit the fault current, as shown in FIG. 35.

d. Inhibiting the timing waves during line voltage loss

If any of the three line voltages is lost, the output of the corresponding loss-of-line detector shown in FIG. 26 goes low and adds a negative input to the respective corresponding summing rectifier/bias amplifier circuit B1, B2 or B3.

The output of the corresponding amplifier B1, B2 or B3 goes positive, which drives the output of the corresponding asymmetrical integrator negative. This change eliminates the timing wave for the lost phase, thereby preventing the SCR firing crossover points from being produced for that phase.

Significantly, when the missing line voltage reappears, the timing wave reappears from a negative direction and avoids the possibility of misphased crossover points and incorrectly timed SCR firing pulses.

e. Dynamic control of timing pulse duration

With reference again to FIG. 26, the outputs of comparators D1, F4, D3 define the initiation points for the SCR firing pulses from the intersection points of the synchronized timing waves with the timing reference. Each comparator generally produces a high output whenever the timing wave is instantaneously greater than the timing reference.

The leading edge of the comparator pulse defines the desired SCR firing instant. The duration of this pulse is, however, generally much longer than is needed to fire the SCR.

Comparators F1, F2 and F3 each compare the instantaneous anode-cathode voltage of each SCR with the fixed reference voltage, $V_{SCR,FIRING\ REF}$. This reference is set to represent an actual anode-cathode SCR voltage before attenuation through the feedback resistors, typically having a value of about 6V.

Thus, when the instantaneous SCR anode voltage is greater than about 6V, the output of comparators F1, F2 and F3 attempts to attain a high value. Otherwise, the output has a low value. The outputs of comparators F1, F2 and F3 are connected to, and therefore effectively "ANDed" with, the outputs of comparators D1, F4 and D3, respectively.

The final SCR firing pulse is thus controlled so that it does not occur unless the instantaneous anode-cathode voltage is at least +6V and so that it is terminated when the instantaneous anode-cathode voltage falls below 6V, namely when the SCR latches into conduction.

The duration of the firing pulse is thus dynamically controlled to be sufficient to turn on the SCR. Once the SCR is latched on, the firing pulse is removed which minimizes the average current consumed from the power supply by the SCR driver circuit.

A further function of the comparators F1, F2 and F3 is to prevent the initiation of firing pulses when the instantaneous SCR voltage is negative. This firing could otherwise occur if the crossover points of the timing reference voltage with the synchronized timing waves fall ahead of the zero-crossing of the SCR voltage, as when the rectifier is fully on, shown in FIGS. 30 and 31, or when the timing reference voltage falls below the timing waves shown in FIGS. 30 and 31.

f. SCR gate driver

Each SCR gate driver consists of an N-channel MOSFET and P-channel MOSFET pair M3 and M6, M2 and MS, and M1 and M7 coupled to a respective a 27Ω output resistance, as shown in FIG. 26.

g. Loss-of-Line Detector

The loss of line detector for phase U comprises comparators U1', U2' and U3'. The corresponding detector for phase V includes comparators V1', V2' and V3', and the detector for phase W comprise comparators W1', W2' and W3'.

Figure 36:
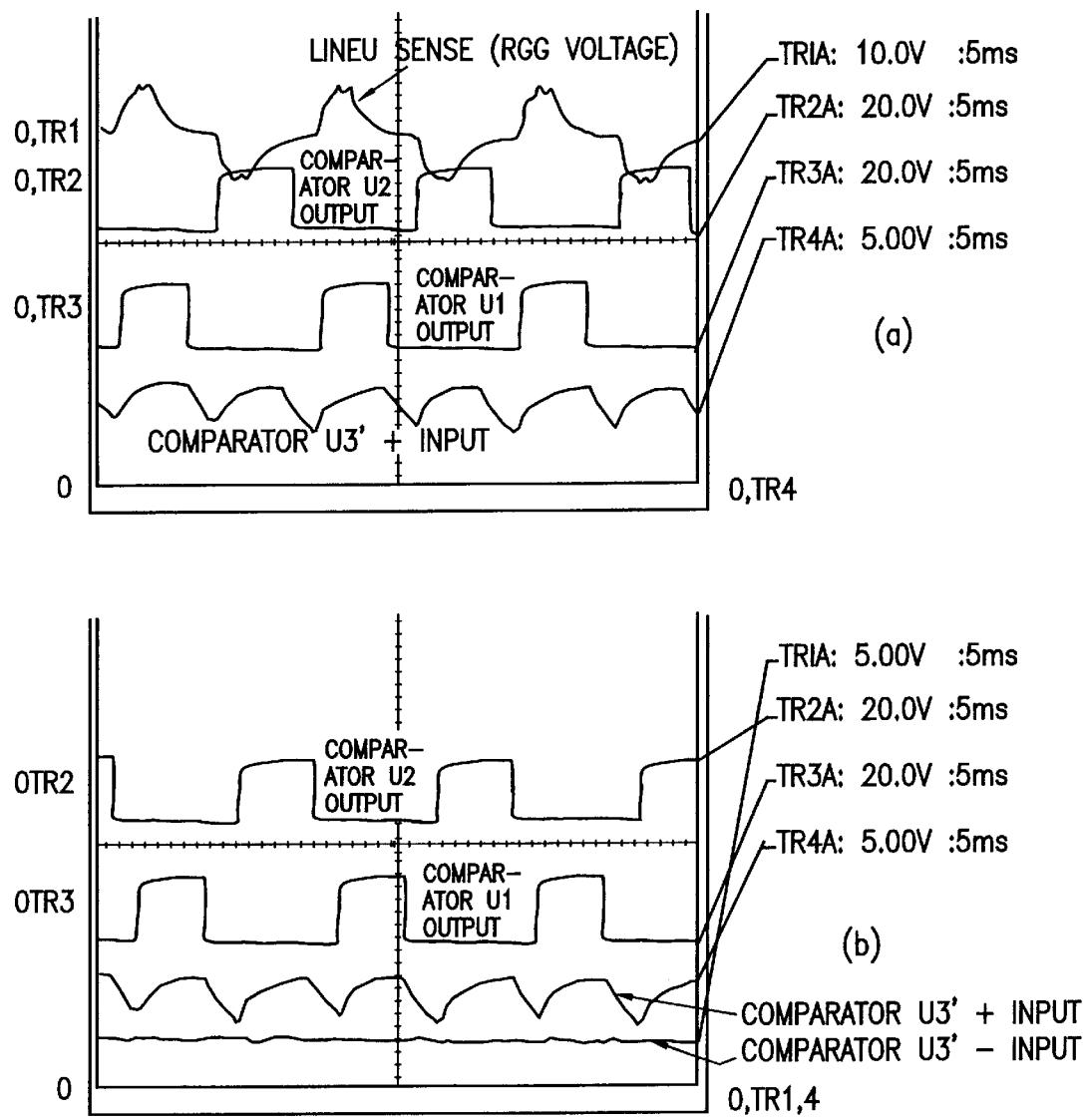
FIG. 36 shows timing diagrams for a loss of line detector circuit of FIGS. 25 and 26 during normal steady state operation.

Referring to the U phase, for example, current from line U flows via capacitor $C_{LINE\ SENSE(U)}$ and resistor $R_{LINE\ SENSE(U)}$ shown in FIG. 24, through resistor R66, shown in FIG. 26, to the control ground, thereby developing an alternating voltage across resistor R66 shown in FIG. 36. When this voltage is instantaneously more positive than the fixed voltage at the input of comparator U1', the output goes high, as shown in FIG. 36.

When the voltage across resistor R66 is instantaneously more negative than the fixed bias voltage at the input of comparator U2', the output goes high, as FIGS. 36 shows. The outputs of comparators U1' and U2' are combined at diodes D52 and D55 across resistor R113. Capacitor C6 smoothes the combined signal applied to the positive input of comparator U3', as shown in FIG. 36.

When the combined signal across resistor R113 is greater than the fixed bias at the negative input terminal of comparator U3', the output UVA of comparator U2' is positive. If the U line voltage is lost, output UVA goes low within about 10 ms.

h. Power Supply U/V Detector

The undervoltage detection of the power supply voltage detects the absence of current through the positive supply zener diode Z1, shown in FIG. 24.

When diode Z1 conducts, a voltage of about 1.2V is developed across diodes D1 and D2. This voltage is fed to the input circuit of comparator D4, shown in FIG. 26. Resistor R124 and capacitor C26 smooth the voltage at the positive input terminal of the comparator, which is higher than the fixed bias voltage at the negative terminal of the comparator.

Thus, the output of comparator D4 is high when diodes D1 and D2 in FIG. 24 conduct and signifies normal power supply voltage. The output of comparator D4 goes low when diode Z1 in FIG. 24 stops conducting, thus indicating loss of the power supply voltage shown in FIGS. 37(a) and (b).

The output of comparator D4 is connected to the output of comparator U4'. The loss-of-line voltage signals, UVA, UVB and UVC are "ORed" at the positive input to the amplifier U4'. When all three line voltages are absent, as when the 3-phase line is switched off, the output of U4' goes low within about 10 ms. This change provides a faster response of the combined U/V signal during power-off shown in FIG. 36(b) than from the output of comparator D4 by itself.

i. Low-Line Status feedback

Comparator I1, shown in FIG. 25, compares the rectified output of the line voltage processing circuit with a fixed reference. When the amplitude of the line voltage is normal, the output of comparator I1 is low. At other times, the output is high. The output of comparator I2 can sink current into an opto-isolator, such as a 0.5 mA current into an HCPL 0701, for isolated status feedback.

j. Loss-of-Line feedback

The outputs of the individual loss-of-line detectors are "ANDed" and inverted by transistor M9, shown in FIG. 25. The output of transistor M9 is low when all three line voltages are present. When one or all of the line voltages are missing, the output of transistor M9 is high. Transistor M9 can sink current into an opto-isolator, such as a current of 0.5 mA for a HCPL 0701, for isolated status feedback.

III. Soft Start Rectifier Bridge With Regulated DC Bus Voltage

Figure 38A:
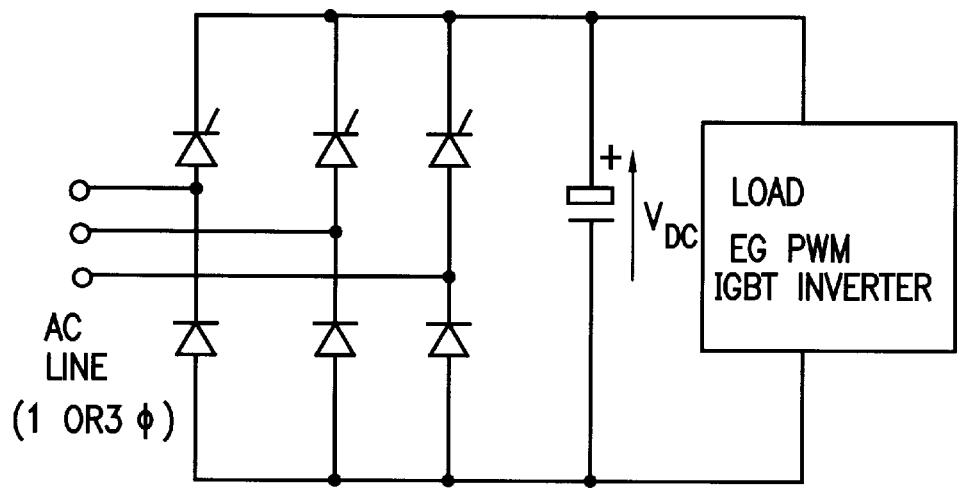
FIG. 38A shows an overall soft-start rectifier circuit.

As described above, a phase-controlled SCR bridge rectifier softly precharges a dc bus capacitor by phase-control of the SCR firing pulses. The voltage across the capacitor is ramped up over several incremental steps, until the SCR conduction periods are fully advanced with respect to the ac line voltage, and the maximum possible dc bus voltage is attained. An example of this arrangement is shown in FIG. 38A.

During normal operation, namely after an initial capacitor charge, a firing pulse is applied to each SCR when the voltage across the SCR becomes positive during each cycle. Thus, after an initial capacitor voltage ramp-up, each SCR behaves essentially as an uncontrolled diode, and the operation of the SCR/diode bridge mimics that of an uncontrolled diode bridge. The amplitude of the dc output voltage thus directly corresponds to the amplitude of the ac line voltage.

Figure 38B:
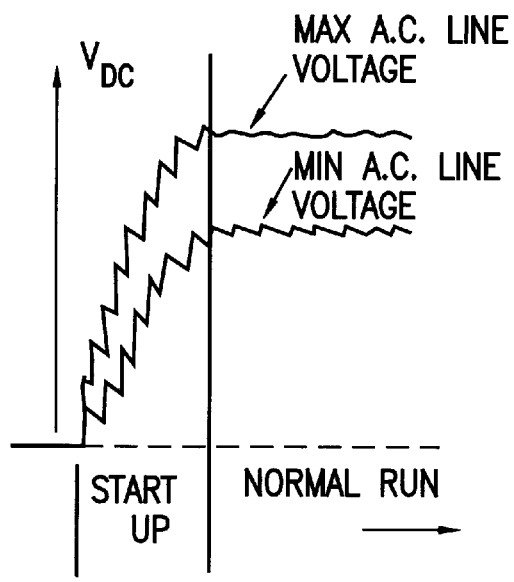
FIG. 38B shows the maximum and minimum ac line voltage of the circuit of FIG. 38(a) during startup and normal operation.

The amplitude of the ac line voltage typically will vary over a range of between 85% to 110% of the nominal value, as shown in FIG. 38B. Thus, an IGBT inverter powered from the unregulated dc bus voltage must be capable of delivering full rated output current over a similar range of dc bus voltages.

For a given operating current value, the inverter switching losses are proportional to the amplitude of the dc bus voltage, and the inverter switching losses at 85% line voltage are about 85/110=77% of the switching losses at maximum line voltage.

Figure 39A:
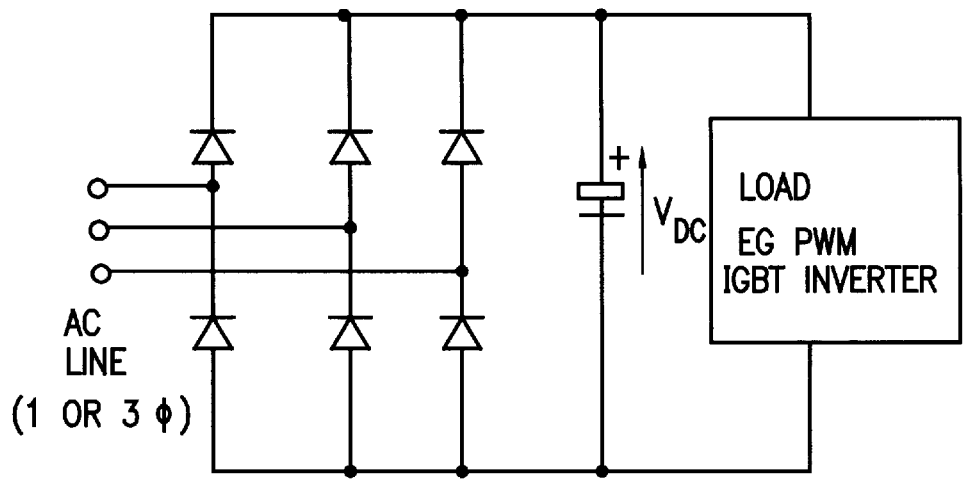
FIG. 39A shows an overall representation of a soft-start rectifier circuit with regulated dc voltage according to a still further embodiment of the present invention.
Figure 39B:
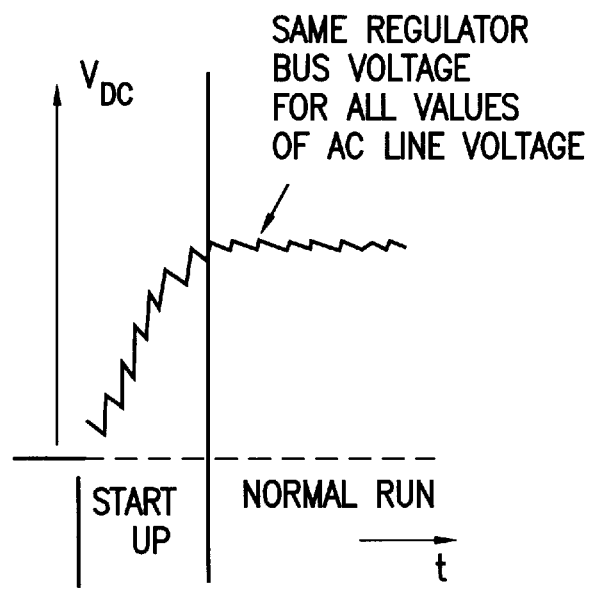
FIG. 39B shows the regulated bus voltage for all values of the ac line voltage of the circuit of FIG. 39A during startup and normal operation.

To address this problem, a further aspect of the present invention phase-controls the SCRs so that they not only provide ramp-up of the dc bus capacitor voltage at start-up but also regulate the dc bus voltage to a predetermined value during normal run operation that is independent of, i.e. within limits of, the amplitude of the ac line voltage. This arrangement is shown in FIGS. 39A and 39B.

If, for example, the dc bus voltage is regulated to a constant level that corresponds to the SCRs being fully phased-on when the ac line voltage is at 85% of its nominal value, namely that the bus voltage is held constant at 85% of the value obtained at nominal line voltage, then the following benefits are obtained:

(1) The inverter switching losses, with the same IGBTs, are reduced to approximately 77% of the maximum value previously obtained at high line voltage.

(2) The required voltage rating of the dc bus capacitors may be reduced to allow physically smaller, less expensive capacitors.

(3) The voltage capability of the IGBTs in the PWM inverter may be tailored to the new lower dc bus voltage.

Since the IGBT losses decrease as voltage capability decreases, tailoring of the IGBT characteristics enables further reduction of the inverter IGBT losses beyond that obtained using non-tailored IGBTs.

It is noted that the power factor of the ac line current will generally decrease relative to the unregulated system. This decrease is generally acceptable for industrial driver circuits but may not be acceptable for commercial and consumer applications.

Figure 40:
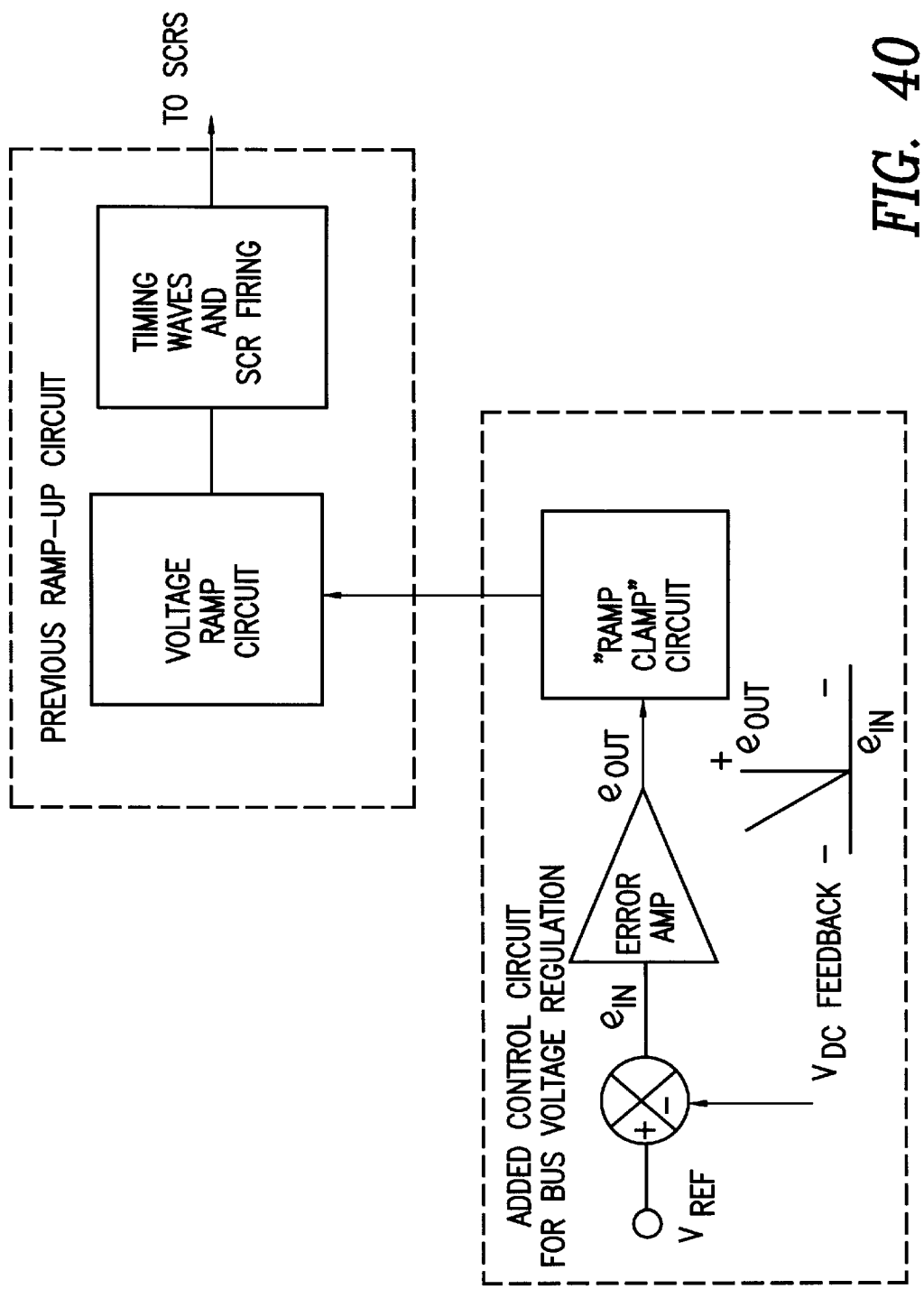
FIG. 40 is a block diagram of the control circuit of FIG. 39A according to the present invention.

A method of modifying the previously described "unregulated" soft-start phase-control scheme to provide both soft ramp-up of the dc bus capacitor and to regulate the normal operating bus voltage to a set value as shown in FIG. 40.

The basic ramp-up control circuit is similar to that previously described for the unregulated system. Superimposed on the previous system, however, is an output voltage feedback, an error amplifier, and a "ramp clamp" circuit.

The error between the output voltage feedback signal and a set reference voltage is fed to the error amplifier. The error amplifier produces no output with positive input, and produces a steeply rising output with negative input.

During ramp-up of the output voltage, the voltage error is positive, the output of the error amplifier is zero, and the superimposed voltage regulation circuit has no effect on start-up operation.

When the output voltage begins to exceed the set reference value, the steeply rising output of the error amplifier operates via the "ramp clamp" circuit to restrain the ramp voltage from further rise, thereby preventing further rise of output voltage and holding the voltage to the set value regardless of the amplitude of the ac line voltage.

IV. Further Alternative Depiction of Soft-Start Rectifier with Control IC

Figure 41:
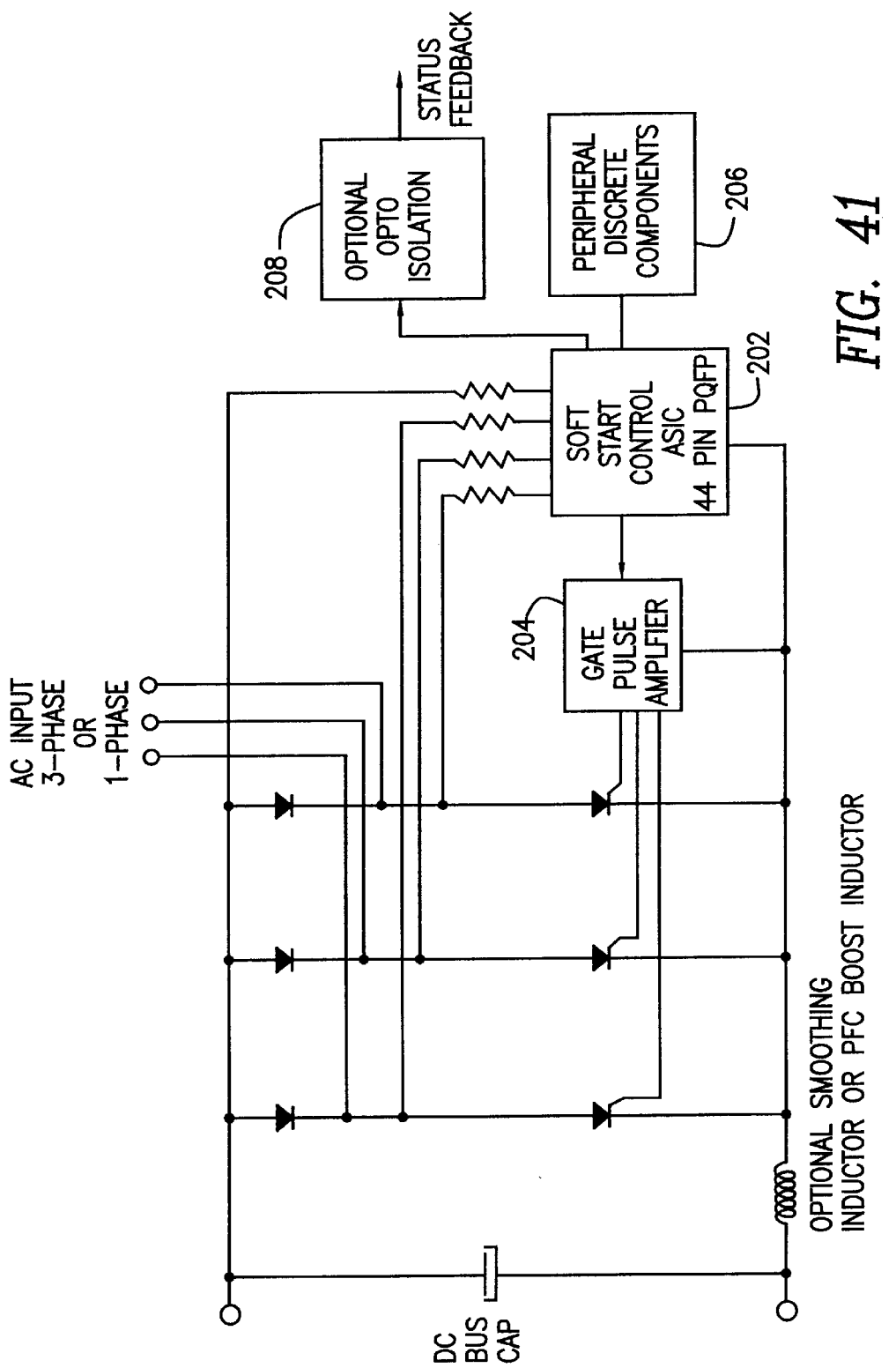
FIG. 41 shows an alternative representation of the basic schematic diagram of the soft-start rectifier according to the invention.

FIG. 41 shows the basic schematic of a further alternative embodiment of the soft-start rectifier circuit of the present invention. Here, a soft-start control ASIC senses the voltage across the diode bridge and receives control signals from peripheral discrete components. The control ASIC supplies control signals via a gate pulse amplifier that controls the thyristors of the soft-start rectifier.

Figure 42:
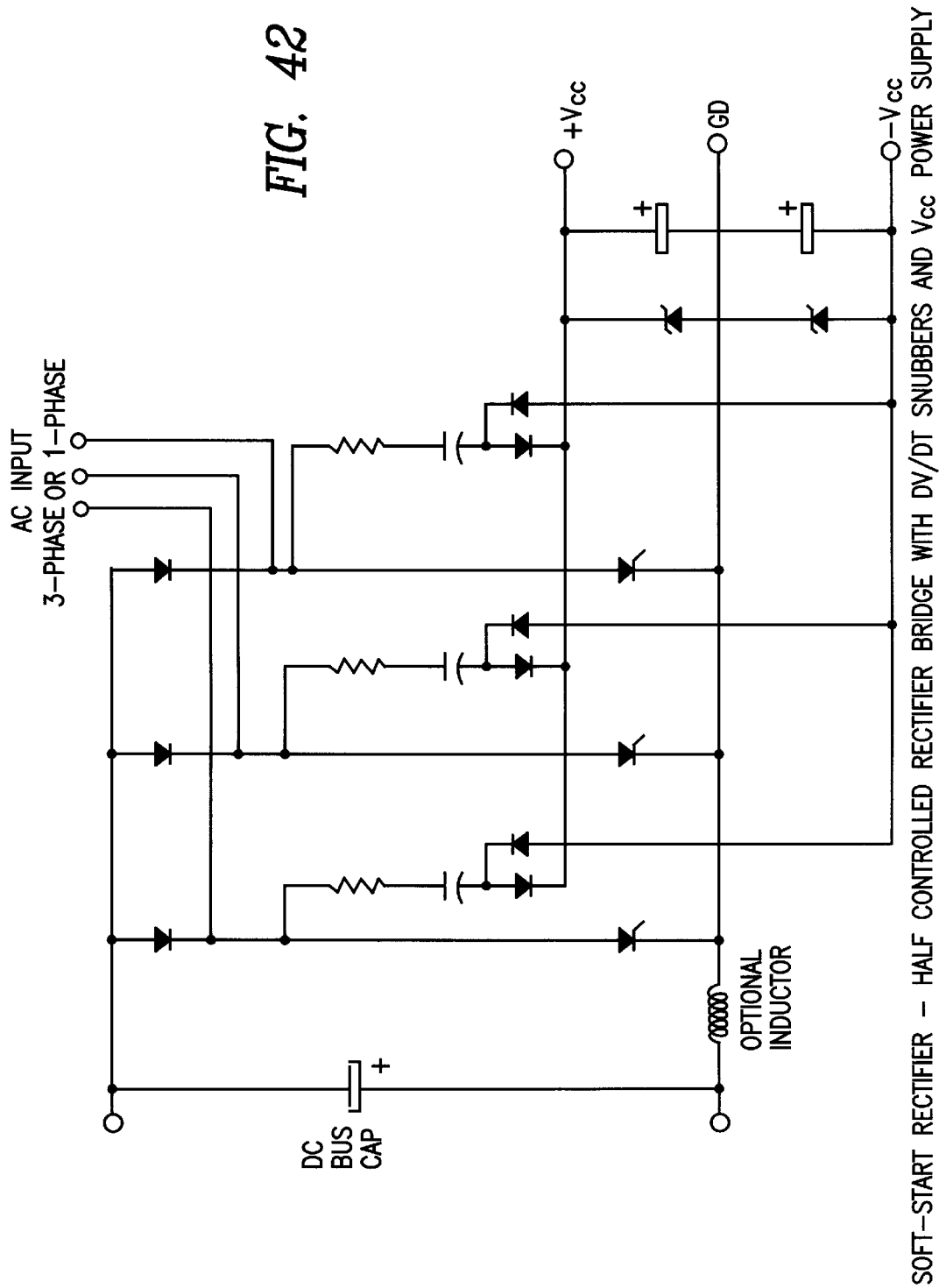
FIG. 42 is a schematic representation of the half-controlled rectifier bridge of the embodiment of FIG. 41.

FIG. 42 shows the half-controlled rectifier bridge of FIG. 41 in greater detail. The rectifier bridge is shown with the SCRs in the positive side of the bridge. The bridge is similar to that shown in FIG. 24 and includes the DV/DT snubbers formed by a capacitor and a resistor through which positive snubber current flows.

Figure 43:
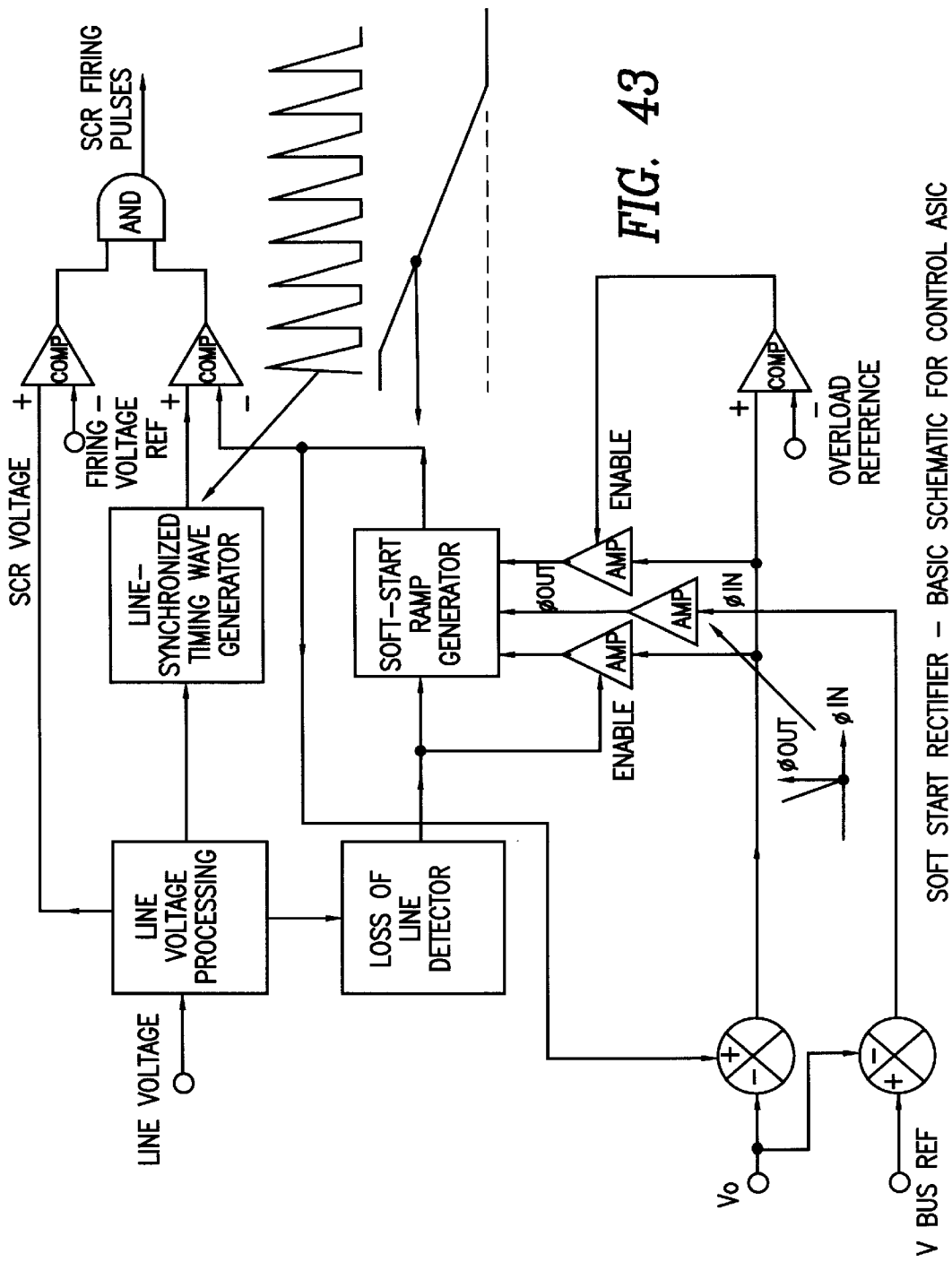
FIG. 43 is a functional diagram showing the control circuit for the soft-start rectifier shown in FIG. 41.

FIG. 43 shows the control ASIC for the soft-start rectifier shown in FIG. 41. It should be noted that this circuit includes an input $V_{BUS,REF}$ which may be an externally applied voltage. This bus voltage may be reduced at low output frequency by controlling an external reference voltage to reduce the inverter switching losses at low output frequency and thus increase the permissible output current. Alternatively, the bus voltage may be controlled at low output frequency to alleviate problems with dead time control of the inverter.

It is desirable that the soft-start rectifier circuit shown in FIGS. 41–43 have the following functions and meet the following specifications:

1. Automatic phase-control of the SCR firing pulses that serves to ramp-up the dc output voltage and limit the charging current in the dc bus capacitor when the ac input line is switched on. The ramp rate is set by an external capacitor. The maximum permissible time from line switch-on to full dc bus voltage is typically 150 ms when a minimum value external capacitor is included.

2. The soft-start rectifier should operate from either a 3-phase or a 1-phase line input.

3. The soft-start rectifier should be insensitive to input phase rotation, ac line impedance, ac line distortion, ac line spikes, dc inductance and dc bus capacitance.

4. The circuit should also maintain operation even when one input phase is lost during a 3-phase operation.

5. To protect from transient loss of line voltage, the SCRs are held fully on during an initial loss of line interval t. If the line voltage reappears during interval t, the bus capacitor is recharged without phase-control. Interval t is selected by an external capacitor value and has a value from zero and up. If the line voltage reappears after interval t, the bus capacitor is recharged with phase-control.

Delays in recharging the bus capacitor when the interval t equals zero, namely when the SCRs are always in control, is as follows:

| No. of Cycles of Line Loss Voltage | No. of Cycles After a Line is Restored to Start Recharging the Bus Capacitor |
|---|---|
| 1/2–2 | 1/2 |
| 2–3 | 1 |
| 3–4 | 1-1/2 |
| 4–6 | 2 |
| 6–8 | 2-1/2 |

6. When the ac line is switched on, the SCR firing pulses are to be held back if the rectifier output is overloaded or short-circuited to limit fault current.
7. If an overload or a short circuit occurs during normal operation, the SCR firing pulses are phased back within a half-cycle to limit the duration of significant fault current flow to a half-cycle.
8. The minimum operating temperature range of the ASIC is −40° C. to +85° C. and optimally from −40° C. to +125° C.
9. The steady-state dc bus voltage should, optionally, be regulated to a predetermined value with the input voltage regulated above a predetermined minimum value. The regulated value of the bus voltage is determined by a fixed resistor that is external to the ASIC. The fixed resistor may derive the reference voltage from the internal power supply. Further, the bus voltage should be regulated within 5% for an input voltage change of up to 50%. The bus voltage may be controlled with an external voltage. It may also be desirable to reduce the bus voltage to have its nominal value or less under predefined conditions.
10. The soft-start rectifier should operate over a minimum range of input voltage of 2 to 1, with a target range of 3.5 to 1. When operating below the minimum line voltage, the SCRs are not fired and the rectifier is shut down.
11. The rectifier should operate at the following nominal ac line voltages that are selected based on the value of the external resistor:
   (a) at 115V, −15% to +10%, and 45 to 65 Hz, 1-phase operation;
   (b) at 208V −15% to +265V +10%, and 45 to 65 Hz, 1-phase and 3-phase operation; and
   (c) at 380V −15% to +560V +10%, and 45 to 65 Hz, 3-phase operation and operates with one phase missing.

It is desirable to combine requirements (a) and (b) into one range and to combine requirements (b) and (c) into one range.

Figure 44A:
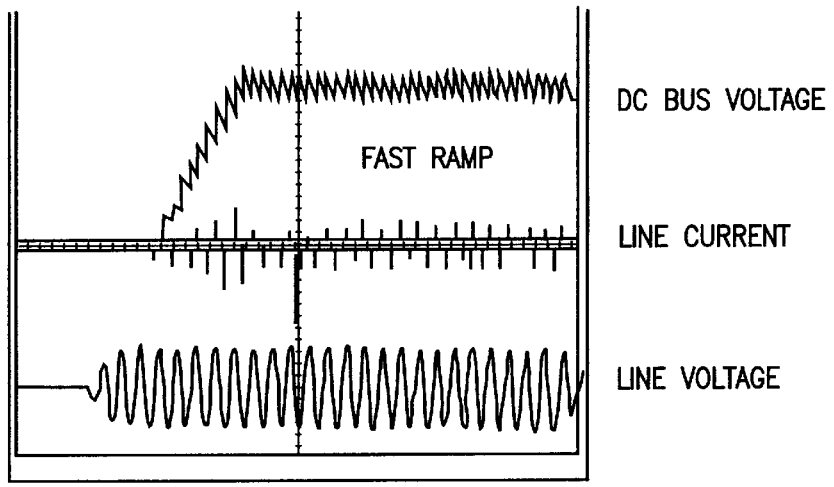
FIGS. 44A–44C show timing diagrams of the DC bus voltage, the line current and the line voltage for a fast ramp up, a slow ramp up and a slow ramp up with regulated bus voltage, respectively, of a one-phase, 60 Hz low impedance line using the circuits of FIGS. 41–43.
Figure 44B:
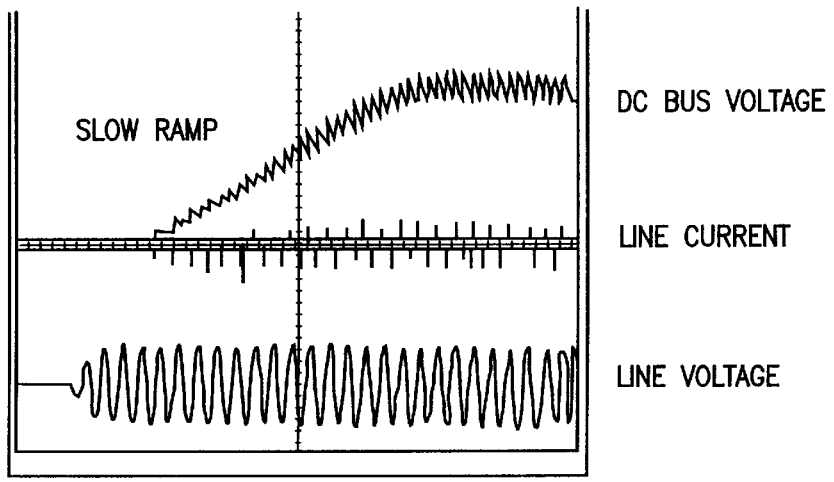
Figure 44C:
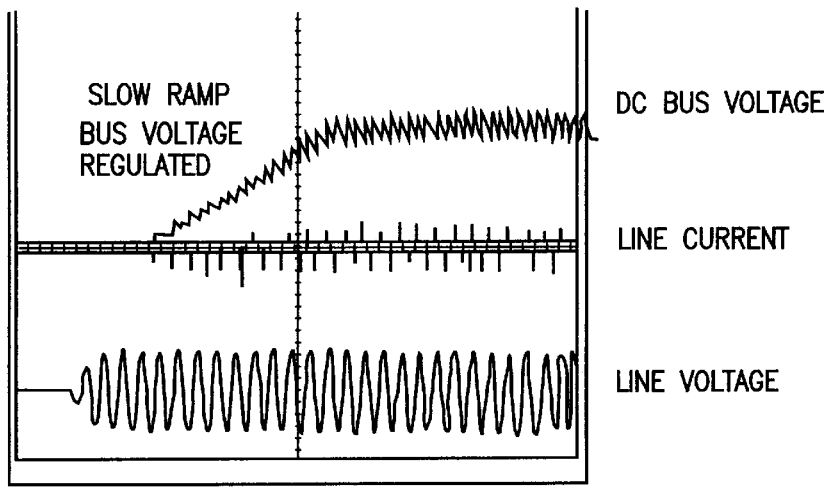

12. The status feedback signal should be supplied for loss of phase, low ac line voltage and low dc bus voltage. A status OK signal should be supplied for a 0.5 mA minimum voltage for the external opto-isolator.
13. Other specifications should be required for the range of input line inductance, the input line in balance, range of dc bus capacitance, range of dc inductance, steady-state input line voltage distortion, and transient input line voltage spikes. FIGS. 44A–44C show timing diagrams of the DC bus voltage, the line current and the line voltage for a fast ramp up, a slow ramp up and a slow ramp up with regulated bus voltage, respectively, of a one-phase, 60 Hz low impedance line using the circuits of FIGS. 41–43.

Figure 45A:
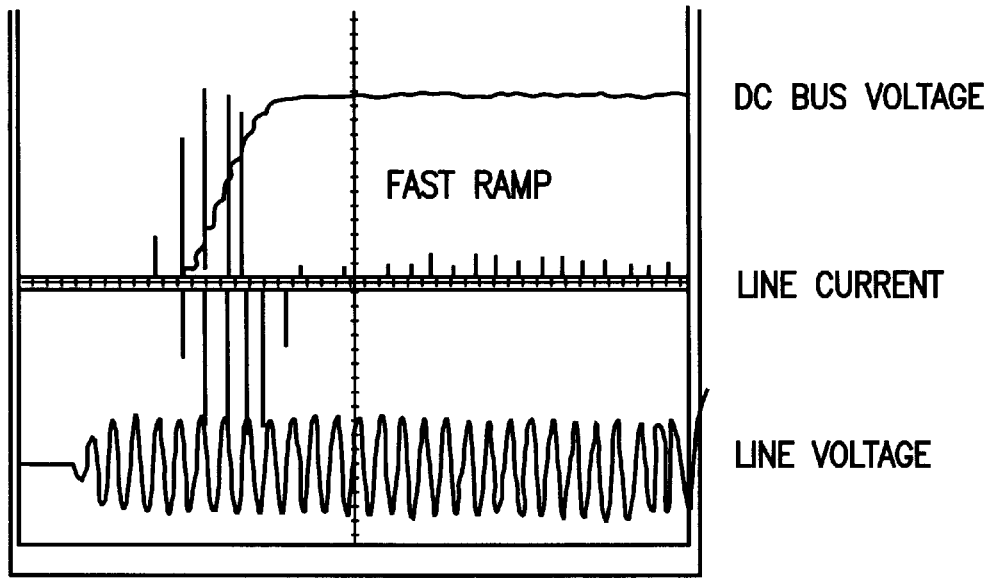
FIGS. 45A and 45B show timing diagrams of the DC bus voltage, the line current and the line voltage for a fast ramp up and a slow ramp up, respectively, of a one-phase, 60 Hz low impedance line with a large bus capacitance using the circuits shown in FIGS. 41–43.
Figure 45B:
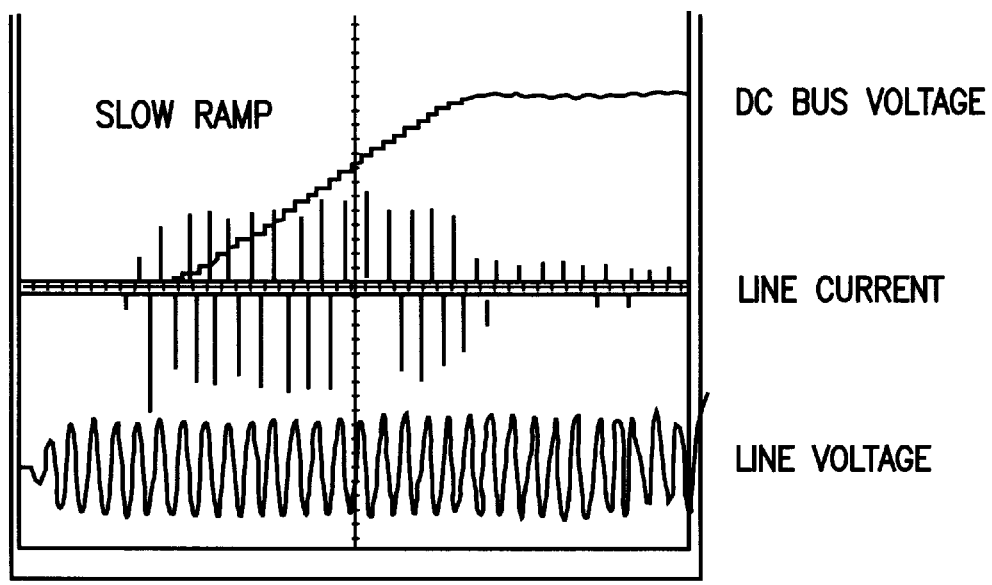

FIGS. 45A and 45B show timing diagrams of the DC bus voltage, the line current and the line voltage for a fast ramp up and a slow ramp up, respectively, of a one-phase, 60 Hz low impedance line with a large bus capacitance using the circuits shown in FIGS. 41–43.

Figure 46A:
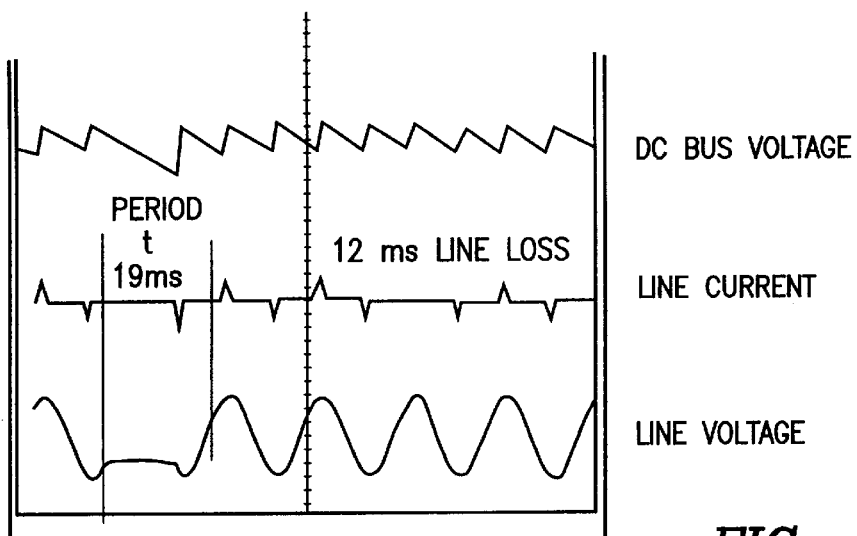
FIGS. 46A–46C show the DC bus voltage, the line current and the line voltage for a 12 ms, 16 ms and 22 ms line loss, respectively, of a one-phase, 60 Hz low impedance line using the circuits shown in FIGS. 41–43.
Figure 46B:
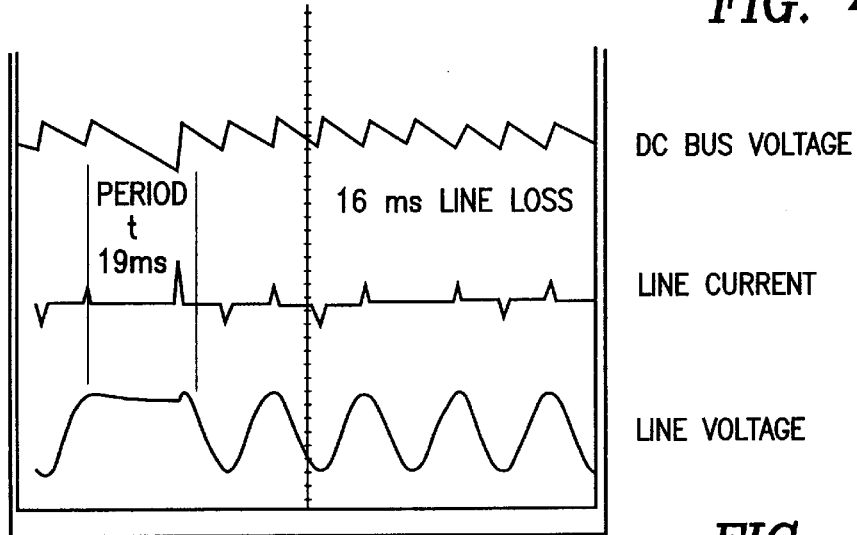
Figure 46C:
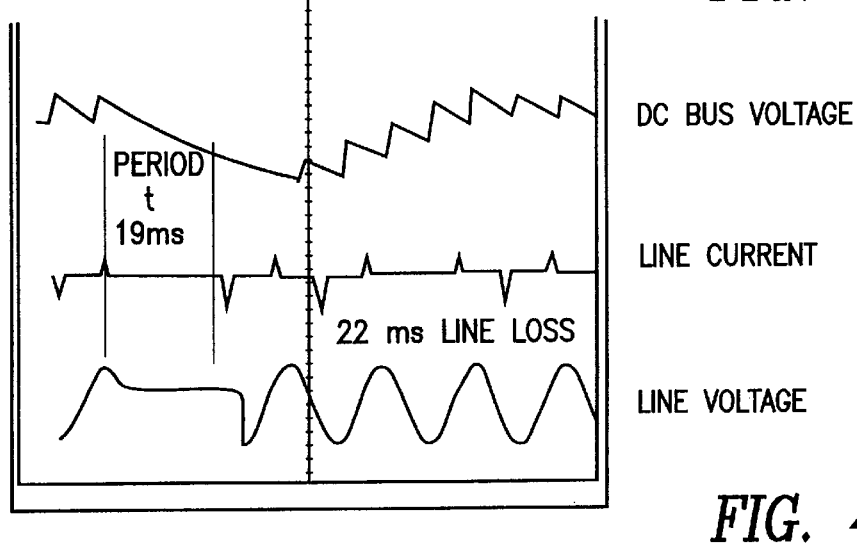

FIGS. 46A–46C show the DC bus voltage, the line current and the line voltage for a 12 ms, 16 ms and 22 ms line loss, respectively, of a one-phase, 60 Hz low impedance line using the circuits shown in FIGS. 41–43.

Figure 47A:
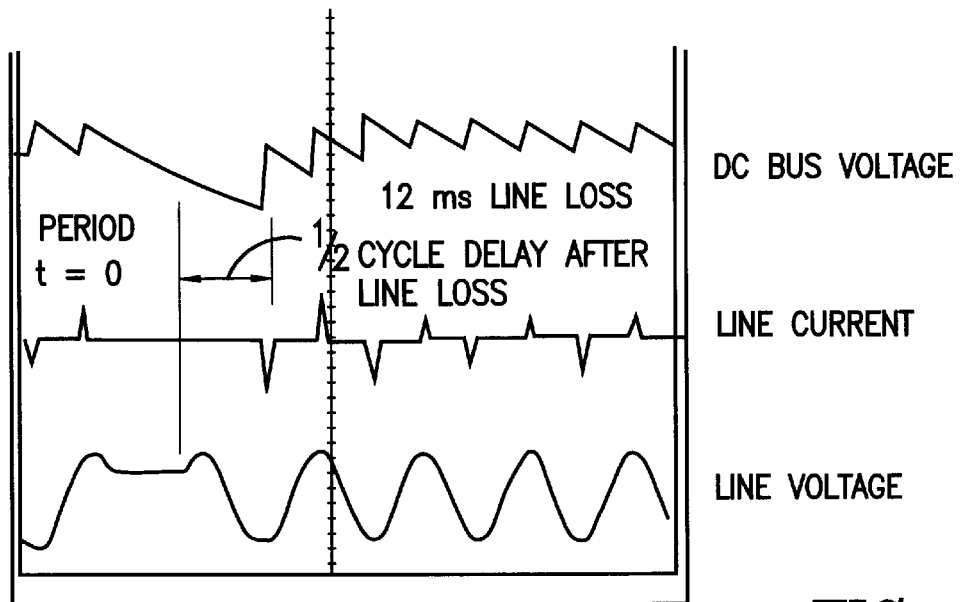
FIGS. 47A and 47B show the DC bus voltage, the line current and the line voltage for a 12 ms and 22 ms line loss, respectively, having a half-cycle delay after the line loss of a one-phase, 60 Hz low impedance line with small bus capacitance using the circuits shown in FIGS. 41–43.
Figure 47B:
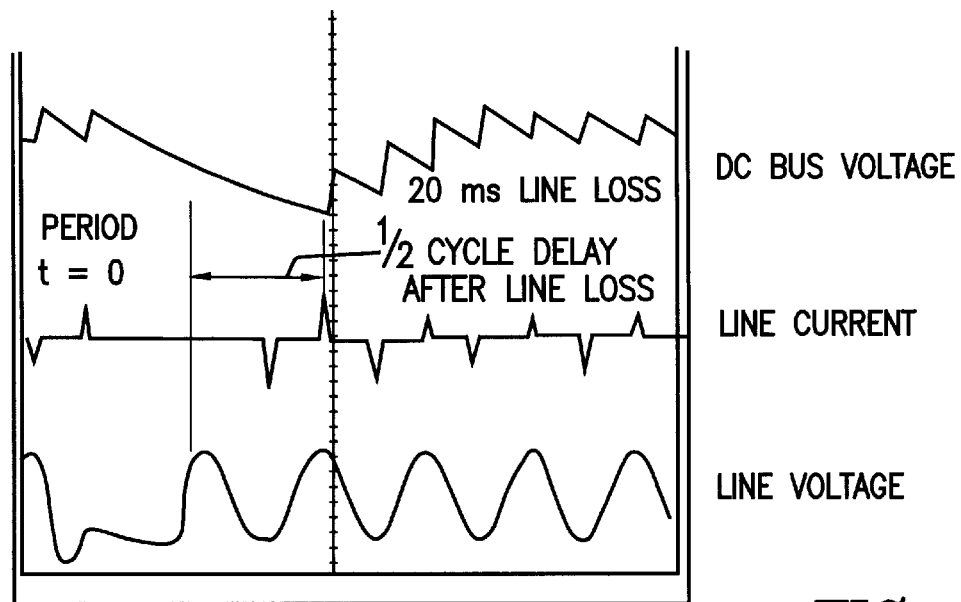

FIGS. 47A and 47B show the DC bus voltage, the line current and the line voltage for a 12 ms and 22 ms line loss, respectively, having a half-cycle delay after the line loss of a one-phase, 60 Hz low impedance line with small bus capacitance using the circuits shown in FIGS. 41–43.

Figure 48A:
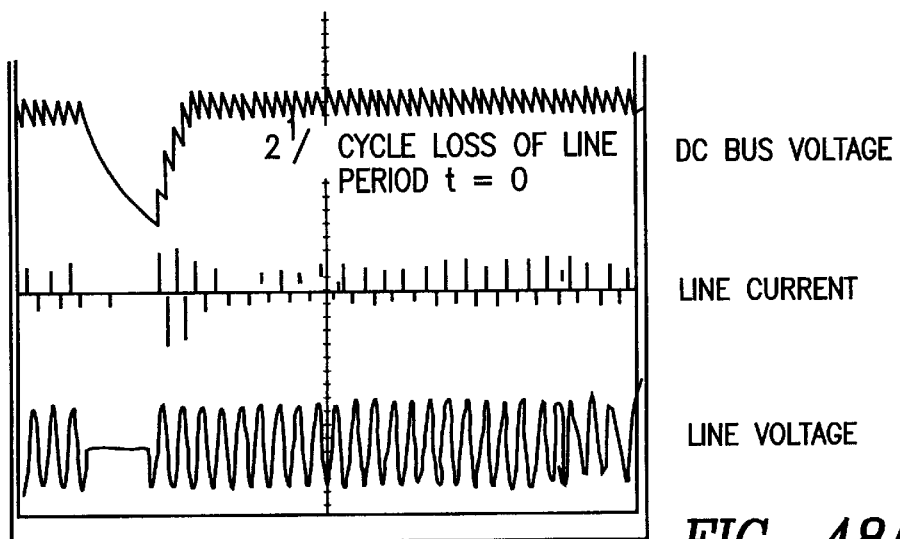
FIGS. 48A–48C show the DC bus voltage, the line current and the line voltage for a 2½, 4½, 7½ cycle loss of line, respectively, of a one-phase, 60 Hz low impedance line with small bus capacitance using the circuits shown in FIGS. 41–43.
Figure 48B:
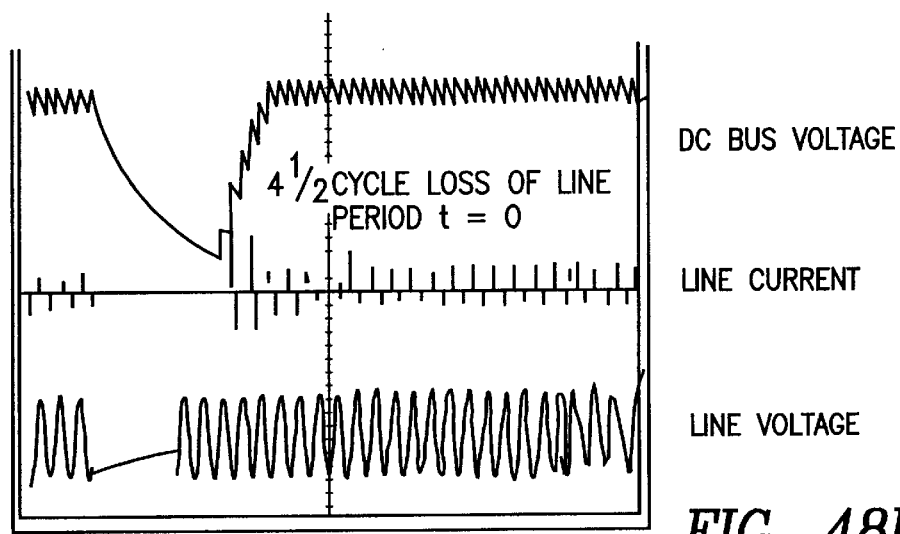
Figure 48C:
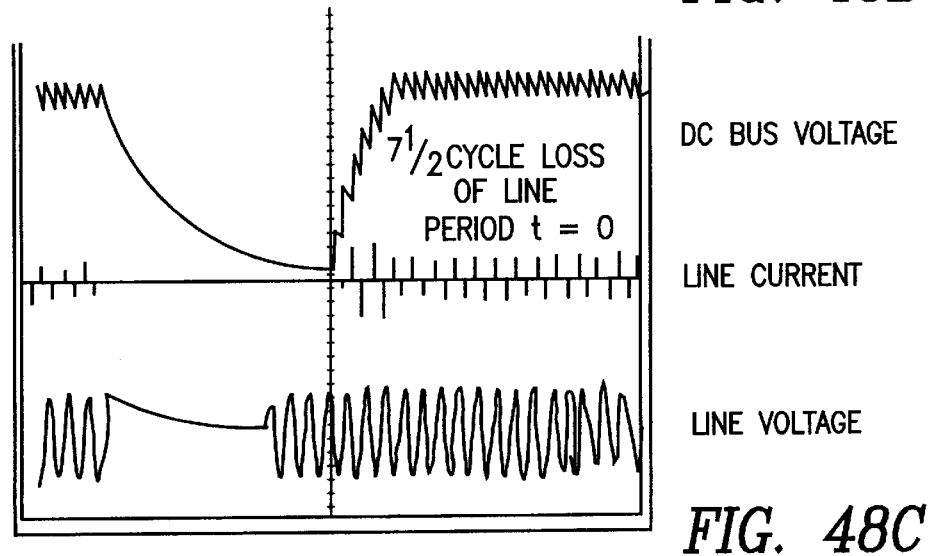

FIGS. 48A–48C show the DC bus voltage, the line current and the line voltage for a 2½, 4½, 7½ cycle loss of line, respectively, of a one-phase, 60 Hz low impedance line with small bus capacitance using the circuits shown in FIGS. 41–43.

Figure 49A:
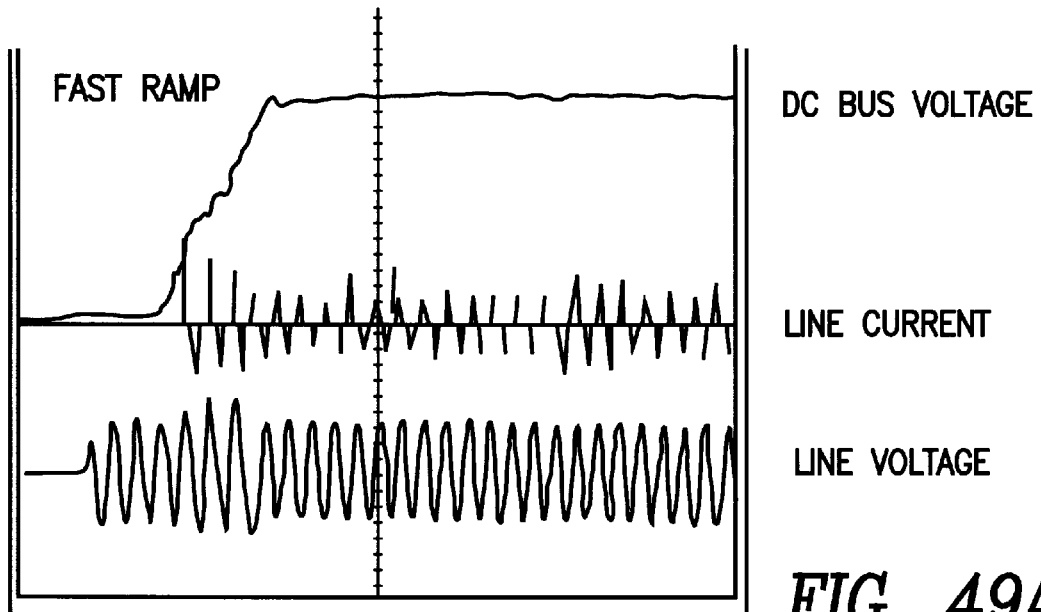
FIGS. 49A and 49B show the DC bus voltage, the line current and the line voltage for a fast ramp up and fast ramp up with bus voltage regulated, respectively, of a 3-phase, 60 Hz high impedance line with small bus capacitance using the circuits shown in FIGS. 41–43.
Figure 49B:
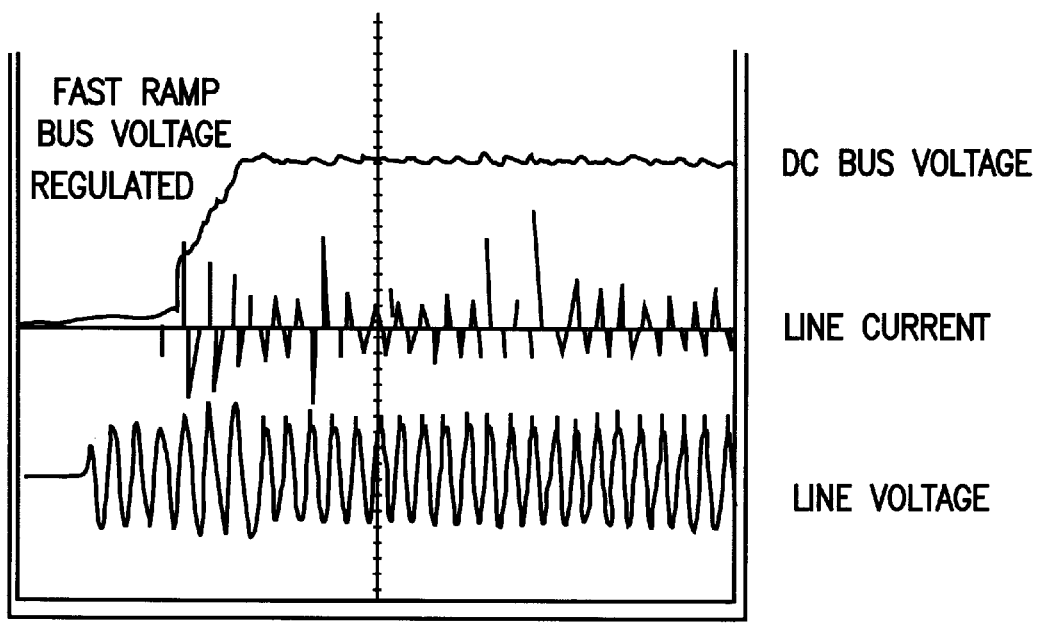

FIGS. 49A and 49B show the DC bus voltage, the line current and the line voltage for a fast ramp up and fast ramp up with bus voltage regulated, respectively, of a 3-phase, 60 Hz high impedance line with small bus capacitance using the circuits shown in FIGS. 41–43.

Figure 50A:
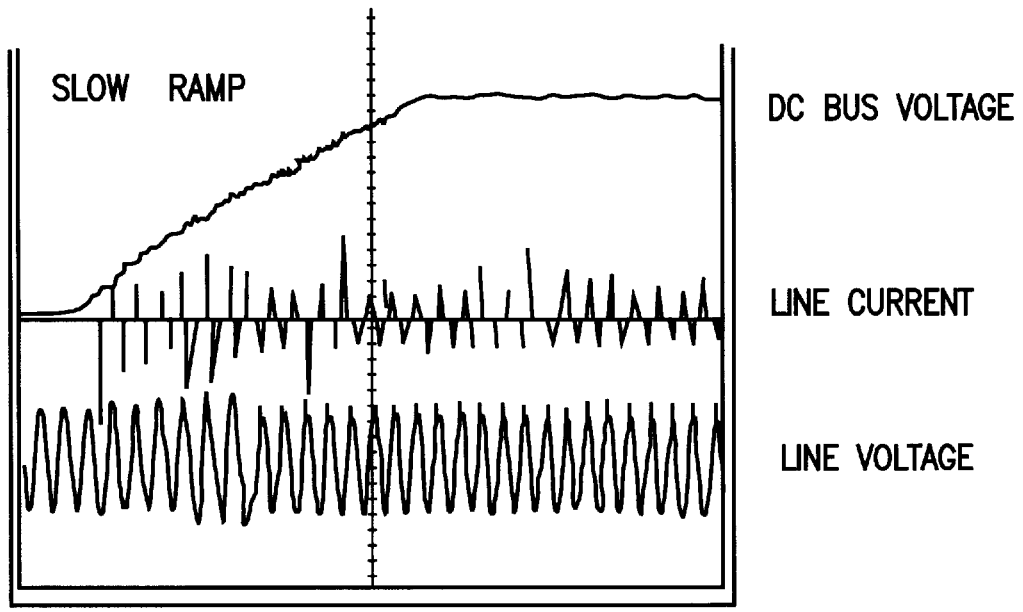
FIGS. 50A and 50B show the DC bus voltage, the line current and the line voltage for a slow ramp and a slow ramp up with bus voltage regulated, respectively, of a 3-phase, 60 Hz high impedance line with small bus capacitance using the circuits shown in FIGS. 41–43.
Figure 50B:
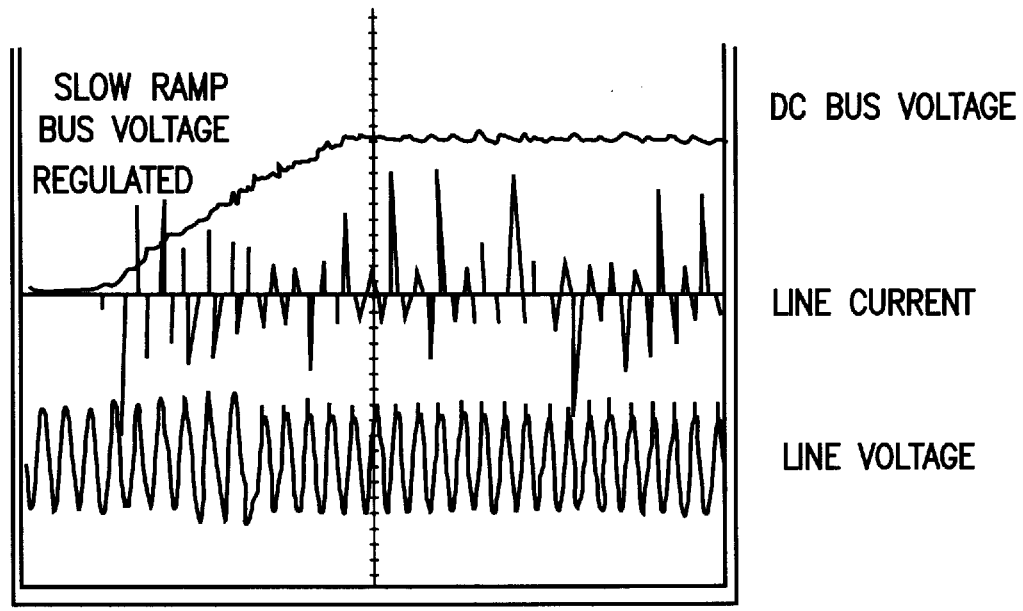

FIGS. 50A and 50B show the DC bus voltage, the line current and the line voltage for a slow ramp and a slow ramp up with bus voltage regulated, respectively, of a 3-phase, 60 Hz high impedance line with small bus capacitance using the circuits shown in FIGS. 41–43.

Figure 51A:
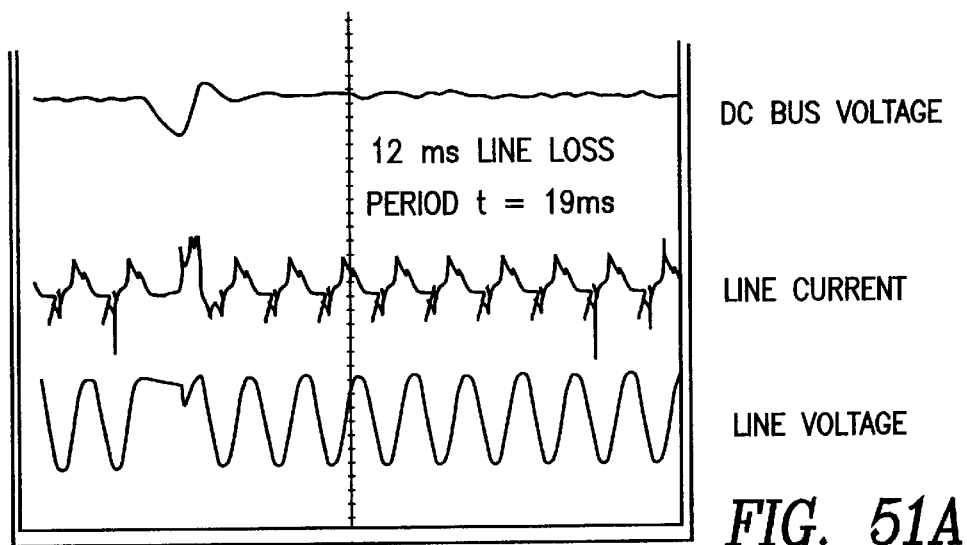
FIGS. 51A–51C show the DC bus voltage, the line current and the line voltage for a 12 ms, 19 ms and 20 ms line loss, respectively, with a period T=19 ms of a 3-phase, 60 Hz high impedance line using the circuits shown in FIGS. 41–43.
Figure 51B:
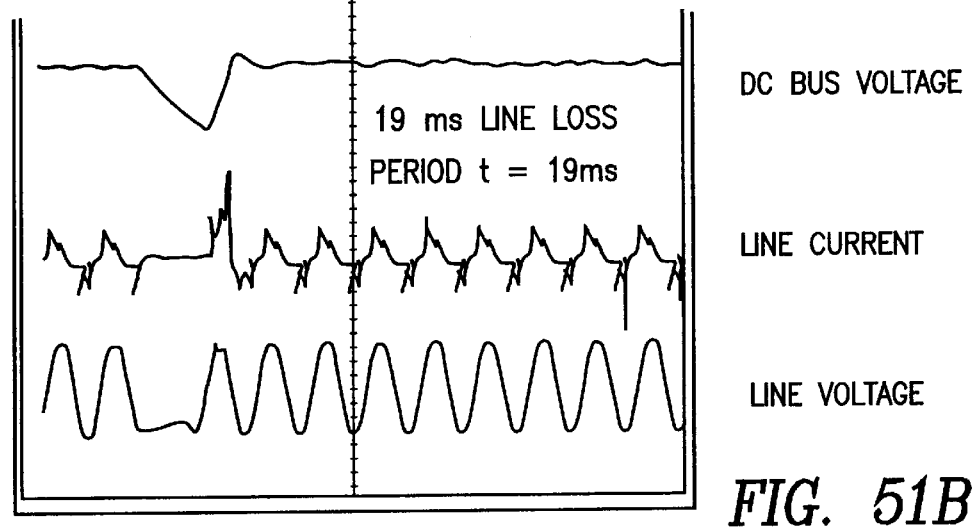
Figure 51C:
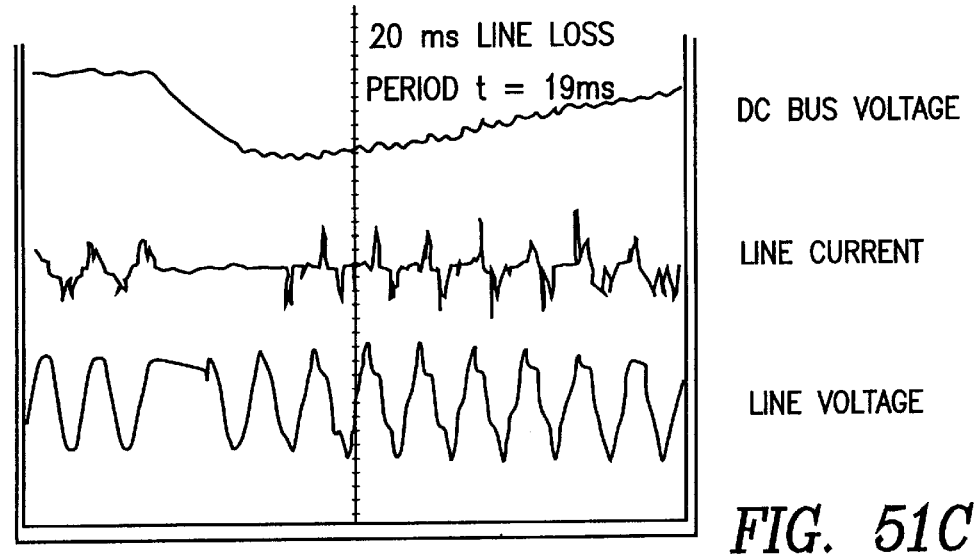

FIGS. 51A–51C show the DC bus voltage, the line current and the line voltage for a 12 ms, 19 ms and 20 ms line loss, respectively, with a period T=19 ms of a 3-phase, 60 Hz high impedance line using the circuits shown in FIGS. 41–43.

Figure 52A:
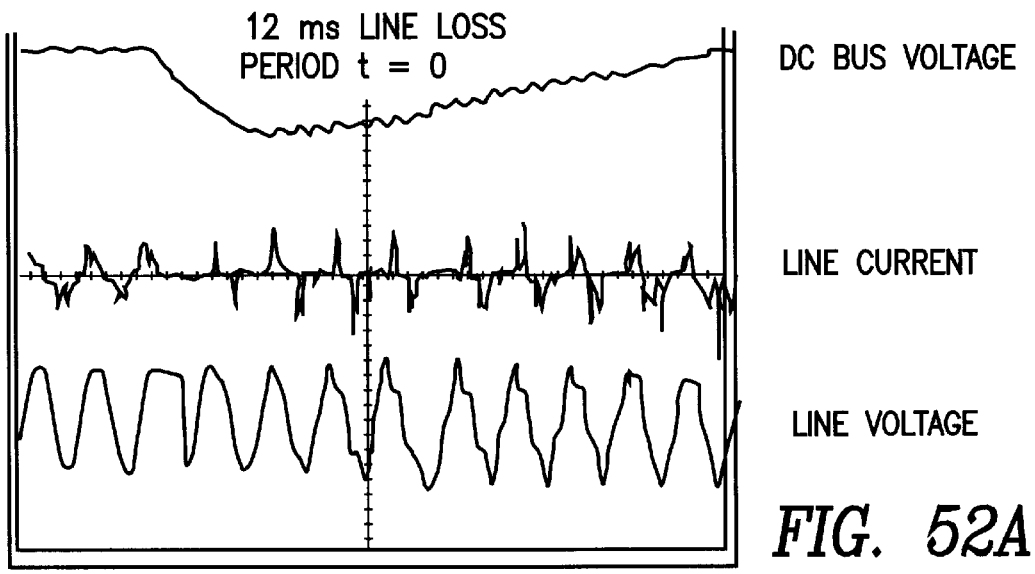
FIGS. 52A and 52B show the DC bus voltage, the line current and the line voltage for a 12 ms and 25 ms line loss, respectively, with a period T=0 ms of a 3-phase, 60 Hz high impedance line with small bus capacitor using the circuits shown in FIGS. 41–43.
Figure 52B:
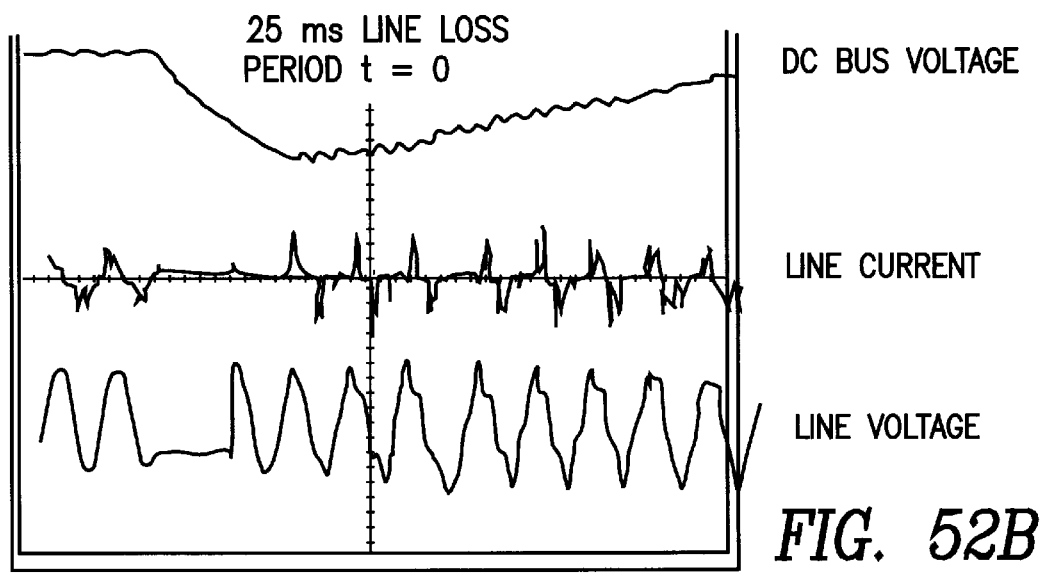

FIGS. 52A and 52B show the DC bus voltage, the line current and the line voltage for a 12 ms and 25 ms line loss, respectively, with a period T=0 ms of a 3-phase, 60 Hz high impedance line with small bus capacitor using the circuits shown in FIGS. 41–43.

Figure 53A:
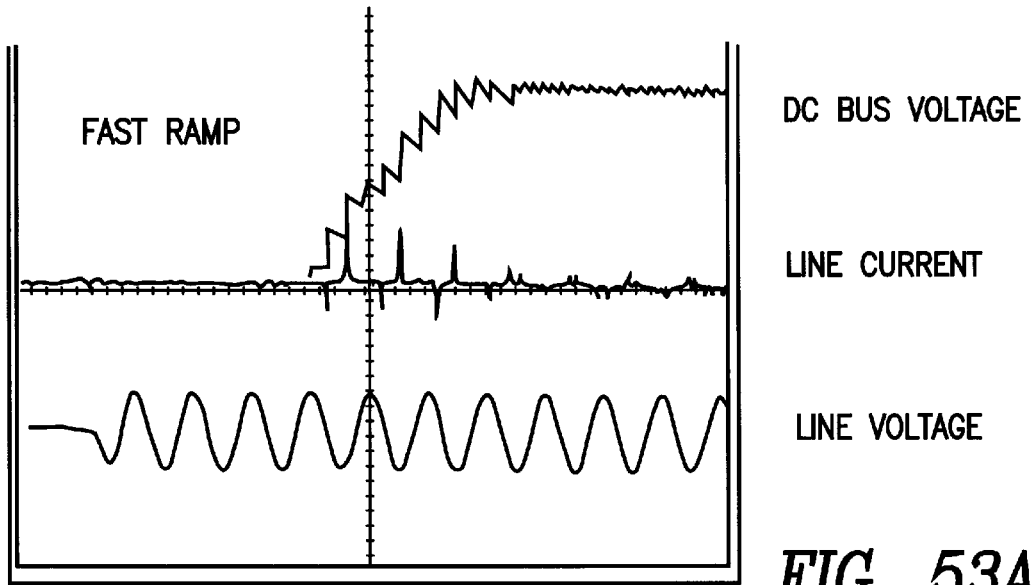
FIGS. 53A and 53B show the DC bus voltage, the line current and the line voltage for a fast ramp and fast ramp up with DC bus voltage regulated, respectively, of a 3-phase, 60 Hz low impedance line with small bus capacitance using the circuits shown in FIGS. 41–43.
Figure 53B:
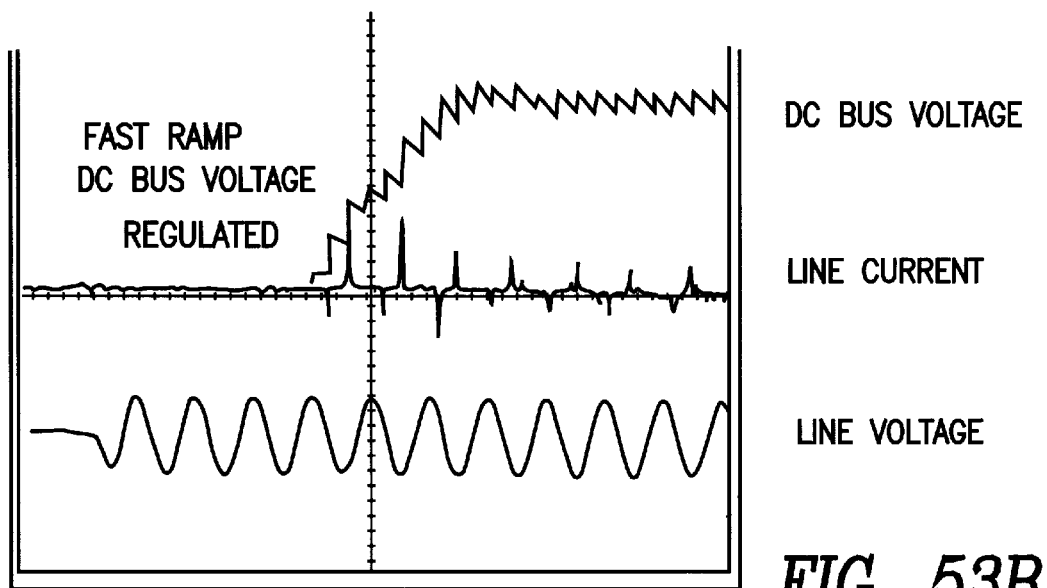

FIGS. 53A and 53B show the DC bus voltage, the line current and the line voltage for a fast ramp and fast ramp up with DC bus voltage regulated, respectively, of a 3-phase, 60 Hz low impedance line with small bus capacitance using the circuits shown in FIGS. 41–43.

Figure 54A:
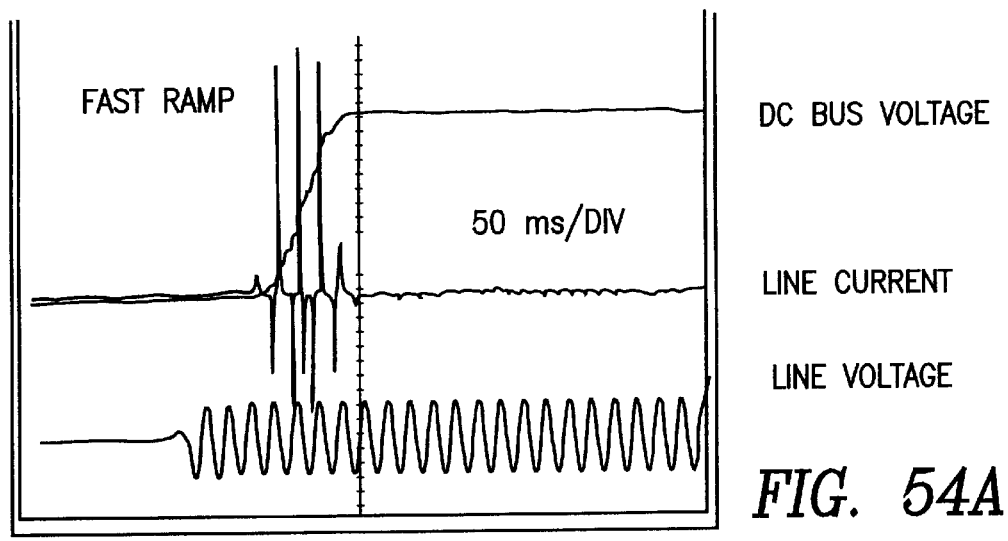
FIGS. 54A and 54B show the DC bus voltage, the line current and the line voltage for a fast ramp and fast ramp up with DC bus voltage regulated, respectively, of a 3-phase, 60 Hz low impedance line with small bus capacitance using the circuits shown in FIGS. 41–43.
Figure 54B:
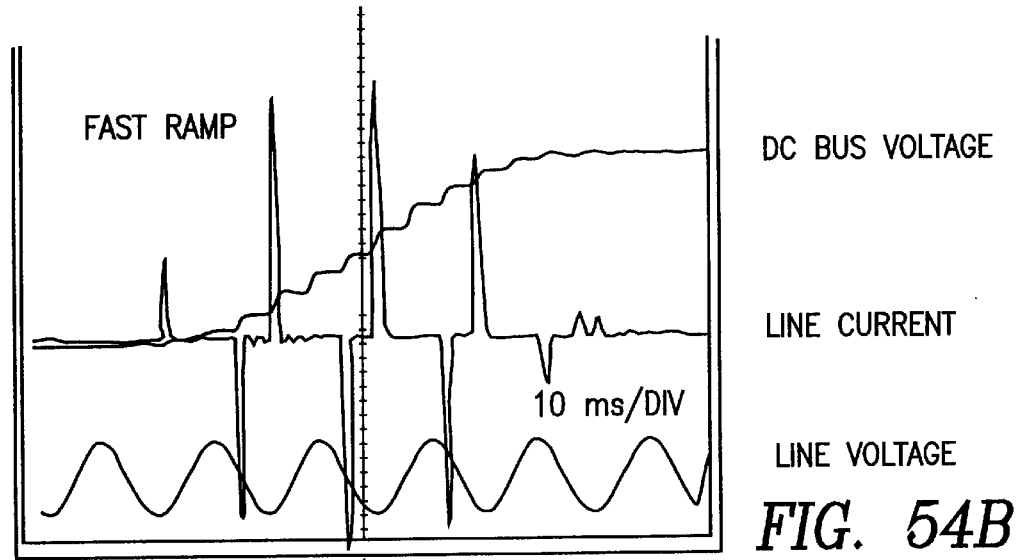
Figure 54C:
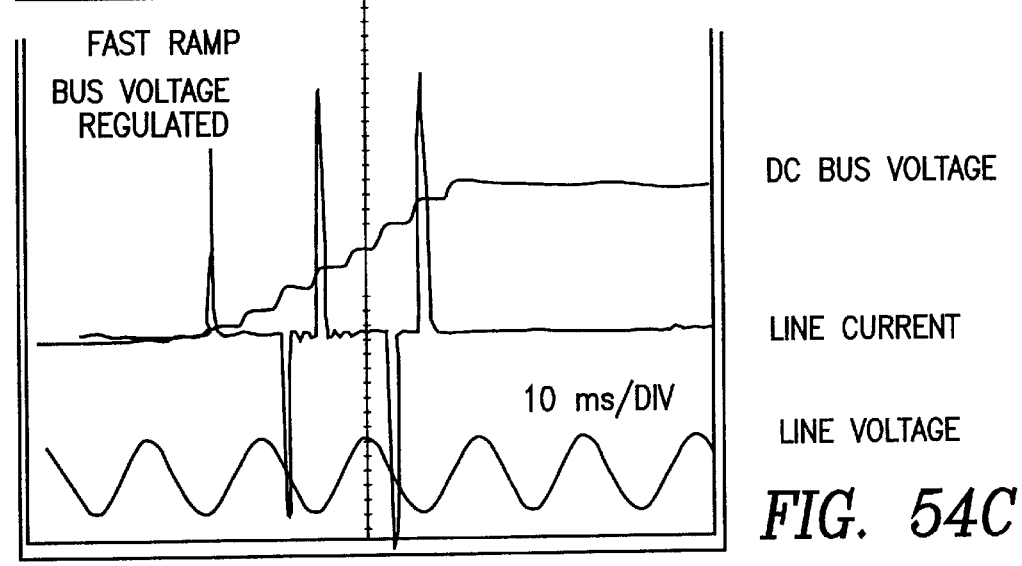
FIG. 54C shows these values for a fast ramp up with DC bus voltage regulated for the same circuits.

FIGS. 54A and 54B show the DC bus voltage, the line current and the line voltage for a fast ramp and fast ramp up with DC bus voltage regulated, respectively, of a 3-phase, 60 Hz low impedance line with small bus capacitance using the circuits shown in FIGS. 41–43; and FIG. 54C shows these values for a fast ramp up with DC bus voltage regulated for the same circuits.

Figure 55A:
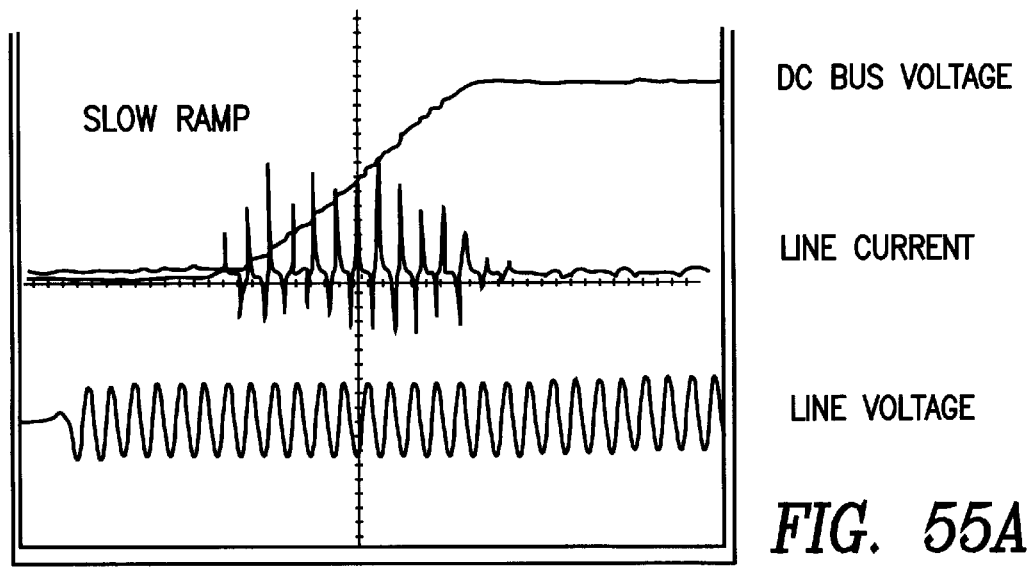
FIGS. 55A and 55B show the DC bus voltage, the line current and the line voltage for a slow ramp and slow ramp up with bus voltage regulated, respectively, of a 3-phase, 60 Hz high impedance line with small bus capacitance using the circuits shown in FIGS. 41–43.
Figure 55B:
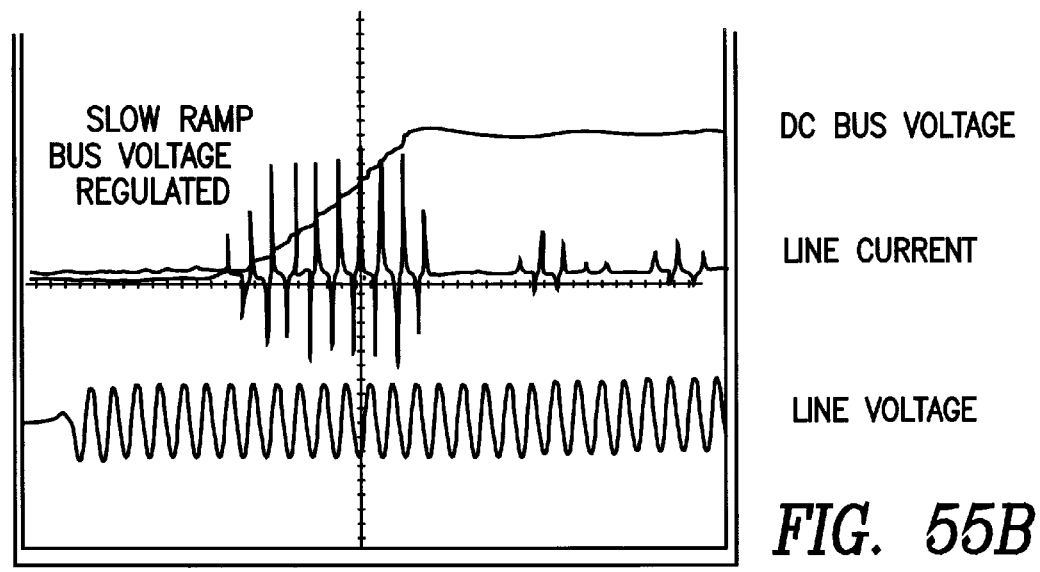

FIGS. 55A and 55B show the DC bus voltage, the line current and the line voltage for a slow ramp and slow ramp up with bus voltage regulated, respectively, of a 3-phase, 60 Hz high impedance line with small bus capacitance using the circuits shown in FIGS. 41–43.

Although the present invention has been described in relation to particular embodiments thereof, many other variations and modifications and other uses will become apparent to those skilled in the art.

What is claimed is:

1. A rectifier circuit for converting power from an AC source having one or more phases to DC power having a voltage (Vo) from a Vo+ node to a Vo− node, the rectifier circuit comprising:

at least first and second rectifier legs coupled from the Vo− node to the Vo+ node, each rectifier leg including a diode and a silicon controlled rectifier (SCR), respective anodes of the diodes being coupled to the Vo− node, respective cathodes of the diodes being coupled to respective anodes of the SCRs at respective AC input nodes, and respective cathodes of the SCRs being coupled to the Vo+ node; and a gate drive circuit operable to permit one or more of the SCRs to fire at respective one or more firing angles during half cycles of respective phases of the AC source, the gate drive circuit including a ramp circuit having:

a first integrator circuit operable to produce ramp pulses corresponding to respective integrals of the half cycles of the one or more phases of the AC source;

a peak detector circuit operable to produce Vp;

a second integrator circuit operable to produce a ramp signal (Vramp corresponding to an integal of Vp;

a comparator circuit operable to produce pulsed output signals corresponding with comparisons of the respective ramp pulses with the difference of Vp and Vramp, the pulsed output signals corresponding with the respective firing angles of the SCRs, the firing angles of the gate drive circuit limiting the one or more SCRs to fire (i) only at respective firing angles between about 90° to 180° when Vo is below a predetermined value; and (ii) at firing angles progressively lower than 180° as Vo ramps up from a voltage below the predetermined value to progressively higher values.

2. The rectifier circuit of claim 1, wherein the gate drive circuit permits the respective firing angles to be progressively lower than 180° as Vo ramps up from a voltage below the predetermined value to progressively higher values.

3. The rectifier circuit of claim 2, wherein the gate drive circuit permits substantially unrestricted firing of the one or more SCRs when Vo has reached or exceeded the predetermined value.

4. The rectifier circuit of claim 3, wherein the gate drive circuit permits substantially unrestricted firing of the one or more SCRs when Vo has met or exceeded the predetermined value for a predetermined period of time.

5. The rectifier circuit of claim 4, wherein the predetermined period of time is about 10 ms.

6. The rectifier circuit of claim 3, wherein the one or more phases of the AC source have a respective peak voltage (Vp), the predetermined value being about 75% of Vp.

7. The rectifier circuit of claim 1, wherein the firing angles begin when the respective ramp pulses substantially meet or exceed the difference of Vp and Vramp.

8. The rectifier circuit of claim 1, further comprising an overcurrent protection circuit operable to reset Vramp when Vo is smaller than Vramp−(Vp−V∫pk) by a predetermined amount, where V∫pk corresponds with the integral of the ramp pulses.

9. The rectifier circuit of claim 8, wherein the predetermined amount is a fraction of Vp.

10. The rectifier circuit of claim 9, wherein the fraction of Vp is about 75%.

11. The rectifier circuit of claim 1, further comprising a loss of phase circuit operable to reset Vramp when one or more voltages across respective SCRs falls below a predetermined threshold.

12. The rectifier circuit of claim 11, wherein the one or more voltages are averaged, the loss of phase circuit resetting Vramp when the average voltage across the SCRs falls below the predetermined threshold.

13. A rectifier circuit for converting power from a three phase AC source to DC power having a voltage (Vo) from a Vo+ node to a Vo− node, the rectifier circuit comprising:

first, second, and third rectifier legs coupled from the Vo− node to the Vo+ node, each rectifier leg including a diode and a silicon controlled rectifier (SCR), respective anodes of the diodes being coupled to the Vo− node, respective cathodes of the diodes being coupled to respective anodes of the SCRs at respective AC input nodes, and respective cathodes of the SCRs being coupled to the Vo+ node;

a gate drive circuit operable to permit the SCRs to fire at respective firing angles during half cycles of the respective phases of the AC source, the gate drive circuit including a ramp circuit having:

first, second, and third integrator circuits operable to produce ramp pulses corresponding to integrals of the half cycles of the respective phases of the AC source;

a peak detector circuit operable to produce Vp;

a fourth integrator circuit operable to produce a ramp signal (Vramp corresponding to an integral of Vp;

a comparator circuit operable to produce three pulsed output signals, each pulsed output signal corresponding with a comparison of a respective ramp pulse with the difference of Vp and Vramp, the pulsed output signals corresponding with the respective firing angles of the SCRs, the gate drive circuit limiting the SCRs to turn on (i) only at respective firing angles between about 90° to 180° when Vo is below a predetermined value; and (ii) at firing angles progressively lower than 180° as Vo ramps up from a voltage below the predetermined value to progressively higher values.

14. The rectifier circuit of claim 13, wherein the gate drive circuit permits the respective firing angles to be progressively lower than 180° as Vo ramps up from a voltage below the predetermined value to progressively higher values.

15. The rectifier circuit of claim 14, wherein the gate drive circuit permits substantially unrestricted firing of the SCRs when Vo has reached or exceeded the predetermined value.

16. The rectifier circuit of claim 15, wherein the gate drive circuit permits substantially unrestricted firing of the SCRs when Vo has met or exceeded the predetermined value for a predetermined period of time.

17. The rectifier circuit of claim 16, wherein the predetermined period of time is about 10 ms.

18. The rectifier circuit of claim 15, wherein the three phases of the AC source have a respective peak voltage (Vp), the predetermined value being about 75% of Vp.

19. The rectifier circuit of claim 13, wherein the respective firing angles begin when the respective ramp pulses substantially meet or exceed the difference of Vp and Vramp.

20. The rectifier circuit of claim 13, further comprising an overcurrent protection circuit operable to reset Vramp when Vo is smaller than Vramp−(Vp−V∫pk) by a predetermined amount, where V∫pk corresponds with the integral of the ramp pulses.

21. The rectifier circuit of claim 20, wherein the predetermined amount is a fraction of Vp.

22. The rectifier circuit of claim 21, wherein the fraction of Vp is about 75%.

23. The rectifier circuit of claim 13, further comprising a loss of phase circuit operable to reset Vramp when at least one voltage across the SCRs falls below a predetermined threshold.

24. The rectifier circuit of claim 23, wherein the voltages across the SCRs are averaged, the loss of phase circuit resetting Vramp when the average voltage across the SCRs falls below the predetermined threshold.

25. A rectifier circuit for converting power from an AC source having one or more phases to DC power having a voltage (Vo) from a Vo+ node to a Vo− node, the rectifier circuit comprising:

at least first and second rectifier legs coupled from the Vo− node to the Vo+ node, each rectifier leg including a diode and a silicon controlled rectifier (SCR), respective anodes of the diodes being coupled to the Vo− node, respective cathodes of the diodes being coupled to respective anodes of the SCRs at respective AC input nodes, and respective cathodes of the SCRs being coupled to the Vo+ node;

a gate drive circuit operable to permit the SCRs to fire at respective firing angles during half cycles of the phases of the AC source, the gate drive circuit including a ramp circuit having:

a first integrator circuit operable to produce ramp pulses corresponding to an integral of the half cycles of the one phase of the AC source;

a peak detector circuit operable to produce Vp;

a second integrator circuit operable to produce a ramp signal (Vramp corresponding to an integral of Vp;

a comparator circuit operable to produce a pulsed output signal corresponding with a comparison of the ramp pulses with the difference of Vp and Vramp, the pulsed output signal corresponding with the firing angle of the one SCR, the gate drive circuit permitting only one SCR to fire (i) at a firing angle between about 90° to 180° and prohibiting other SCRs from firing when Vo is below a predetermined value; and (ii) at firing angles progressively lower than 180° as Vo ramps up from a voltage below the predetermined value to progressively higher values.

26. The rectifier circuit of claim 25, wherein the gate drive circuit permits the firing angle to be progressively lower than 180° as Vo ramps up from a voltage below the predetermined value to progressively higher values.

27. The rectifier circuit of claim 26, wherein the gate drive circuit permits substantially unrestricted firing of the one SCR when Vo has reached or exceeded the predetermined value.

28. The rectifier circuit of claim 27, wherein the gate drive circuit permits substantially unrestricted firing of the one SCR when Vo has met or exceeded the predetermined value for a predetermined period of time.

29. The rectifier circuit of claim 28, wherein the predetermined period of time is about 10 ms.

30. The rectifier circuit of claim 27, wherein the one or more phases of the AC source have a respective peak voltage (Vp), the predetermined value being about 75% of Vp.

31. The rectifier circuit of claim 25, wherein the firing angle begins when the ramp pulses substantially meet or exceed the difference of Vp and Vramp.

32. The rectifier circuit of claim 25, further comprising an overcurrent protection circuit operable to reset Vramp when Vo is smaller than Vramp−(Vp−V∫pk) by a predetermined amount, where V∫pk corresponds with the integral of the ramp pulses.

33. The rectifier circuit of claim 32, wherein the predetermined amount is a fraction of Vp.

34. The rectifier circuit of claim 33, wherein the fraction of Vp is about 75%.

35. The rectifier circuit of claim 25, further comprising a loss of phase circuit operable to reset Vramp when one or more voltages across respective SCRs falls below a predetermined threshold.

36. The rectifier circuit of claim 35, wherein the one or more voltages are averaged, the loss of phase circuit resetting Vramp when the average voltage across the SCRs falls below the predetermined threshold.

37. A rectifier circuit for converting power from a three phase AC source to DC power having a voltage (Vo) from a Vo+ node to a Vo− node, the rectifier circuit comprising:

first, second, and third rectifier legs coupled from the Vo− node to the Vo+ node, each rectifier leg including a diode and a silicon controlled rectifier (SCR), respective anodes of the diodes being coupled to the Vo− node, respective cathodes of the diodes being coupled to respective anodes of the SCRs at respective AC input nodes, and respective cathodes of the SCRs being coupled to the Vo+ node;

a gate drive circuit operable to permit the SCRs to fire at respective firing angles during half cycles of the respective phases of the AC source, the gate drive circuit limiting the SCRs to turn on (i) only at respective firing angles between about 90° to 180° when Vo is below a predetermined value; and (ii) at firing angles progressively lower than 180° as Vo ramps up from a voltage below the predetermined value to progressively higher values.

\* \* \* \* \*